(12) United States Patent
Nezou et al.

(10) Patent No.: US 10,660,129 B2
(45) Date of Patent: May 19, 2020

(54) CONTENTION MECHANISM FOR ACCESS TO RANDOM RESOURCE UNITS IN AN 802.11 CHANNEL

(71) Applicant: CANON KABUSHIKI KAISHA, Tokyo (JP)

(72) Inventors: Patrice Nezou, Saint Sulpice la Foret (FR); Stéphane Baron, Le Rheu (FR); Romain Guignard, Rennes (FR); Pascal Viger, Janze (FR)

(73) Assignee: Canon Kabushiki Kaisha, Tokyo (JP)

( * ) Notice: Subject to any disclaimer, the term of this patent is extended or adjusted under 35 U.S.C. 154(b) by 137 days.

(21) Appl. No.: 15/741,216

(22) PCT Filed: Jul. 8, 2016

(86) PCT No.: PCT/EP2016/066231
§ 371 (c)(1),
(2) Date: Dec. 29, 2017

(87) PCT Pub. No.: WO2017/005893
PCT Pub. Date: Jan. 12, 2017

(65) Prior Publication Data
US 2018/0199375 A1   Jul. 12, 2018

(30) Foreign Application Priority Data

Jul. 8, 2015 (GB) .................................. 1511968.8
Oct. 23, 2015 (GB) .................................. 1518866.7
(Continued)

(51) Int. Cl.
*H04W 74/08* (2009.01)
*H04W 74/00* (2009.01)
(Continued)

(52) U.S. Cl.
CPC ..... *H04W 74/0816* (2013.01); *H04W 74/006* (2013.01); *H04L 5/001* (2013.01); *H04L 5/0039* (2013.01); *H04W 84/12* (2013.01)

(58) Field of Classification Search
None
See application file for complete search history.

(56) References Cited

U.S. PATENT DOCUMENTS

2002/0163933 A1* 11/2002 Benveniste ............. H04L 47/10
370/465
2014/0064301 A1   3/2014 Rison
(Continued)

OTHER PUBLICATIONS

IEEE Standard for Information technology—Telecommunications and information exchange between systems Local and metropolitan area networks—Specific requirements; Part 11: Wireless LAN Medium Access Control (MAC) and Physical Layer (PHY) Specifications, IEEE Computer Society, IEEE Std 802.11(TM)-2012 (Year: 2012).*
(Continued)

*Primary Examiner* — Joseph A Bednash
(74) *Attorney, Agent, or Firm* — Canon U.S.A., Inc. IP Division

(57) ABSTRACT

In an 802.11ax network with an access point, a trigger frame offers random resource units to nodes for data uplink communication to the access point. To dynamically adapt the contention mechanism used by the nodes to access the random resource units, the AP updates a correcting TBD parameter at each new TXOP and includes the updated adjusting parameter in the trigger frame for the next TXOP. The nodes use the TBD parameter to generate a local random RU backoff value from a contention window range, for contending for access to the random resource units. The TBD parameter may directly impact the contention window size CWO or boundaries values of a selection range from which CWO is selected.

14 Claims, 20 Drawing Sheets

(30) Foreign Application Priority Data

| Feb. 29, 2016 | (GB) | 1603513.1 |
| Feb. 29, 2016 | (GB) | 1603514.9 |
| Feb. 29, 2016 | (GB) | 1603515.6 |

(51) Int. Cl.
*H04W 84/12* (2009.01)
*H04L 5/00* (2006.01)

(56) References Cited

U.S. PATENT DOCUMENTS

| 2014/0269369 | A1 | 9/2014 | Ghosh |
| 2015/0085836 | A1* | 3/2015 | Kang ............... H04W 74/0808 |
| | | | 370/336 |
| 2015/0139209 | A1 | 5/2015 | Park et al. |
| 2017/0272138 | A1* | 9/2017 | Chun ................ H04L 29/08 |
| 2018/0167882 | A1* | 6/2018 | Choi ................ H04W 52/0216 |

OTHER PUBLICATIONS

Patents Act 1977: Search Report under Section 17 for Application No. GB1802654.2, dated Aug. 6, 2018.
Chittabrata Ghosh, et al., "Random Access with Trigger Frames using OFDMA", IEEE 802.11-15/0604r0, 11-15-0604-00-00AX-Random-Access-With-Trig Ger-Frames-Using-OFDMA, IEEE-SA Mentor, Piscataway, NJ, USA, vol. 802. pp. 1-16, XP068094472, May 11, 2015.
"Part 11: Wireless LAN Medium Access Control (MAC) and Physical Layer (PHY) Specifications", IEEE Computer Society, IEEE Std 802.11-2012 (Revision of IEEE Std 802.11-2007), IEEE Standard, IEEE, Piscataway, NJ, USA, pp. 1-2793, XP017694963, Mar. 29, 2012, ISBN: 978-0-7381-7211-8, section 8.3.3.2.

\* cited by examiner

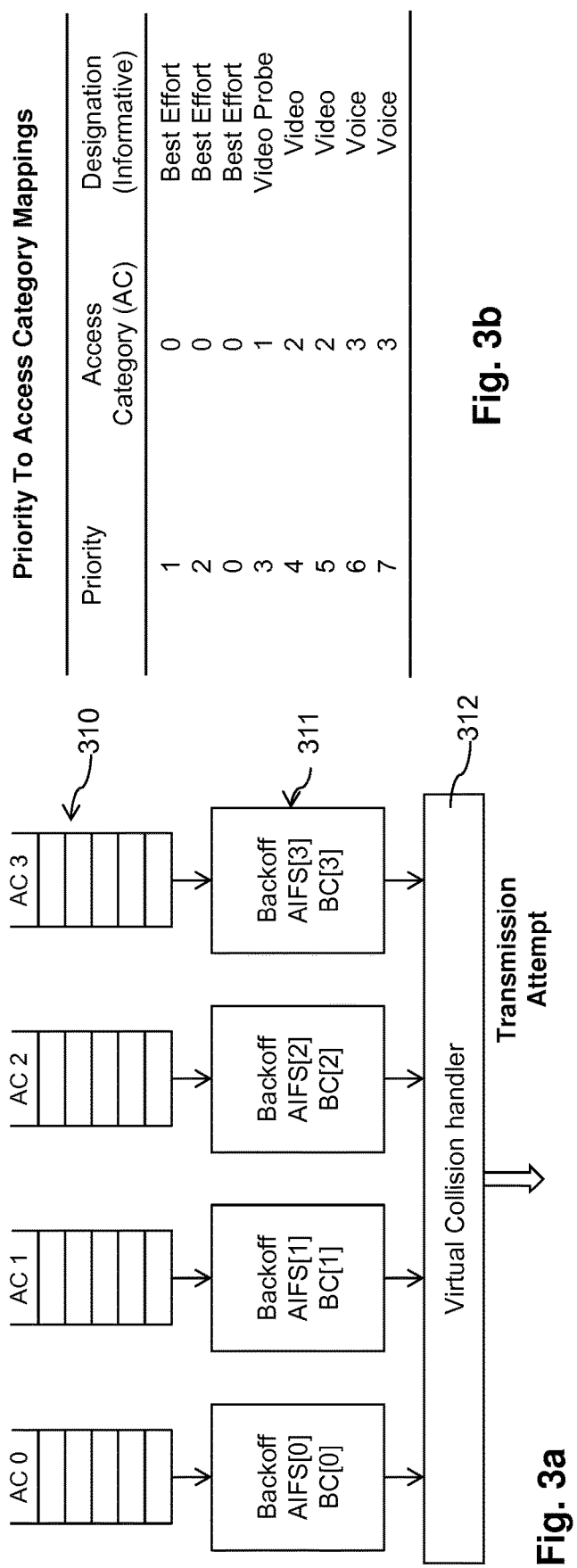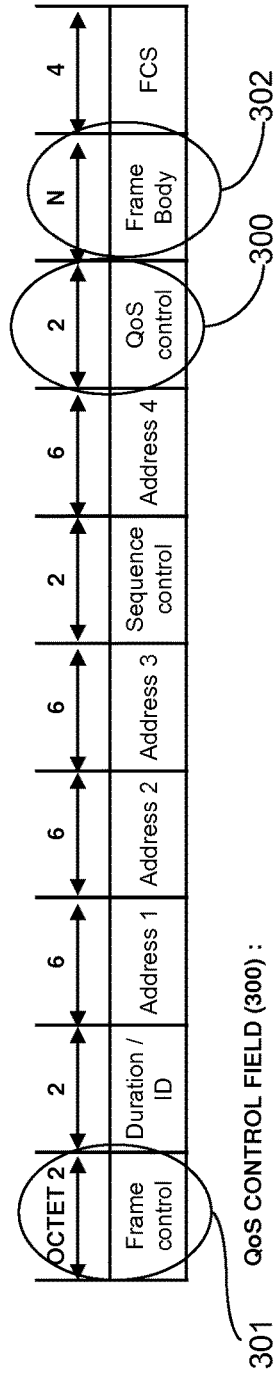
Fig. 3a
Fig. 3b
Fig. 3c

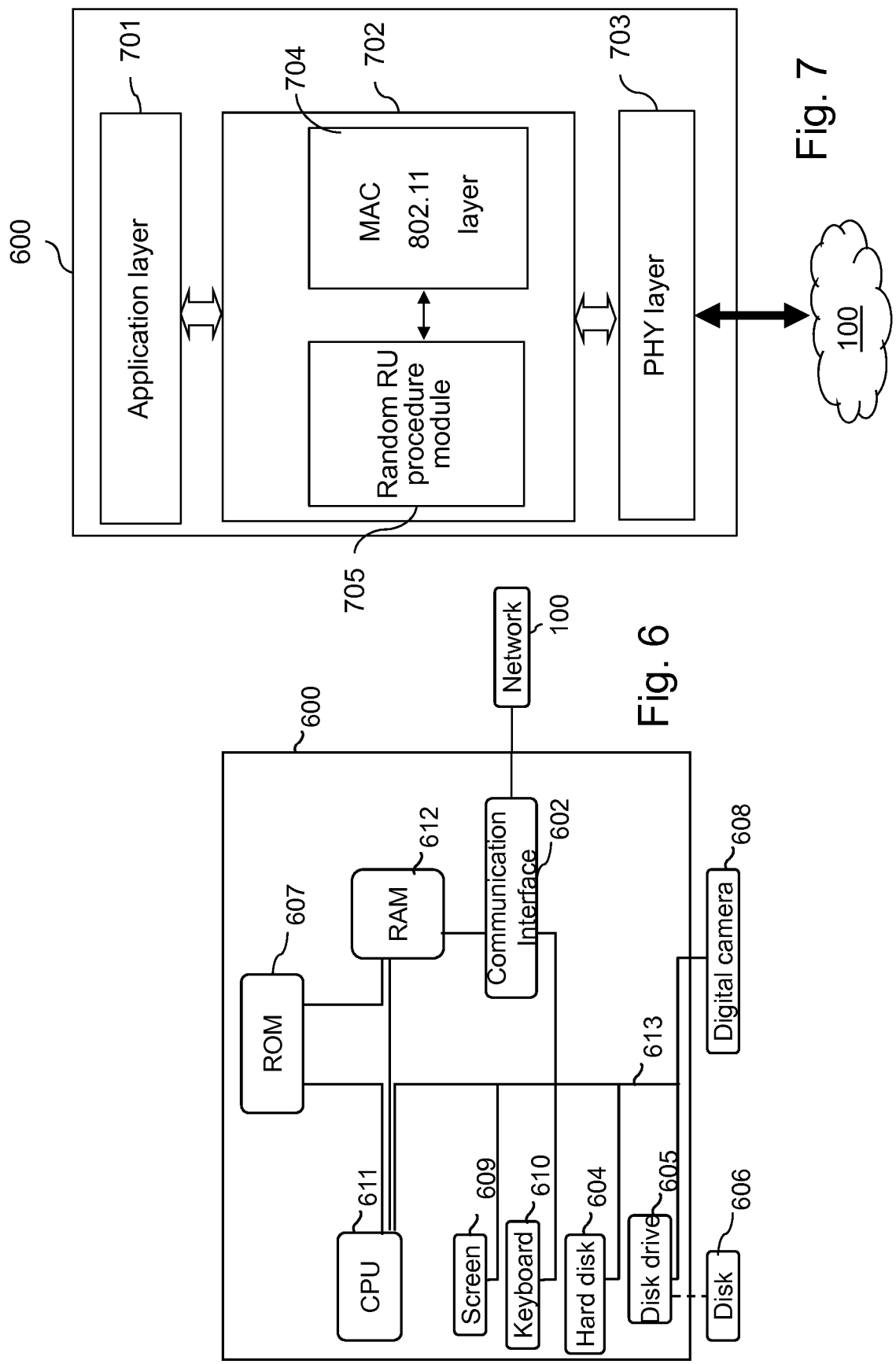

CONTENTION MECHANISM FOR ACCESS TO RANDOM RESOURCE UNITS IN AN 802.11 CHANNEL

CROSS-REFERENCE TO RELATED APPLICATIONS

This application is the National Phase application of PCT Application No. PCT/EP2016/066231, filed on Jul. 8, 2016. This application claims the benefit under 35 U.S.C. § 119(a)-(d) of United Kingdom Patent Application Nos. GB 1511968.8, filed on Jul. 8, 2015, GB 1518866.7 filed on Oct. 23, 2015, GB 1603515.6 filed on Feb. 29, 2016, GB 1603514.9 filed on Feb. 29, 2016, and GB 1603513.1 filed on Feb. 29, 2016. The above cited patent applications are incorporated herein by reference in their entireties.

FIELD OF THE INVENTION

The present invention relates generally to communication networks and more specifically to the contention-based access of channels and their splitting sub-channels (or Resource Units) that are available to a group of nodes.

The invention finds application in wireless communication networks, in particular to the access of an 802.11ax composite channel and of OFDMA Resource Units forming for instance an 802.11ax composite channel for Uplink communication. One application of the method regards wireless data communication over a wireless communication network using Carrier Sense Multiple Access with Collision Avoidance (CSMA/CA), the network being accessible by a plurality of node devices.

BACKGROUND OF THE INVENTION

The IEEE 802.11 MAC standard defines the way Wireless local area networks (WLANs) must work at the physical and medium access control (MAC) level. Typically, the 802.11 MAC (Medium Access Control) operating mode implements the well-known Distributed Coordination Function (DCF) which relies on a contention-based mechanism based on the so-called "Carrier Sense Multiple Access with Collision Avoidance" (CSMA/CA) technique.

The 802.11 medium access protocol standard or operating mode is mainly directed to the management of communication nodes waiting for the wireless medium to become idle so as to try to access to the wireless medium.

The network operating mode defined by the IEEE 802.11ac standard provides very high throughput (VHT) by, among other means, moving from the 2.4 GHz band which is deemed to be highly susceptible to interference to the 5 GHz band, thereby allowing for wider frequency contiguous channels of 80 MHz to be used, two of which may optionally be combined to get a 160 MHz channel as operating band of the wireless network.

The 802.11ac standard also tweaks control frames such as the Request-To-Send (RTS) and Clear-To-Send (CTS) frames to allow for composite channels of varying and predefined bandwidths of 20, 40 or 80 MHz, the composite channels being made of one or more channels that are contiguous within the operating band. The 160 MHz composite channel is possible by the combination of two 80 MHz composite channels within the 160 MHz operating band. The control frames specify the channel width (bandwidth) for the targeted composite channel.

A composite channel therefore consists of a primary channel on which a given node performs EDCA backoff procedure to access the medium, and of at least one secondary channel, of for example 20 MHz each.

EDCA defines traffic categories and four corresponding access categories that make it possible to handle differently high-priority traffic compared to low-priority traffic.

Implementation of EDCA in the nodes can be made using a plurality of traffic queues for serving data traffic at different priorities, with which a respective plurality of queue backoff engines is associated. The queue backoff engines are configured to compute respective queue backoff values when the associated traffic queue stores data to transmit.

Thanks to the EDCA backoff procedure, the node can thus access the communication network using contention type access mechanism based on the computed queue backoff values.

The primary channel is used by the communication nodes to sense whether or not the channel is idle, and the primary channel can be extended using the secondary channel or channels to form a composite channel.

Sensing of channel idleness is made using CCA (clear channel assessment), and more particularly CCA-ED, standing for CCA-Energy Detect. CCA-ED is the ability of any node to detect non-802.11 energy in a channel and back off data transmission. An ED threshold based in which the energy detected on the channel is compared is for instance defined to be 20 dB above the minimum sensitivity of the PHY layer of the node. If the in-band signal energy crosses this threshold, CCA is held busy until the medium energy becomes below the threshold anew.

Given a tree breakdown of the operating band into elementary 20 MHz channels, some secondary channels are named tertiary or quaternary channels.

In 802.11ac, all the transmissions, and thus the possible composite channels, include the primary channel. This is because the nodes perform full Carrier Sense Multiple Access/Collision Avoidance (CSMA/CA) and Network Allocation Vector (NAV) tracking on the primary channel only. The other channels are assigned as secondary channels, on which the nodes have only capability of CCA (clear channel assessment), i.e. detection of an idle or busy state/status of said secondary channel.

An issue with the use of composite channels as defined in the 802.11n or 802.11ac (or 802.11ax) is that the 802.11n and 802.11ac-compliant nodes (i.e. HT nodes standing for High Throughput nodes) and the other legacy nodes (i.e. non-HT nodes compliant only with for instance 802.11a/b/g) have to co-exist within the same wireless network and thus have to share the 20 MHz channels.

To cope with this issue, the 802.11n and 802.11ac standards provide the possibility to duplicate control frames (e.g. RTS/CTS or CTS-to-Self or ACK frames to acknowledge correct or erroneous reception of the sent data) on each 20 MHz channel in an 802.11a legacy format (called as "non-HT") to establish a protection of the requested TXOP over the whole composite channel.

This is for any legacy 802.11a node that uses any of the 20 MHz channel involved in the composite channel to be aware of on-going communications on the 20 MHz channel. As a result, the legacy node is prevented from initiating a new transmission until the end of the current composite channel TXOP granted to an 802.11n/ac node.

As originally proposed by 802.11n, a duplication of conventional 802.11a or "non-HT" transmission is provided to allow the two identical 20 MHz non-HT control frames to be sent simultaneously on both the primary and secondary channels forming the used composite channel.

This approach has been widened for 802.11ac to allow duplication over the channels forming an 80 MHz or 160 MHz composite channel. In the remainder of the present document, the "duplicated non-HT frame" or "duplicated non-HT control frame" or "duplicated control frame" means that the node device duplicates the conventional or "non-HT" transmission of a given control frame over secondary 20 MHz channel(s) of the (40 MHz 80 MHz or 160 MHz) operating band.

In practice, to request a composite channel (equal to or greater than 40 MHz) for a new TXOP, an 802.11n/ac node does an EDCA backoff procedure in the primary 20 MHz channel as mentioned above. In parallel, it performs a channel sensing mechanism, such as a Clear-Channel-Assessment (CCA) signal detection, on the secondary channels to detect the secondary channel or channels that are idle (channel state/status is "idle") during a PIFS interval before the start of the new TXOP (i.e. before any queue backoff counter expires).

More recently, Institute of Electrical and Electronics Engineers (IEEE) officially approved the 802.11ax task group, as the successor of 802.11ac. The primary goal of the 802.11ax task group consists in seeking for an improvement in data speed to wireless communicating devices used in dense deployment scenarios.

Recent developments in the 802.11ax standard sought to optimize usage of the composite channel by multiple nodes in a wireless network having an access point (AP). Indeed, typical contents have important amount of data, for instance related to high-definition audio-visual real-time and interactive content. Furthermore, it is well-known that the performance of the CSMA/CA protocol used in the IEEE 802.11 standard deteriorates rapidly as the number of nodes and the amount of traffic increase, i.e. in dense WLAN scenarios.

In this context, multi-user transmission has been considered to allow multiple simultaneous transmissions to/from different users in both downlink and uplink directions. In the uplink to the AP, multi-user transmissions can be used to mitigate the collision probability by allowing multiple nodes to simultaneously transmit.

To actually perform such multi-user transmission, it has been proposed to split a granted channel into sub-channels, also referred to as resource units (RUs), that are shared in the frequency domain by multiple users, based for instance on Orthogonal Frequency Division Multiple Access (OFDMA) technique. Each RU may be defined by a number of tones, the 80 MHz channel containing up to 996 usable tones.

OFDMA is a multi-user variation of OFDM which has emerged as a new key technology to improve efficiency in advanced infrastructure-based wireless networks. It combines OFDM on the physical layer with Frequency Division Multiple Access (FDMA) on the MAC layer, allowing different subcarriers to be assigned to different nodes in order to increase concurrency. Adjacent sub-carriers often experience similar channel conditions and are thus grouped to sub-channels: an OFDMA sub-channel or RU is thus a set of sub-carriers.

The multi-user feature of OFDMA allows the AP to assign different RUs to different nodes in order to increase competition. This may help to reduce contention and collisions inside 802.11 networks.

As currently envisaged, the granularity of such OFDMA sub-channels is finer than the original 20 MHz channel band. Typically, a 2 MHz or 5 MHz sub-channel may be contemplated as a minimal width, therefore defining for instance 9 sub-channels or resource units within a single 20 MHz channel.

To support multi-user uplink, i.e. uplink transmission to the 802.11ax access point (AP) during the granted TxOP, the 802.11ax AP has to provide signaling information for the legacy nodes (non-802.11ax nodes) to set their NAV and for the 802.11ax nodes to determine the allocation of the resource units RUs.

It has been proposed for the AP to send a trigger frame (TF) to the 802.11ax nodes to trigger uplink communications.

The document IEEE 802.11-15/0365 proposes that a 'Trigger' frame (TF) is sent by the AP to solicit the transmission of uplink (UL) Multi-User (OFDMA) PPDU from multiple nodes. In response, the nodes transmit UL MU (OFDMA) PPDU as immediate responses to the Trigger frame. All transmitters can send data at the same time, but using disjoint sets of RUs (i.e. of frequencies in the OFDMA scheme), resulting in transmissions with less interference.

The bandwidth or width of the targeted composite channel is signaled in the TF frame, meaning that the 20, 40, 80 or 160 MHz value is added. The TF frame is sent over the primary 20 MHz channel and duplicated (replicated) on each other 20 MHz channels forming the targeted composite channel, if appropriate. As described above for the duplication of control frames, it is expected that every nearby legacy node (non-HT or 802.11ac nodes) receiving the TF on its primary channel, then sets its NAV to the value specified in the TF frame. This prevents these legacy nodes from accessing the channels of the targeted composite channel during the TXOP.

A resource unit RU can be reserved for a specific node, in which case the AP indicates, in the TF, the node to which the RU is reserved. Such RU is called Scheduled RU. The indicated node does not need to perform contention on accessing a scheduled RU reserved to it.

In order to better improve the efficiency of the system in regards to un-managed traffic to the AP (for example, uplink management frames from associated nodes, unassociated nodes intending to reach an AP, or simply unmanaged data traffic), the document IEEE 802.11-15/0604 proposes a new trigger frame (TF-R) above the previous UL MU procedure, allowing random access onto the OFDMA TXOP. In other words, the resource unit RU can be randomly accessed by more than one node (of the group of nodes registered with the AP). Such RU is called Random RU and is indicated as such in the TF. Random RUs may serve as a basis for contention between nodes willing to access the communication medium for sending data.

An exemplary random resource selection procedure is defined in document IEEE 802.11-15/1105. According to this procedure, each 802.11ax node maintains a dedicated backoff engine, referred below to as OFDMA or RU (for resource unit) backoff engine, to contend for access to the random RUs. The dedicated OFDMA or RU backoff, also called OBO, is randomly assigned in a contention window range [0, CWO] wherein CWO is the contention window size defined in a range [$CWO_{min}$, $CWO_{max}$].

Once the OFDMA or RU backoff value reaches zero in a node (it is decremented at each new TF-R frame by the number of random RUs defined therein for instance), the node becomes eligible for RU access and thus randomly selects one RU from among all the random RUs defined in the received trigger frame. It then uses the selected RU to transmit data of at least one of the traffic queues.

The management of the OFDMA or RU backoff engine is not optimal.

SUMMARY OF INVENTION

As the nodes access the RUs on a random basis, the risk that either nodes collide on the same RU, or some RUs are not used, or both is high.

For instance, there is no guarantee that the Scheduled and Random RUs will be used by the nodes.

It is particularly the case for the Random RUs because any rule used by the nodes to select a Random RU may result in having RUs not allocated at all to any node. Also, the AP does not know whether or not some nodes need bandwidth. In addition, some RUs provided by the AP may not be accessible for some nodes because of hidden legacy nodes.

It is also the case for the Scheduled RUs (which are reserved by the AP because some nodes have explicitly requested bandwidth) if the specified nodes do not send data.

It results that the channel bandwidth is not optimally used.

On the other hand, depending on the contention procedure used by the nodes to randomly access the Random RUs, it may happen that nodes select the same RUs and thus collide.

To reduce the risk, a desired access rule may be deployed over the nodes to drive the random access as desired. For instance, the same mapping may be implemented in each node to map a local random value, such as the conventional local backoff counter or the OBO value, onto the RU having the same index value in the composite channel (for instance based on an ordering index of the RUs within the composite channel), which mapped RU is thus selected for access by the node.

However, the use of an access rule may not be satisfactory to efficiently reduce the risk, in particular because the network evolves over time: the number of nodes registered in the AP evolves over time, the number of nodes having data to upload to the AP, etc. Due to such network evolution, an access rule relevant at a first time may prove not to be relevant at a later time.

The inventors have also observed that the OFDMA or RU backoff scheme for random RU contention is not optimal given its coexistence with the EDCA queue backoff schemes for CSMA/CA contention.

For instance, it is undisputable that the OFDMA or RU backoff scheme runs in parallel to the EDCA queue backoff schemes. It means that some data (e.g. dedicated to the AP) in an EDCA traffic queue may be transmitted through any of the two access procedures: EDCA providing a new TxOP, and UL OFDMA providing a new random (or scheduled) RU. Of course, uplink traffics are not the only ones in a basic service set (BSS) made of the AP and its registered nodes; there may exist peer-to-peer or direct traffics in between registered nodes of the BSS.

This is why the inventors believe that the interaction between the OFDMA or RU backoff scheme and the EDCA queue backoff schemes should be exploited in a better way to manage efficient use of the random OFDMA RUs.

In addition, while QoS (Quality of Service) is provided by EDCA thanks to the traffic differentiation, this is believed that UL OFDMA medium access misses QoS.

It is a broad objective of the improvements according to the present invention to provide improved communication methods and devices in a communication network, such as a wireless network. The communication network includes a plurality of nodes, possibly including an Access Point with which the other nodes have registered, all of them sharing the physical medium of the communication network.

The present improvements has been devised to overcome one or more foregoing limitations, in particular to provide communication methods having improved use of random and/or scheduled RUs. This may result in having more efficient usage of the network bandwidth (of the RUs) with limited risks of collisions.

The improvements can be applied to any communication network, e.g. a wireless network, in which random resource units are available through contention-based access, within a granted transmission opportunity. For instance, an access point to which a transmission opportunity has been granted provides the registered nodes with a plurality of sub-channels (or resource units) forming the granted communication channel. The communication channel is the elementary channel on which the nodes perform sensing to determine whether it is idle or busy.

The improvements according to the invention is especially suitable for data uplink transmission from nodes to the AP of an IEEE 802.11ax network (and future version), in which case the random RUs may be accessed using OFDMA. Embodiments of the invention may also apply between nodes (without AP), as well as in any communication network other than 802.11ax provided that it offers random RUs or the like that can be accessed simultaneously (and thus through a contention approach) by the nodes.

Multiple technics can be used to determine and to manage the dedicated OFDMA backoff value OBO. Most often the OBO backoff is driven through its associated contention window size CWO. In that case, the inventors have contemplated using two modes to drive the value CWO defining the contention window size: first, a fully local mode that drives the computation of CWO by each node locally; and second, an AP-initiated mode that drives the computation of CWO by the access point (AP), in particular by sending a correcting or TBD parameter to drive the nodes in defining their own contention window size.

However, the inventors have noticed that the most efficient mode is not always the same, depending on network conditions, for instance the number of available random RUs or the number of nodes competing for accessing the random RUs. FIG. 8 illustrates simulation curves of the evolution of an RU use efficiency metric depending on the number of the competing nodes. One may note that in some network configurations, the fully local mode is more efficient than the AP-initiated mode, and that in other network configurations, the balance of efficiency is reversed.

In this context, there is a need to provide more efficient usage of the network bandwidth (of the RUs) with limited risks of collisions while handling correctly such various modes. In other words, there is an issue of selecting the most appropriate mode to drive the computation of CWO at the nodes, in order to optimize the use of the random RUs.

Main embodiments of first improvements according to the invention provide, from the access point's perspective, a wireless communication method in a wireless network comprising an access point and a plurality of nodes, the method comprising the following steps, at the access point:

sending one or more trigger frames to the nodes, each trigger frame reserving a transmission opportunity on at least one communication channel of the wireless network, each trigger frame defining resource units forming the communication channel and including a plurality of random resource units that the nodes access using a contention scheme based on a contention window to transmit data;

determining use statistics on the use of the random resource units by the nodes during the one or more transmission opportunities;

determining, based on the determined use statistics, a TBD parameter to drive nodes in defining (i.e. determining) their own contention window size;

evaluating a measure of use efficiency of the random resource units based on the determined use statistics; and deciding, based on the evaluated use efficiency measure, to transmit or not, to the nodes, the determined TBD parameter within a next trigger frame for reserving a next transmission opportunity.

The next trigger frame (TF) embedding the TBD parameter is not necessarily adjacent to one previous TF having a TBD parameter. For instance, a conventional TF may be sent there between. Also conventional RTS/CTS exchanges may occur between two trigger frames according to the first main embodiments (i.e. including the TBD parameter).

The same main embodiments of the invention provide, from the node's perspective, a wireless communication method in a wireless network comprising an access point and a plurality of nodes, the method comprising the following steps, at one of said nodes:

receiving a trigger frame from the access point, the trigger frame reserving a transmission opportunity on at least one communication channel of the wireless network, the trigger frame defining resource units forming the communication channel and including a plurality of random resource units that the nodes access using a contention scheme based on a contention window to transmit data;

determining whether or not the received trigger frame includes a TBD parameter to drive the node in defining its own contention window size;

in case of positive determining, computing a new contention window size based on the received TBD parameter; otherwise, using a local contention window size as new contention window size, to contend for access to the random resource units splitting the transmission opportunity; and transmitting data to the access point upon accessing one of the random resource units.

The access point evaluates a use efficiency metric to determine whether it is opportune to drive the computation of the contention window size by the access point (first mode), or it is more opportune to let the nodes handling such computation by their own (second mode).

In the first mode, the AP's overall view of the whole wireless network makes it possible to obtain more efficient contention windows range at the nodes, in order to reduce risks of collisions and thus to improve use of the random RUs.

In the second mode, the nodes handle the computation of their contention window sizes by their own. This makes it possible to take advantage of local specificities that help using efficiently the random RUs. It is for instance the case with hidden nodes. In particular, an AP which cannot see legacy nodes in the vicinity of some nodes contending for access to the random RUs, is not able to take into account such hidden legacy nodes to adjust the contention window size at the nodes. As a consequence, it may be worth having the nodes computing independently their own CWO by themselves.

As a consequence, the decision to switch from one mode to the other, given the efficiency of RU use due to the current mode, helps to improve such use of the random RUs as the network conditions evolve over time.

Correlatively, the invention provides a communication device acting as an access point in a wireless network also comprising a plurality of nodes, the communication device acting as an access point comprising at least one microprocessor configured for carrying out the steps of:

sending one or more trigger frames to the nodes, each trigger frame reserving a transmission opportunity on at least one communication channel of the wireless network, each trigger frame defining resource units forming the communication channel and including a plurality of random resource units that the nodes access using a contention scheme based on a contention window to transmit data;

determining use statistics on the use of the random resource units by the nodes during the one or more transmission opportunities;

determining, based on the determined use statistics, a TBD parameter to drive nodes in defining their own contention window size;

evaluating a measure of use efficiency of the random resource units based on the determined use statistics; and deciding, based on the evaluated use efficiency measure to transmit or not, to the nodes, the determined TBD parameter within a next trigger frame for reserving a next transmission opportunity.

From the node's perspective, the invention also provides a communication device in a wireless network comprising an access point and a plurality of nodes, the communication device being one of the nodes and comprising at least one microprocessor configured for carrying out the steps of:

receiving a trigger frame from the access point, the trigger frame reserving a transmission opportunity on at least one communication channel of the wireless network, the trigger frame defining resource units forming the communication channel and including a plurality of random resource units that the nodes access using a contention scheme based on a contention window to transmit data;

determining whether or not the received trigger frame includes a TBD parameter to drive the node in defining its own contention window size;

in case of positive determining, computing a new contention window size based on the received TBD parameter; otherwise, using a local contention window size as new contention window size, to contend for access to the random resource units splitting the transmission opportunity; and transmitting data to the access point upon accessing one of the random resource units.

Optional features of embodiments of the first improvements are explained here below with reference to a method, while they can be transposed into system features dedicated to any node device according to embodiments of the first improvements.

In embodiments, the access point switches from a current mode among a first mode (AP-initiated) in which the determined TBD parameter is transmitted within a trigger frame and a second mode (local) in which the determined TBD parameter is not transmitted, to the other mode when the evaluated use efficiency measure falls below a first predefined efficiency threshold.

In particular, the current mode may be locked until an evaluated use efficiency measure reaches a second predefined efficiency threshold.

In specific embodiments, in the second mode, the transmitted next trigger frame includes a TBD parameter field set to undefined, for instance using a specific value. This is a way to define absence of a TBD parameter that is easily detectable by the nodes.

In other embodiments from the access point's perspective, the evaluated use efficiency measure is function of a number of random resource units that are used by the nodes and that do not experience collision during the one or more transmission opportunities.

In specific embodiments, the evaluated use efficiency measure includes a ratio between said number of random resource units that are used by the nodes and that do not experience collisions, and a total number of random resource units available during the one or more transmission opportunities.

In other words, the decision to switch between the two modes defined above is based on statistics related to the random resource units that are efficiently used to transmit data, i.e. data that are positively acknowledged by the access point. As a consequence, a relevant metric on network efficiency is used.

In variants, the evaluated use efficiency measure is function of a number of unused random RUs and/or of a number of collided random RUs in the one or more transmission opportunities. For instance, the evaluated use efficiency measure may include a ratio between a number of collided random resource units and the total number of random resource units available during the one or more transmission opportunities. Or, the evaluated use efficiency measure may include a ratio between a number of unused random resource units and the total number of random resource units available during the one or more transmission opportunities.

In embodiments from the nodes' perspective, the method may further comprises computing, based on the new contention window size, an RU backoff value to be used to contend for access to the random resource units in order to transmit data.

In specific embodiments, computing the RU backoff value includes randomly selecting a value within a contention window range defined by the new contention window size, and the new contention window size is determined based on the TBD parameter received from the access point in case of positive determining. Thus, the AP drives the computation of the contention window size or range, and consequently drives the way the nodes contend for access to the random RUs.

In embodiments, the TBD parameter is an RU collision and unuse factor reflecting the access point's point of view regarding the usage of random resource units defined in one or more previous trigger frames.

In specific embodiments, the TBD parameter is based on a number of unused random RUs and/or of a number of collided random RUs in the one or more transmission opportunities.

In variants, the TBD parameter is function of a number of random resource units that are used by the nodes and that do not experience collision during the one or more transmission opportunities. It is for instance the same ratio as defined above for the use efficiency measure.

Various embodiments rely on computing CWO as follows in case of positive determining (i.e. based on the TBD parameter): $CWO=2^{CRF}*CWO_{min}$, wherein $CRF=\alpha*(Nb\_collided\_RU/Nb\_RU\_total)$ and $CWO_{min}$ is a (predetermined) low boundary value. For instance, $CWO_{min}$ is (or more generally may be determined as a function of) the number of random resource units defined in the next trigger frame. It means that the new contention window size (at the node) is determined as a function of the number of random resource units defined in the received trigger frame.

Thus in some embodiments from the AP's perspective, the TBD parameter is function of a ratio between the number of collided random RUs (Nb_collided_RU above) and the number of random RUs in the one or more transmission opportunities (Nb_RU_total above). In particular, the ratio may be multiplied by a predefined factor $\alpha$, for instance the predefined factor equals 0.08.

The TBD parameter may thus equal the ratio multiplied by the predefined factor, i.e. equal to CRF. From the node's perspective, it means that the new contention window size is equal to $2^{TBD}*CWO_{min}$, wherein TBD is the TBD parameter received from the access point.

In a variant, the TBD parameter equals 2^CRF (i.e. $2^{CRF}$). From the node's perspective, it means that the new contention window size is equal to $TBD*CWO_{min}$, where TBD is the TBD parameter received from the access point.

In another variant, the TBD parameter directly defines CWO, i.e. a new contention window size to be used by the nodes. From the node's perspective, it means that the new contention window size CWO is the TBD parameter received from the access point.

In variants that do not necessarily rely on the above formula $CWO=2^{CRF}*CWO_{min}$, the TBD parameter identifies an entry to select in a predefined table of contention window sizes. The table may be shared between the AP and the nodes. Thus, from the node's perspective, the new contention window size is selected as an entry of a predefined table of contention window sizes, wherein the TBD parameter received from the access point identifies the entry to select in the predefined table.

In yet other variants, the range from which CWO is selected may be defined using the TBD parameter. Indeed, CWO is selected from $[CWO_{min}, CWO_{max}]$.

For instance, the TBD parameter defines a lower boundary $CWO_{min}$ of a selection range from which the nodes select their contention window sizes to use to contend for access to the random resource units. From the node's perspective, the new contention window size is selected from a selection range, and the lower boundary of the selection range is the TBD parameter received from the access point.

According to embodiments, the TBD parameter defines an upper boundary $CWO_{max}$ of a selection range from which the nodes select their contention window sizes to use to contend for access to the random resource units. From the node's perspective, the new contention window size is selected from a selection range, and the upper boundary of the selection range is the TBD parameter received from the access point.

In other embodiments from the access point's perspective, the determined TBD parameter is assigned to a group of nodes. The assignment may be made by specifying a BSSID, Basic Service Set Identification, in the next trigger frame including the determined TBD parameter. Indeed, an AP can handle different BSSIDs corresponding to different virtual sub-networks of nodes. Thus, the above provision helps the AP to control the QoS and priorities of some groups of nodes.

From the node's perspective, it means that the determining step includes checking whether a TBD parameter included in the received trigger frame is assigned to a group of nodes to which the node belongs. In particular, the checking step may include reading a BSSID, Basic Service Set Identification, in the received trigger frame.

In other embodiments, the TBD parameter is assigned to a type of data to be transmitted by the nodes. The AP can thus manage the latency of a given type of transmitted data.

In some embodiments from the node's perspective, the local contention window size is updated depending on a success or failure in transmitting the data.

In embodiments, the local contention window size is set to a (predetermined) low boundary value in case of transmission success. This is to offer the best access to the random RUs as long as there is no difficulty (failure) when transmitting data.

In particular, the low boundary value is the number of random resource units defined in the received trigger frame.

In some of the second embodiments, the local contention window size is doubled in case of transmission failure.

In specific embodiments, the local contention window size is determined as a function of the number $CWO_{min}$ of random resource units defined in a received trigger frame.

The doubling-based embodiments above correspond to the local contention window size equaling $CWO_{min}*2^n$, where n is the number of successive transmission failures by the node.

In other embodiments, the local contention window size equals $CWO_{min}(t)*2^n$, where n is the number of successive transmission failures by the node and $CWO_{min}(t)$ is the number of random resource units defined in a current trigger frame received at time t.

First main embodiments of second improvements of the invention provide, from the access point's perspective, a wireless communication method in a wireless network comprising an access point and a plurality of nodes, the method comprising the following steps, at the access point:

sending one or more trigger frames to the nodes, each trigger frame reserving a transmission opportunity on at least one communication channel of the wireless network, each trigger frame defining resource units forming the communication channel and including a plurality of random resource units that the nodes access using a contention scheme;

determining statistics (i.e. at least one item of information) on random resource units not used by the nodes during the one or more transmission opportunities and/or on random resource units on which nodes collide during the one or more transmission opportunities;

determining a TBD parameter based on the determined statistics, sending, to the nodes, a next trigger frame for reserving a next transmission opportunity, the next trigger frame including the determined TBD parameter.

The next trigger frame (TF) embedded the TBD parameter is not necessarily adjacent to one previous TF having a TBD parameter. For instance, a conventional TF may be sent there between. Also conventional RTS/CTS exchanges may occur between two trigger frames according to the first main embodiments (i.e. including the TBD parameter).

The same first main embodiments of the second improvements provide, from the node's perspective, a wireless communication method in a wireless network comprising an access point and a plurality of nodes, the method comprising the following steps, at one of said nodes:

receiving a trigger frame from the access point, the trigger frame reserving a transmission opportunity on at least one communication channel of the wireless network and including a TBD parameter, the trigger frame defining resource units forming the communication channel and including a plurality of random resource units that the nodes access using a contention scheme;

determining, based on the TBD parameter and on one random parameter local to the node, one of the random resource units (this step corresponds to the way the nodes contend for access to the random resource units according to the first embodiments of the invention);

transmitting data to the access point using the determined random resource unit.

In these first main embodiments, a correcting or TBD parameter is exchanged between the access point and the nodes. On one hand, it is used by the nodes to adjust how the local random parameter impacts the choice of the random RUs to be used. This is why the parameter is named "correcting". On the other hand, this TBD parameter is calculated by the access point based on statistics related to the use of the Random RUs (unused or collided RUs). This is because the access point has an overall view of the network, as the nodes only communicate with it.

It results that the contention scheme used by the nodes to access the Random RUs can be dynamically adapted to the network environment. As a consequence, more efficient usage of the network bandwidth (of the RUs) with limited risks of collisions can be achieved.

Correlatively, the invention provides a communication device acting as an access point in a wireless network also comprising a plurality of nodes, the communication device acting as an access point comprising at least one microprocessor configured for carrying out the steps of:

sending one or more trigger frames to the nodes, each trigger frame reserving a transmission opportunity on at least one communication channel of the wireless network, each trigger frame defining resource units forming the communication channel and including a plurality of random resource units that the nodes access using a contention scheme;

determining statistics on random resource units not used by the nodes during the one or more transmission opportunities and/or random resource units on which nodes collide during the one or more transmission opportunities;

determining a TBD parameter based on the determined statistics, sending, to the nodes, a next trigger frame for reserving a next transmission opportunity, the next trigger frame including the determined TBD parameter.

From the node's perspective, the second improvements also provide a communication device in a wireless network comprising an access point and a plurality of nodes, the communication device being one of the nodes and comprising at least one microprocessor configured for carrying out the steps of:

receiving a trigger frame from the access point, the trigger frame reserving a transmission opportunity on at least one communication channel of the wireless network and including a TBD parameter, the trigger frame defining resource units forming the communication channel and including a plurality of random resource units that the nodes access using a contention scheme;

determining, based on the TBD parameter and on one random parameter local to the node, one of the random resource units;

transmitting data to the access point using the determined random resource unit.

Optional features of embodiments of the second improvements are defined in the appended claims. Some of these features are explained here below with reference to a method, while they can be transposed into system features dedicated to any node device according to embodiments of the second improvements.

In embodiments, the TBD parameter is function of a number of unused random resource units and/or of a number of collided random resource units. These embodiments make it possible to dynamically adapt to various deficient network environments.

In variant, the TBD parameter is function of a number of random resource units that are used by the nodes and that do not experience collision during the one or more transmission opportunities. In fact, this number is directly linked to the above numbers of unused and collided random RUs, because the sum of all of them equals the number of random RUs.

In embodiments, the TBD parameter is function of the number of nodes having data to transmit during the next transmission opportunity. In some situations, such number of nodes having data to transmit may be approximate to the number of nodes transmitting in the one or more (previous) transmission opportunities.

Such number of nodes having data to transmit directly impacts the risk of collisions and/or of unused RUs, in particular if the number of RUs forming the composite channel is known in advance.

In embodiments, the method at the access point further comprises modifying the number of random resource units within the communication channel for the next transmission opportunity, based on the determined statistics (this is equivalent to being based on the transmitted TBD parameter). The AP may thus adjust the number of Random RUs as the network conditions evolve.

In embodiments from the access point's perspective, the TBD parameter includes a value to apply to a random parameter local to each node, for the node to determine which one of the random resource units to access. For instance, the random parameter may be based on a backoff value used by the node to contend for access to the communication channel. This backoff value is for instance the conventional 802.11 backoff counter used to contend for network access to the 20 MHz channels or the RU backoff value defined above.

These embodiments keep compliance with the 802.11 standard, as the backoff counter is still used. In addition, they provide an efficient random mechanism for contention that can be dynamically adjusted in a very simple way.

In variants, the TBD parameter includes a number of random resource units not used during the one or more transmission opportunities or a ratio of this number to the total number of random resource units in the one or more transmission opportunities.

In other variants, the TBD parameter includes a number of random resource units on which nodes collide during the one or more transmission opportunities or a ratio of this number to the total number of random resource units in the one or more transmission opportunities. The two variants may be combined.

In yet another variant, the TBD parameter includes a number of random resource units that are used by the nodes and that do not experience collision during the one or more transmission opportunities or a ratio of this number to the total number of random resource units in the one or more transmission opportunities.

In embodiments from the node's perspective, the random parameter local to the node is based on a backoff value used by the node to contend for access to the communication channel (i.e. a value corresponding to the number of timeslots the node waits before accessing the communication medium).

In embodiments from the node's perspective, the random resource units have respective unique indexes (for instance an ordering index), and determining one of the random resource units includes applying the TBD parameter to the local random parameter, the result of which identifying the index of the random resource unit to be used to transmit the data to the access point. Note that, as described above, the local random parameter can be the backoff counter used by the node to contend for access to the communication channel.

These embodiments provide a simple way to perform random contention on the RUs, while keeping compliance with 802.11 standard.

In a specific embodiment, applying the TBD parameter to the local random parameter includes dividing the local random parameter by the TBD parameter and outputting an integer rounding of the division result. This is to provide a simple mechanism to dynamically adjust the contention scheme to the network conditions (through the use of the statistics and TBD parameter at the access point).

According to embodiments at the access point, the sent TBD parameter defines a parameter for defining a contention window size CWO in the nodes.

From the node's perspective, where the node includes an RU backoff engine for computing an RU backoff value to be used to contend for access to at least one random resource unit splitting the transmission opportunity reserved on the communication channel, in order to transmit data stored in a traffic queue, this corresponds for the node to perform the following step:

computing the RU backoff value by randomly selecting a value within a contention window range defined by a contention window size, wherein the contention window size is determined based on the TBD parameter received from the access point.

Again, this approach dynamically adjusts the node contention to the random RUs, to an overall view of the network conditions as analyzed by the access point.

In the context of EDCA queue backoff schemes, the node includes:

a plurality of traffic queues for serving data traffic at different priorities; and a plurality of queue backoff engines, each associated with a respective traffic queue for computing a respective queue backoff value to be used to contend for access to the communication network in order to transmit data stored in the respective traffic queue;

and the RU backoff engine is separate from the queue backoff engines.

In embodiments from the node's perspective, the TBD parameter received from the access point is an RU collision and unuse factor reflecting the access point's point of view regarding the usage of random resource units defined in one or more previous trigger frames.

In specific embodiments from the node's perspective, the TBD parameter is based on a number of unused random RUs and/or of a number of collided random RUs in the one or more previous trigger frames. In other words from the AP, the sent TBD parameter is based (i.e. is determined based) on a number of unused random RUs and/or of a number of collided random RUs in the one or more transmission opportunities.

In variants, the TBD parameter is function of a number of random resource units that are used by the nodes and that do not experience collision during the one or more transmission opportunities.

Various sub-embodiments rely on computing CWO as follows: $CWO=2^{CRF*CWO_{min}}$, wherein $CRF=\alpha*(Nb\_collided\_RU/Nb\_RU\_total)$ and $CWO_{min}$ is a (predetermined) low boundary value. For instance, $CWO_{min}$ is (or more generally may be determined as a function of) the number of random resource units defined in the next trigger frame. It means that the contention window size (at the node) is determined as a function of the number of random resource units defined in the received trigger frame.

Thus in some embodiments from the AP's perspective, the sent TBD parameter is function of a ratio between the number of collided random RUs (Nb_collided_RU above) and the number of random RUs in the one or more transmission opportunities (Nb_RU_total above). In particular, the ratio may be multiplied by a predefined factor α, for instance the predefined factor equals 0.08.

The sent TBD parameter may thus equal the ratio multiplied by the predefined factor, i.e. equal to CRF. From the node's perspective, it means that the contention window size is equal to $2^{TBD}*CWO_{min}$, wherein TBD is the TBD parameter received from the access point.

In a variant, the sent TBD parameter equals 2^CRF (i.e. $2^{CRF}$). From the node's perspective, it means that the contention window size is equal to $TBD*CWO_{min}$, where TBD is the TBD parameter received from the access point.

In another variant, the sent TBD parameter directly defines CWO, i.e. a contention window size to be used by the nodes. From the node's perspective, it means that the contention window size CWO is the TBD parameter received from the access point.

In variants that do not necessarily rely on the above formula $CWO=2^{CRF}*CWO_{min}$, the sent TBD parameter identifies an entry to select in a predefined table of contention window sizes. The table may be shared between the AP and the nodes. Thus, from the node's perspective, the contention window size is selected as an entry of a predefined table of contention window sizes, wherein the TBD parameter received from the access point identifies the entry to select in the predefined table.

In yet other variants, the selection range from which CWO is selected may be defined using the TBD parameter. Indeed CWO is selected from $[CWO_{min}, CWO_{max}]$.

For instance, the sent TBD parameter defines a lower boundary $CWO_{min}$ of a selection range from which the nodes select their contention window sizes to use to contend for access to the random resource units. From the node's perspective, the contention window size is selected from a selection range, and the lower boundary of the selection range is the TBD parameter received from the access point.

According to embodiments, the sent TBD parameter defines an upper boundary $CWO_{max}$ of a selection range from which the nodes select their contention window sizes to use to contend for access to the random resource units. From the node's perspective, the contention window size is selected from a selection range, and the upper boundary of the selection range is the TBD parameter received from the access point.

According to embodiments, the TBD parameter is assigned to a group of nodes, for instance to a BSSID handled by the AP. This is for the AP to control the QoS and priorities of some groups of nodes.

According to embodiments, the TBD parameter is assigned to a type of data to be transmitted by the nodes. The AP can thus manage the latency of a given type of transmitted data.

In embodiments still from the node's perspective, the method may further comprise the steps of:

determining a first time instant based on the random parameter local to the node; and sending padding data on the determined random resource unit from the determined first time instant up to the end of a predetermined time window after having received the trigger frame, start transmitting the data on the determined random resource unit when the predetermined time window ends.

These embodiments offer an efficient contention mechanism while keeping synchronization between the nodes. Indeed, all the nodes start transmitting their data to the access point from the same time instant (when the time window ends). Such synchronization is particularly important in case of OFDMA RUs.

Various declinations of these embodiments are defined and explained below with reference to the second main embodiments of the second improvements.

Second main embodiments of the second improvements of the invention provide a wireless communication method in a wireless network comprising an access point and a plurality of nodes, the method comprising the following steps, at one of said nodes:

receiving a trigger frame from the access point, the trigger frame reserving a transmission opportunity on at least one communication channel of the wireless network, the trigger frame defining resource units forming the communication channel including a plurality of random resource units that the nodes access using a contention scheme;

determining a first time instant based on one random parameter local to the node;

sending padding (or dummy) data on a first one of the random resource units from the determined first time instant up to the end of a predetermined time window after having received the trigger frame (the determining and sending steps thus forming a mechanism for contending for access to the RUs according to embodiments of the invention);

starting transmitting data to the access point on the first random resource unit when the predetermined time window ends (it defines a predefined second time instant).

The second embodiments define a new contention mechanism for access to RUs composing a conventional communication channel, for instance a 20 MHz 802.11 channel. They are mainly implemented at the nodes.

They particularly apply to OFDMA RUs. This is because, due to synchronization requirements between the OFDMA symbols (or PPDUs), the nodes implementing the second embodiments of the invention only send padding data. The padding data are sent up to a time point (predefined second time instant) at which all the nodes having data to transmit simultaneously start transmitting the data. Synchronization is thus saved, while having an efficient contention scheme to access the Random RUs.

Note that the nodes being allocated with a respective Scheduled RU in the communication channel should also wait for the end of the time window before transmitting their data. "Wait" may also mean sending padding data on the Scheduled RU.

Correlatively, the invention provides a communication device in a wireless network comprising an access point and a plurality of nodes, the communication device being one of the nodes and comprising at least one microprocessor configured for carrying out the steps of:

receiving a trigger frame from the access point, the trigger frame reserving a transmission opportunity on at least one communication channel of the wireless network, the trigger frame defining resource units forming the communication channel including a plurality of random resource units that the nodes access using a contention scheme;

determining a first time instant based on one random parameter local to the node;

sending padding (or dummy) data on a first one of the random resource units from the determined first time instant up to the end of a predetermined time window after having received the trigger frame (the determining and sending steps thus forming a mechanism for contending for access to the RUs according to embodiments of the invention);

starting transmitting data to the access point on the first random resource unit when the predetermined time window ends (it defines a predefined second time instant).

Optional features of embodiments of the second improvements are defined in the appended claims. Some of these features are explained here below with reference to a method, while they can be transposed into system features dedicated to any node device according to embodiments of the second improvements.

In embodiments, the local random parameter is based on a backoff value used by the node to contend for access to the communication channel (i.e. a value corresponding to the number of time-slots the node waits before accessing the communication medium, for instance a 20 MHz channel). This is a simple way to obtain a local random parameter, while keeping compliancy with the 802.11 standard.

In specific embodiments, the first time instant is determined as a linear function of the backoff value (local random parameter) within the time window. As an example, the method may further comprise decrementing the backoff value (local random parameter) each elementary time unit within the time window, and the first time instant is the time instant at which the backoff value (local random parameter) reaches zero. In other words, the nodes may perform contention on the Random RUs using their conventional 802.11 backoff counter. Note that the elementary time units used to decrement the backoff value during contention to access the RUs may be different in size (in particular shorter) compared to the time units used when contending for access to the (20 MHz) communication channel. This is to shorten the required time window and thus to increase the actual transmission duration dedicated to useful data.

In specific embodiments, if the backoff value (local random parameter) does not reach zero at the end of the time window, no random resource unit is selected for sending padding data and transmitting data within the transmission opportunity.

In embodiments, the time window is calculated based on a number of elementary time units corresponding to the number of random resource units in the communication channel. For instance, the same number of elementary time units as the number of random resource units may be used. This is to avoid that too many nodes try to access a limited number of Random RUs.

In a particular embodiment, the time window is further calculated based on an adjusting parameter, which adjusting parameter is function of statistics on random resource units not used by the nodes during one or more previous transmission opportunities and/or random resource units on which nodes collide during one or more previous transmission opportunities. In other words, the time window size is adjusted according to the network conditions (statistics). The statistics may be defined and used as described above with reference to the first embodiments of the invention.

In embodiments, the method may further comprise sensing a use of the random resource units during the time window (in particular until the first time instant). Use of a random RU means that an OFDM symbol is detected by the node on the RU. Note that the implementation of the second embodiments of the invention results in having OFDM symbols made of padding data.

In a particular embodiment, the method further comprises selecting one of the random resource units sensed as unused to send the padding data and transmit the data. This is to efficiently use the network bandwidth with limited collisions.

According to a specific implementation, the random resource units are ordered within the communication channel (they have respective unique indexes), and the selected unused random resource unit is the first one of the sensed unused random resource units according to the order. With this approach, only one random resource unit is newly used each time the local random parameter is evaluated anew. A control may thus be achieved to propose a new unused random resource unit at each new evaluation of the local random parameter within the time window.

In another particular embodiment (which may be combined), the method further comprise, upon sensing a new random resource unit as used, updating the local random parameter. This provision makes it possible to speed up the RU allocation for the remaining time (for instance if the update consists in decreasing the local random parameter).

According to a specific implementation, the local random parameter is updated based on at least one TBD parameter specified in the trigger frame received from the access point. Such TBD parameter may be as defined above with reference to the first main embodiments. This configuration helps optimizing the use of the Random RUs, since such TBD parameter may be set by the access point based on statistics representative of the network environment.

For instance, the TBD parameter is function of statistics on random resource units not used by the nodes during one or more previous transmission opportunities and/or random resource units on which nodes collide during one or more previous transmission opportunities.

In a yet other particular embodiment (which also may be combined), as soon as all the random resource units of the at least one communication channel are sensed as used, stopping the sensing step (also the decrementing step when implemented). This is to avoid useless processing as soon as no further Random RUs is available.

In embodiments, a backoff value used by the node to contend for access to the communication channel is updated based on the value taken by the local random parameter at the determined first time instant. The backoff value may be the conventional 802.11 backoff counter used to contend for access to the 20 MHz channels.

This provision optimizes use of the network. This is because, since the local random parameter has evolved while been evaluated over the time window, some nodes have already sent their data. It results that they are less chances that nodes succeed in contending for access to the communication channel in the first next backoff time slots. To avoid wasting such first backoff time slots, the backoff counter of the nodes may thus be updated according to the evolution of their local random parameter.

As noted above, no first time instant may be obtained for some nodes, for instance if the contention mechanism does not give an access to those nodes during the time window. For such nodes, a backoff value used by the node to contend for access to the communication channel is also updated based on the value taken by the local random parameter at the end of the time window in case no first time instant has been determined.

In embodiments, the duration of the time window is specified in the trigger frame received from the access point. It makes it possible for the access point to efficiently drive the contention mechanism at the nodes.

In embodiments, the received trigger frame includes a TBD parameter, and the method further comprises determining the first random resource unit based on the TBD parameter and on the local random parameter. As described above for the first main embodiments of the second improvements, this configuration helps adapting dynamically the contention scheme used by the nodes to access the Random RUs, to the network environment. As a consequence, more efficient usage of the network bandwidth (of the RUs) with limited risks of collisions can be achieved.

Of course, all the embodiments described above with reference to the first main embodiments for the second improvements may apply to this configuration.

Third improvements of the invention provide a wireless communication method in a wireless network comprising an access point and a plurality of nodes, the method comprising the following steps, at one of said nodes:

receiving a trigger frame from the access point, the trigger frame reserving a transmission opportunity on at least one communication channel of the wireless network, the trigger frame defining resource units forming the communication channel including a plurality of random resource units that the nodes access using a contention scheme, wherein the node includes an RU backoff engine for computing an RU backoff value to be used to contend for access to the random resource units, in order to transmit data, based on a current RU backoff value, accessing a random resource unit to transmit data to the access point, after having transmitted the data, computing a new RU backoff value to contend for new access to random resource units, the RU backoff value being a value randomly selected within a contention window range defined by a contention window size, wherein the contention window size is updated depending on a success or failure in transmitting the data.

Thanks to this updating of the contention window size CWO, transmissions in case of collisions are gradually limited, which in turn reduces the probability of collisions and thus improves use of the communication network.

Correlatively, the third improvements provide a communication device in a wireless network comprising an access point and a plurality of nodes, the communication device being one of the nodes and comprising at least one microprocessor configured for carrying out the steps of:

receiving a trigger frame from the access point, the trigger frame reserving a transmission opportunity on at least one communication channel of the wireless network, the trigger frame defining resource units forming the communication channel including a plurality of random resource units that the nodes access using a contention scheme, wherein the node includes an RU backoff engine for computing an RU backoff value to be used to contend for access to the random resource units, in order to transmit data, based on a current RU backoff value, accessing a random resource unit to transmit data to the access point, after having transmitted the data, computing a new RU backoff value to contend for new access to random resource units, the RU backoff value being a value randomly selected within a contention window range defined by a contention window size, wherein the contention window size is updated depending on a success or failure in transmitting the data.

Optional features of embodiments of the third improvements are explained here below with reference to a method, while they can be transposed into system features dedicated to any node device according to embodiments of the third improvements.

In embodiments, the contention window size is set to a (predetermined) low boundary value in case of transmission success. This is to offer the best access to the random RUs as long as there is no difficulty (failure) when transmitting data.

In particular, the low boundary value is the number of random resource units defined in a received trigger frame, for instance in the last received trigger frame.

In some of the second embodiments, the contention window size is doubled in case of transmission failure.

In specific embodiments, the contention window size is determined as a function of the number $CWO_{min}$ of random resource units defined in a received trigger frame.

The doubling-based embodiments above correspond to the contention window size equaling $CWO_{min}*2^n$, where n is the number of successive transmission failures.

In other embodiments, the contention window size equals $CWO_{min}(t)*2^n$, where n is the number of successive transmission failures and $CWO_{min}(t)$ is the number of random resource units defined in a current trigger frame received at time t.

In yet other embodiments, the contention window size is determined as a function of an RU collision factor built locally. The RU collision factor may reflect the local node's point of view regarding how the random RUs are used, i.e. reflect statistics on collisions on the random RUs it uses.

In specific embodiments, the method further comprises updating the local RU collision factor depending on a success or failure in transmitting the data, for instance by setting it to a minimum value or dividing it by two in case of transmission success and doubling it in case of transmission failure. This is to build a local factor that efficiently reflects the local node's point of view regarding the use of the random RUs.

In specific embodiments, the method further comprises computing a new value for the contention window size and a new RU backoff value upon receiving a new trigger frame following the step of transmitting data. In these embodiments, the values are computed only when a new transmission opportunity comes (through a new trigger frame). This is to stick on the current states or conditions of the nodes and the network. Indeed, the network conditions and EDCA queue filing may substantially evolve from one time to the other.

In some embodiments, computing the RU backoff value includes randomly selecting a value within a contention window range [0, CWO], wherein CWO is the contention window size for the RU backoff value.

Fourth improvements of the invention also seek to improved use of random RUs, in particular in a context of a plurality of traffic queues, such as EDCA queues. The fourth improvements of the invention provide a communication method in a communication network comprising a plurality of nodes, at least one node comprising:

a plurality of traffic queues for serving data traffic at different priorities;

a plurality of queue backoff engines, each associated with a respective traffic queue for computing a respective queue backoff value to be used to contend for access to at least one communication channel in order to transmit data stored in the respective traffic queue. Such queue backoff value may be computed either when an empty traffic queue starts storing new data to transmit, or when a transmission of data of a traffic queue ends if there are still data to transmit in the traffic queue; and an RU backoff engine separate from the queue backoff engines, for computing an RU backoff value to be used to contend for access to at least one random resource unit splitting a transmission opportunity granted on the communication channel, in order to transmit data stored in either traffic queue, the method comprising; at said node:

determining one or more RU backoff parameters based on one or more queue backoff parameters of the queue backoff engines; and computing the RU backoff value from the determined one or more RU backoff parameters.

Correspondingly, embodiments of the invention provide a communication device forming node in a communication network, comprising:

a plurality of traffic queues for serving data traffic at different priorities;

a plurality of queue backoff engines, each associated with a respective traffic queue for computing a respective queue backoff value to be used to contend for access to at least one communication channel in order to transmit data stored in the respective traffic queue;

an RU backoff engine separate from the queue backoff engines and configured to compute an RU backoff value to be used to contend for access to at least one random resource unit splitting a transmission opportunity granted on the communication channel, in order to transmit data stored in either traffic queue, wherein the RU backoff engine is further configured to:

determine one or more RU backoff parameters based on one or more queue backoff parameters of the queue backoff engines; and compute the RU backoff value from the determined one or more RU backoff parameters.

Note that the node may actually access the communication network using contention type access mechanism based on the computed queue backoff values (EDCA-based CMSA/CA access) and access the one or more random resources units defined in a trigger frame, using contention type access mechanism based on the RU backoff value (OFDMA access) or scheduled access, the accesses being in order to transmit data of at least one of the traffic queues.

By using the queue backoff parameters, the RU backoff value that applied to all traffic queues may thus include some traffic prioritization, thereby improving efficiency of usage of random RUs and QoS of the OFDMA access.

It results that the node can manage a randomized prioritization for local traffic (EDCA compliancy) along with a proper backoff for OFDMA medium access, without requiring new prioritization parameters to be set for OFDMA medium access. In addition, the approach according to the fourth improvements may keep compliancy with 802.11ax and be implemented within conventional environments (i.e. without change in the EDCA state machine).

Optional features of embodiments of the fourth improvements are explained here below with reference to a method, while they can be transposed into system features dedicated to any node device according to embodiments of the fourth improvements.

In some embodiments involving the determination of RU backoff parameters as defined above:

the one or more queue backoff parameters used to determine the one or more RU backoff parameters are parameters of queue backoff engines associated with a traffic queue storing data to transmit. In other words, only the parameters of active EDCA traffics are taken into account. The contention-based RU access thus advantageously reflects the traffic prioritization of the data that are currently available for transmission; and/or the one or more RU backoff parameters include a size of a contention window range from which the RU backoff value is computed. This is usually the value CWO defining the contention window range [0, CWO] from which the backoff value is randomly selected. As a consequence, initialization of the RU backoff parameters for random RU contention depends on the EDCA traffics.

In specific embodiments, the contention window size for the RU backoff value is selected within an interval $[CWO_{min}, CWO_{max}]$, wherein at least one of $CWO_{min}$ and $CWO_{max}$ is an RU backoff parameter determined based on one or more queue backoff parameters. As the contention window size CWO is determined within an interval that directly depends on the queue backoff parameters, it also depends indirectly on the same queue backoff parameters.

According to a particular feature, both $CWO_{min}$ and $CWO_{max}$ are RU backoff parameters determined based on one or more queue backoff parameters. This makes it possible to strictly bind the contention window size depending on the current EDCA parameters for CSMA/CA contention.

According to another particular feature, $CWO_{max}$ is one from:

an upper boundary of a selection range (This is the range from which a contention window size is selected. It is a queue backoff parameter) of the queue backoff engine having the lowest non-zero queue backoff value (i.e. whose traffic queue stores data to transmit). That is the queue backoff engine associated with the highest priority active traffic (Access Category), in the meaning that it is the first AC to transmit on the network. The node advantageously takes the same highest priority for its contention-based RU access scheme;

a mean of upper boundaries of selection ranges of the queue backoff engines having non-zero queue backoff values (i.e. active Access Categories or traffic queues having data to transmit). The node advantageously takes a medium priority, and is thus more relaxed compared to the first proposed value, and the highest upper boundaries from selection ranges of the queue backoff engines having non-zero queue backoff values. The node is even more relaxed. In addition, this proposed value avoids the contention-based RU access to have a medium priority lower than EDCA-based CSMA/CA contention scheme.

According to yet another particular feature, $CWO_{min}$ is one or a combination of:

the number of random resource units defined in a received trigger frame and, the lowest lower boundaries from selection ranges of the queue backoff engines having non-zero queue backoff values.

According to yet another particular feature, a formula used to determine at least one of $CWO_{min}$ and $CWO_{max}$ from one or more queue backoff parameters depends on an RU collision and unuse factor received from another node (preferably from an Access Point). The RU collision and unuse factor may reflect the other nodes' point of view regarding how the random RUs are used, in particular with respect to the number of unused random RUs and of the number of collided random RUs, in the previous one or more trigger frames (history of trigger frames).

This approach using the RU collision and unuse factor makes it possible to dynamically adapt the RU backoff parameters (from which the RU backoff value for RU contention is determined) to the network conditions.

In some embodiments, the method further comprises:

transmitting data of at least one of the traffic queues upon accessing one random resource unit based on the RU backoff value (conventionally the RU backoff value is decremented from time to time);

updating the contention window size depending on a success or failure in transmitting the data (which can be determined based on an acknowledgment message); and computing a new RU backoff value based on the updated contention window size.

In this approach, the RU backoff parameters for the UL-OFDMA random backoff procedure are continuously adjusted. As a parameter for the adjustments includes success/failure of the UL-OFDMA transmissions as perceived by the addressee node (usually the AP), this approach may thus reduce the probability of RU collision.

In specific embodiments, the contention window size is set to a (predetermined) low boundary value in case of transmission success. This low value may for instance be the $CWO_{min}$ value defined above. This approach thus favors transmissions in case no collision is detected. This improves use of the communication network.

In a variant to setting directly the CW size to the (predetermined) low value, it may be decided to divide the current CW size by two (while keeping an integer value equal or above the predetermined low value).

In other specific embodiments, the contention window size is doubled, for instance CWO=2×(CWO+1)−1 where CWO is the contention window size, in case of transmission failure. Again, this approach restricts transmissions in case of collisions, which in turn reduces the probability of collisions and thus improves use of the communication network.

In some embodiments, the contention window size is determined as a function of the number of random resource units defined in a received trigger frame.

In other embodiments, the contention window size is determined as a function of an RU collision and unuse factor either received from another node (preferably from an Access Point) or built locally in case no factor is received from another node. Again, the RU collision and unuse factor may reflect the other node or the local node's point of view regarding how the random RUs are used.

In specific embodiments, the method further comprises:
transmitting data of at least one of the traffic queues upon accessing one random resource unit based on the RU backoff value;

updating the local RU collision and unuse factor depending on a success or failure in transmitting the data, for instance by setting it to a minimum value or dividing it by two in case of transmission success and doubling it in case of transmission failure. This is to build a local factor that efficiently reflects the local node's point of view regarding the use of the random RUs. Again, the RU collision and unuse factor may reflect the other node or the local node's point of view regarding how the random RUs are used.

In specific embodiments, the method further comprises computing a new value for the contention window size and a new RU backoff value upon receiving a new trigger frame following the step of transmitting data. In these embodiments, the values are computed only when a new transmission opportunity comes (through a new trigger frame). This is to stick on the current states or conditions of the nodes and the network. Indeed, the network conditions and EDCA queue filing may substantially evolve from one time to the other.

In specific embodiments, the contention window size is equal to
$2^{TBD} \times CWO_{min}$, wherein TBD is the RU collision and unuse factor and $CWO_{min}$ is a (predetermined) low boundary value. This formula provides good results, in particular because it makes it possible to use the optimum value $CWO_{min}$ while enabling to slightly correct or adapt it according to TBD parameter reflecting network conditions.

In some embodiments, computing the RU backoff value includes randomly selecting a value within a contention window range [0, CWO], wherein CWO is the contention window size for the RU backoff value.

In specific embodiments, computing the RU backoff value further includes applying an RU collision and unuse factor received from another node (preferably from an Access Point) to the randomly selected value. Again, the RU collision and unuse factor may reflect the other node's point of view regarding how the random RUs are used. More efficient usage of the communication network may thus be obtained.

In other specific embodiments, computing the RU backoff value further includes adding, to the randomly selected value, a value computed from one or more arbitration interframe spaces, AIFS, associated with respective queue backoff engines. This is to take into account the relative priority of some different queue buffers, in particular the active ones.

In some embodiments, the method further comprises, upon receiving a trigger frame, decrementing the RU backoff value based on the number of random resource units defined in the received trigger frame. Thus, a random resource unit can be accessed as soon as the RU backoff value reaches zero or becomes less than zero.

In specific embodiments, decrementing the RU backoff value is also based on an RU collision and unuse factor received from another node (preferably from an Access Point). Again, the RU collision and unuse factor may reflect the other node's point of view regarding how the random RUs are used.

In some embodiments, new RU backoff parameters and a new RU backoff value to be used to contend for access to at least one random resource units in order to transmit data stored in either traffic queue are determined upon detecting a triggering event, the triggering event being one from:

receiving a new trigger frame defining a number of random resource units that is different from a current known number of random resource units (e.g. from the number of RUs defined in a previous trigger frame);

detecting that an empty traffic queue from the plurality of traffic queues has now received data to transmit;

receiving a positive or negative acknowledgment of a previous transmission of data in an RU;

receiving a new trigger frame; and detecting a change in at least one queue backoff parameter used to determine the one or more RU backoff parameters.

This provision dynamically adapts the contention-based RU access on the network and node evolutions.

In some embodiments, the RU collision and unuse factor is function of the number of unused random resource units and of the number of collided random resource units in one or more previous trigger frames. In other words, it represents statistics on random resource units not used by the nodes during one or more previous transmission opportunities and/or random resource units on which nodes collide during one or more previous transmission opportunities.

In other embodiments, the random resource units are accessed using OFDMA within the communication channel. It means that the random RUs are provided by splitting the communication channel on a frequency basis.

In yet other embodiments, the communication network is an 802.11ax network.

In some embodiments, the method further comprises receiving a trigger frame from an access point in the communication network, the trigger frame reserving the transmission opportunity on the communication channel (on behalf of another node, usually the access point) and defining resource units, RUs, forming the communication channel including the at least one random resource unit.

In another approach of the fourth improvements, it is sought to improve the OFDMA or RU backoff scheme with respects to the network conditions.

In this context, the other approach of the fourth improvements provides a communication method in a communication network comprising an access point and a plurality of nodes, at least one node comprising:

a plurality of traffic queues for serving data traffic at different priorities;

a plurality of queue backoff engines, each associated with a respective traffic queue for computing a respective queue backoff value to be used to contend for access to the communication network in order to transmit data stored in the respective traffic queue. Such queue backoff value may be computed either an empty traffic queue starts storing new data to transmit or when a transmission of data of a traffic queue ends if data to transmit remain in the traffic queue; and an RU backoff engine separate from the queue backoff engines, for computing an RU backoff value to be used to contend for access to at least one random resource unit splitting a transmission opportunity granted on the communication channel, in order to transmit data stored in either traffic queue, the method comprising, at the node: computing the RU backoff value by randomly selecting a value within a contention window range, wherein at least a size of the contention window range is determined based on at least one indication received from the access point.

As a consequence, the contention window range and thus the RU backoff value used to contend for RU access may be adapted to the network conditions as analyzed by the AP.

Correspondingly, the other approach of the fourth improvements provides a communication device forming node in a communication network comprising an access point and a plurality of nodes, comprising:

a plurality of traffic queues for serving data traffic at different priorities;

a plurality of queue backoff engines, each associated with a respective traffic queue for computing a respective queue backoff value to be used to contend for access to the communication network in order to transmit data stored in the respective traffic queue;

an RU backoff engine separate from the queue backoff engines, for computing an RU backoff value to be used to contend for access to at least one random resource unit splitting a transmission opportunity granted on the communication channel, in order to transmit data stored in either traffic queue, computing the RU backoff value including randomly selecting a value within a contention window range, wherein at least a size of the contention window range is determined based on at least one indication received from the access point.

Of course, this other approach of the fourth improvements may be combined with the previous approach of the fourth improvements defined above (and their variations).

Optional features are explained here below with reference to a method, while they can be transposed into system features dedicated to any node device according to the other approach of the fourth improvements.

In embodiments, the indication received from the access point is an RU collision and unuse factor reflecting the access point's point of view regarding the usage of random resource units defined in one or more previous trigger frames.

In specific embodiments, the collision and unuse factor is based on a number of unused random RUs and/or of a number of collided random RUs in the one or more previous trigger frames.

In other embodiments, the size of the contention window range is determined based on the indication received from the access point. Indeed, usually a [0, CWO] contention window range is used, meaning that only the size CWO can be determined.

In yet other embodiments, the method further comprises receiving a trigger frame from the access point in the communication network, the trigger frame reserving the transmission opportunity on the communication channel and defining resource units, RUs, forming the communication channel including the at least one random resource unit. According to a specific feature, the size of the contention window range is determined as a function of the number of random resource units defined in the received trigger frame.

In specific embodiments, the size of the contention window range is equal to $2^{TBD} \times CWO_{min}$, wherein TBD is the RU collision and unuse factor received from the access point and $CWO_{min}$ is a (predetermined) low boundary value.

In any improvement according to the invention, the random and/or scheduled resource units are accessed using OFDMA within the communication channel. This complies with 802.11ax multi-user uplink communication.

Another aspect of the invention relates to a wireless communication system having an access point and at least one communication device forming node as defined above.

Another aspect of the invention relates to a non-transitory computer-readable medium storing a program which, when executed by a microprocessor or computer system in a device of a communication network, causes the device to perform any method as defined above.

The non-transitory computer-readable medium may have features and advantages that are analogous to those set out above and below in relation to the methods and node devices.

Another aspect of the invention relates to a communication method in a communication network comprising a plurality of nodes, substantially as herein described with reference to, and as shown in, FIG. 8a, or FIG. 8b, or FIGS. 8a and 9, or FIGS. 8b and 10, or FIGS. 8a and 11, or FIGS. 8b and 11, or FIGS. 8a, 8b and 11, or FIGS. 8a, 8b, 9, 10 and 11, or FIG. 18, or FIG. 19, or FIG. 20, or FIG. 21, or FIGS. 14, 15, 16 and 18, or FIGS. 14, 15, 16 and 19, or FIGS. 9, 10, 11 and 21 of the accompanying drawings.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings.

FIGS. 3a, 3b and 3c illustrate the IEEE 802.11e EDCA involving access categories;

FIG. 6 shows a schematic representation a communication device or station in accordance with embodiments of the present invention;

FIG. 7 shows a schematic representation of a wireless communication device in accordance with embodiments of the present invention;

FIG. 9 illustrates exemplary communication lines according to the first exemplary embodiment of FIG. 8a;

DETAILED DESCRIPTION

The invention will now be described by means of specific non-limiting exemplary embodiments and by reference to the figures.

Figure 1:
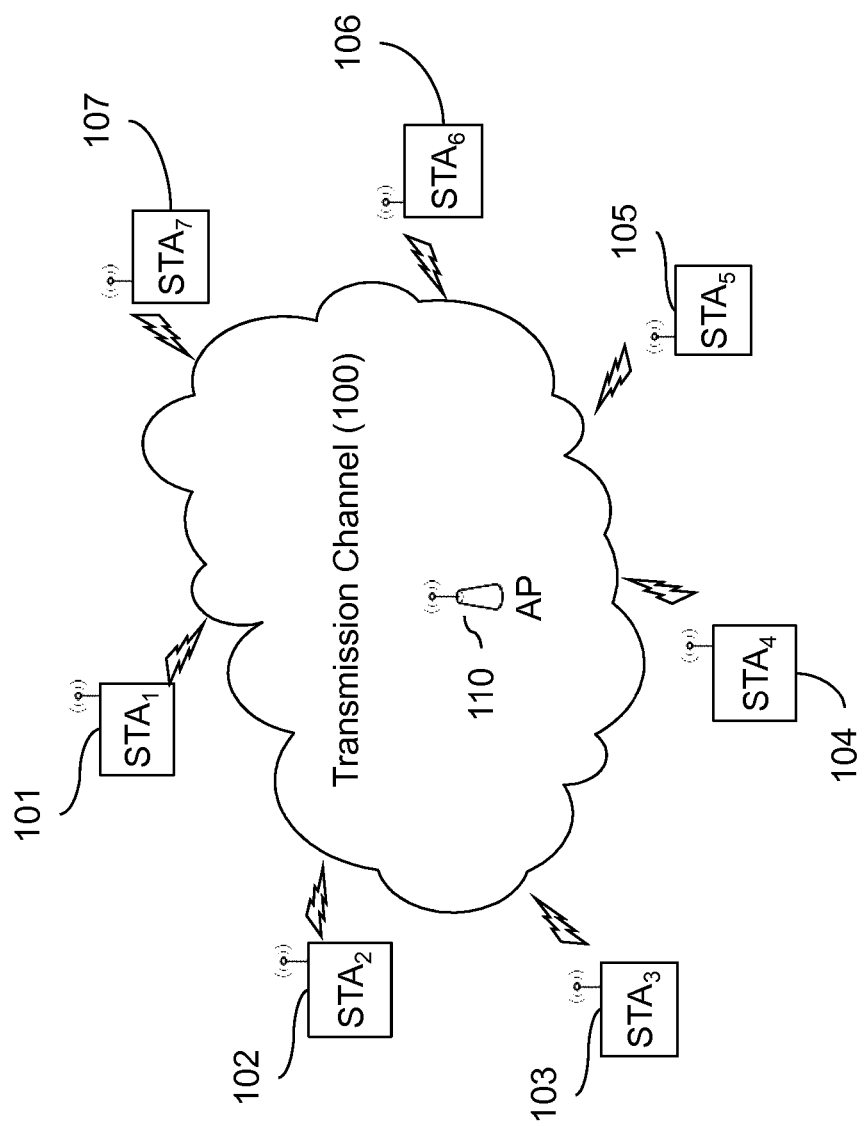
FIG. 1 illustrates a typical wireless communication system in which embodiments of the invention may be implemented.

FIG. 1 illustrates a communication system in which several communication nodes (or stations) 101-107 exchange data frames over a radio transmission channel 100 of a wireless local area network (WLAN), under the management of a central station, or access point (AP) 110. The radio transmission channel 100 is defined by an operating frequency band constituted by a single channel or a plurality of channels forming a composite channel.

Access to the shared radio medium to send data frames is based on the CSMA/CA technique, for sensing the carrier and avoiding collision by separating concurrent transmissions in space and time.

Carrier sensing in CSMA/CA is performed by both physical and virtual mechanisms. Virtual carrier sensing is achieved by transmitting control frames to reserve the medium prior to transmission of data frames.

Next, a source or transmitting node first attempts through the physical mechanism, to sense a medium that has been idle for at least one DIFS (standing for DCF InterFrame Spacing) time period, before transmitting data frames.

However, if it is sensed that the shared radio medium is busy during the DIFS period, the source node continues to wait until the radio medium becomes idle.

To access the medium, the node starts a countdown backoff counter designed to expire after a number of timeslots, chosen randomly in the contention window range [0, CW], CW (integer) being also referred to as the Contention Window size and defining the upper boundary of the backoff selection interval (contention window range). This backoff mechanism or procedure is the basis of the collision avoidance mechanism that defers the transmission time for a random interval, thus reducing the probability of collisions on the shared channel. After the backoff time period, the source node may send data or control frames if the medium is idle.

One problem of wireless data communications is that it is not possible for the source node to listen while sending, thus preventing the source node from detecting data corruption due to channel fading or interference or collision phenomena. A source node remains unaware of the corruption of the data frames sent and continues to transmit the frames unnecessarily, thus wasting access time.

The Collision Avoidance mechanism of CSMA/CA thus provides positive acknowledgement (ACK) of the sent data frames by the receiving node if the frames are received with success, to notify the source node that no corruption of the sent data frames occurred.

The ACK is transmitted at the end of reception of the data frame, immediately after a period of time called Short InterFrame Space (SIFS).

If the source node does not receive the ACK within a specified ACK timeout or detects the transmission of a different frame on the channel, it may infer data frame loss. In that case, it generally reschedules the frame transmission according to the above-mentioned backoff procedure.

To improve the Collision Avoidance efficiency of CSMA/CA, a four-way handshaking mechanism is optionally implemented. One implementation is known as the RTS/CTS exchange, defined in the 802.11 standard.

The RTS/CTS exchange consists in exchanging control frames to reserve the radio medium prior to transmitting data frames during a transmission opportunity called TXOP in the 802.11 standard as described below, thus protecting data transmissions from any further collisions.

Figure 2:
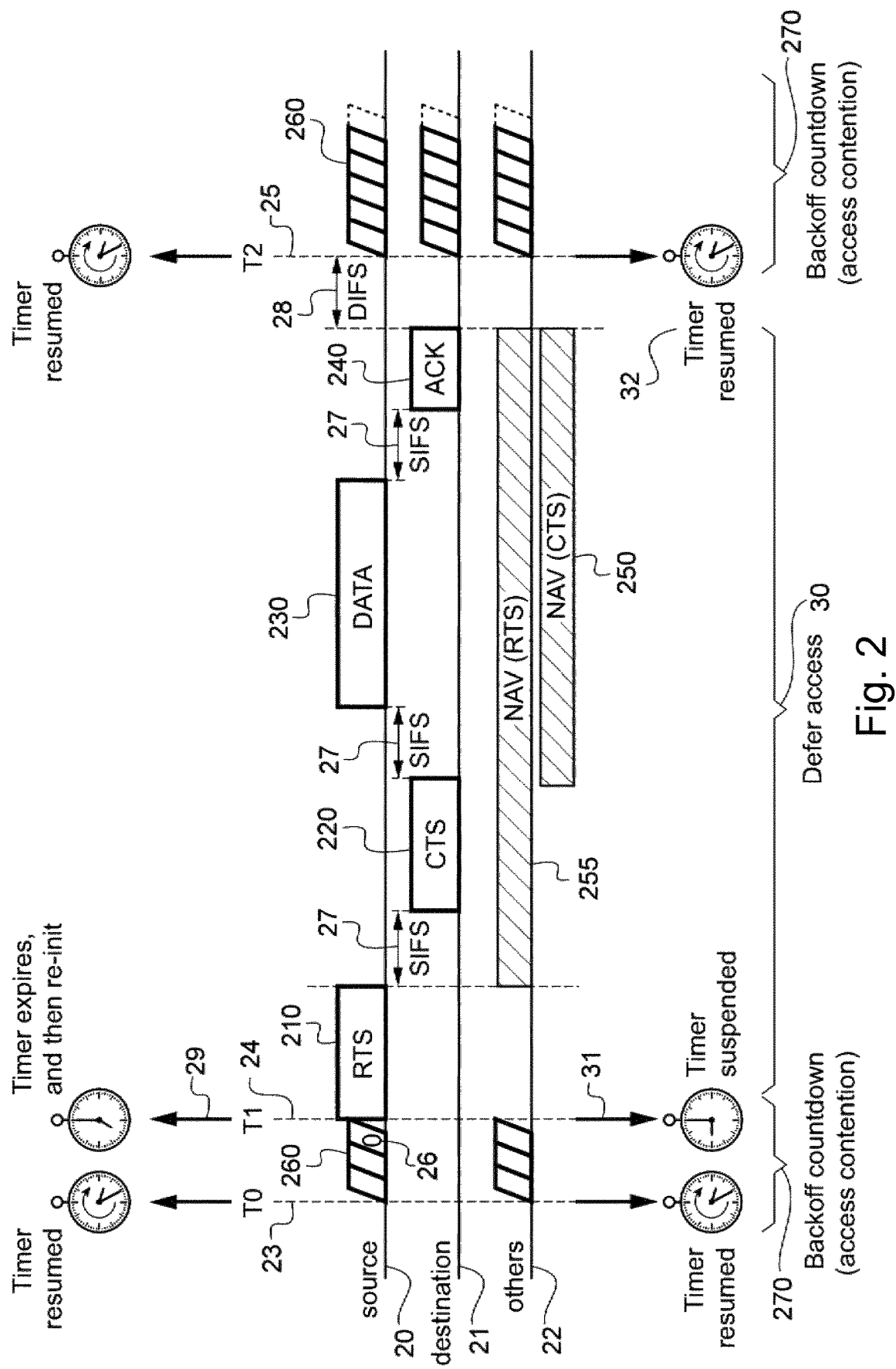
FIG. 2 is a timeline schematically illustrating a conventional communication mechanism according to the IEEE 802.11 standard.

FIG. 2 illustrates the behaviour of three groups of nodes during a conventional communication over a 20 MHz channel of the 802.11 medium: transmitting or source node 20, receiving or addressee or destination node 21 and other nodes 22 not involved in the current communication.

Upon starting the backoff process 270 prior to transmitting data, a station e.g. source node 20, initializes its backoff time counter to a random value as explained above. The backoff time counter is decremented once every time slot interval 260 for as long as the radio medium is sensed idle (countdown starts from T0, 23 as shown in the Figure).

Channel sensing is for instance performed using Clear-Channel-Assessment (CCA) signal detection which is a WLAN carrier sense mechanisms defined in the IEEE 802.11-2007 standards.

The time unit in the 802.11 standard is the slot time called 'aSlotTime' parameter. This parameter is specified by the PHY (physical) layer (for example, aSlotTime is equal to 9 μs for the 802.11n standard). All dedicated space durations (e.g. backoff) add multiples of this time unit to the SIFS value.

The backoff time counter is 'frozen' or suspended when a transmission is detected on the radio medium channel (countdown is stopped at T1, 24 for other nodes 22 having their backoff time counter decremented).

The countdown of the backoff time counter is resumed or reactivated when the radio medium is sensed idle anew, after a DIFS time period. This is the case for the other nodes at T2, 25 as soon as the transmission opportunity TXOP granted to source node 20 ends and the DIFS period 28 elapses. DIFS 28 (DCF inter-frame space) thus defines the minimum waiting time for a source node before trying to transmit some data. In practice, DIFS=SIFS+2*aSlotTime.

When the backoff time counter reaches zero (26) at T1, the timer expires, the corresponding node 20 requests access onto the medium in order to be granted a TXOP, and the backoff time counter is reinitialized 29 using a new random backoff value.

In the example of the Figure implementing the RTS/CTS scheme, at T1, the source node 20 that wants to transmit data frames 230 sends a special short frame or message acting as a medium access request to reserve the radio medium, instead of the data frames themselves, just after the channel has been sensed idle for a DIFS or after the backoff period as explained above.

The medium access request is known as a Request-To-Send (RTS) message or frame. The RTS frame generally includes the addresses of the source and receiving nodes ("destination 21") and the duration for which the radio medium is to be reserved for transmitting the control frames (RTS/CTS) and the data frames 230.

Upon receiving the RTS frame and if the radio medium is sensed as being idle, the receiving node 21 responds, after a SIFS time period 27 (for example, SIFS is equal to 16 μs for the 802.11n standard), with a medium access response, known as a Clear-To-Send (CTS) frame. The CTS frame also includes the addresses of the source and receiving nodes, and indicates the remaining time required for transmitting the data frames, computed from the time point at which the CTS frame starts to be sent.

The CTS frame is considered by the source node 20 as an acknowledgment of its request to reserve the shared radio medium for a given time duration.

Thus, the source node 20 expects to receive a CTS frame 220 from the receiving node 21 before sending data 230 using unique and unicast (one source address and one addressee or destination address) frames.

The source node 20 is thus allowed to send the data frames 230 upon correctly receiving the CTS frame 220 and after a new SIFS time period 27, in a transmission opportunity that is thus granted to it thanks to the RTS/CTS exchange.

An ACK frame 240 is sent by the receiving node 21 after having correctly received the data frames sent, after a new SIFS time period 27.

If the source node 20 does not receive the ACK 240 within a specified ACK Timeout (generally within the TXOP), or if it detects the transmission of a different frame on the radio medium, it reschedules the frame transmission using the backoff procedure anew.

Since the RTS/CTS four-way handshaking mechanism 210/220 is optional in the 802.11 standard, it is possible for the source node 20 to send data frames 230 immediately upon its backoff time counter reaching zero (i.e. at T1).

The requested time duration for transmission defined in the RTS and CTS frames defines the length of the granted transmission opportunity TXOP, and can be read by any listening node ("other nodes 22" in FIG. 2) in the radio network.

To do so, each node has in memory a data structure known as the network allocation vector or NAV to store the time duration for which it is known that the medium will remain busy. When listening to a control frame (RTS 210 or CTS 220) not addressed to itself, a listening node 22 updates its NAVs (NAV 255 associated with RTS and NAV 250 associated with CTS) with the requested transmission time duration specified in the control frame. The listening nodes 22 thus keep in memory the time duration for which the radio medium will remain busy.

Access to the radio medium for the other nodes 22 is consequently deferred 30 by suspending 31 their associated timer and then by later resuming 32 the timer when the NAV has expired.

This prevents the listening nodes 22 from transmitting any data or control frames during that period.

It is possible that receiving node 21 does not receive RTS frame 210 correctly due to a message/frame collision or to fading. Even if it does receive it, receiving node 21 may not always respond with a CTS 220 because, for example, its NAV is set (i.e. another node has already reserved the medium). In any case, the source node 20 enters into a new backoff procedure.

The RTS/CTS four-way handshaking mechanism is very efficient in terms of system performance, in particular with regard to large frames since it reduces the length of the messages involved in the contention process.

In detail, assuming perfect channel sensing by each communication node, collision may only occur when two (or more) frames are transmitted within the same time slot after a DIFS 28 (DCF inter-frame space) or when their own back-off counter has reached zero nearly at the same time T1. If both source nodes use the RTS/CTS mechanism, this collision can only occur for the RTS frames. Fortunately, such collision is early detected by the source nodes since it is quickly determined that no CTS response has been received.

As described above, the original IEEE 802.11 MAC always sends an acknowledgement (ACK) frame 240 after each data frame 230 received.

However, such collisions limit the optimal functioning of the radio network. As described above, simultaneous transmission attempts from various wireless nodes lead to collisions. The 802.11 backoff procedure was first introduced for the DCF mode as the basic solution for collision avoidance. In the emerging IEEE 802.11n/ac/ax standards, the backoff procedure is still used as the fundamental approach for supporting distributed access among mobile stations or nodes.

FIGS. 3a, 3b and 3c illustrate the IEEE 802.11e EDCA involving access categories, in order to improve the quality of service (QoS). In the original DCF standard, a communication node includes only one transmission queue/buffer. However, since a subsequent data frame cannot be transmitted until the transmission/retransmission of a preceding frame ends, the delay in transmitting/retransmitting the preceding frame prevents the communication from having QoS.

The IEEE 802.11e has overturned this deficiency in providing quality of service (QoS) enhancements to make more efficient use of the wireless medium.

This standard relies on a coordination function, called hybrid coordination function (HCF), which has two modes of operation: enhanced distributed channel access (EDCA) and HCF controlled channel access (HCCA).

EDCA enhances or extends functionality of the original access DCF method: EDCA has been designed for support of prioritized traffic similar to DiffServ (Differentiated Services), which is a protocol for specifying and controlling network traffic by class so that certain types of traffic get precedence.

EDCA is the dominant channel access mechanism in WLANs because it features a distributed and easily deployed mechanism.

The above deficiency of failing to have satisfactory QoS due to delay in frame retransmission has been solved with a plurality of transmission queues/buffers.

QoS support in EDCA is achieved with the introduction of four Access Categories (ACs), and thereby of four corresponding transmission/traffic queues or buffers (310). Of course, another number of traffic queues may be contemplated.

Each AC has its own traffic queue/buffer to store corresponding data frames to be transmitted on the network. The data frames, namely the MSDUs, incoming from an upper layer of the protocol stack are mapped onto one of the four AC queues/buffers and thus input in the mapped AC buffer.

Each AC has also its own set of channel access parameters or its "backoff parameters", and is associated with a priority value, thus defining traffic of higher or lower priority of MSDUs. Thus, there is a plurality of traffic queues for serving data traffic at different priorities.

That means that each AC (and corresponding buffer) acts as an independent DCF contending entity including its respective queue backoff engine 311. Thus, each queue backoff engine 311 is associated with a respective traffic queue for computing a respective queue backoff value to be used to contend for access to at least one communication channel in order to transmit data stored in the respective traffic queue.

It results that the ACs within the same communication node compete one with each other to access the wireless medium and to obtain a transmission opportunity, using the contention mechanism as explained above with reference to FIG. 2 for example.

Service differentiation between the ACs is achieved by setting different queue backoff parameters between the ACs, such as different contention window parameters ($CW_{min}$, $CW_{max}$), different arbitration interframe spaces (AIFS), and different transmission opportunity duration limits (TXOP_Limit).

With EDCA, high priority traffic has a higher chance of being sent than low priority traffic: a node with high priority traffic waits a little less (low CW) before it sends its packet, on average, than a node with low priority traffic.

The four AC buffers (310) are shown in FIG. 3a.

Buffers AC3 and AC2 are usually reserved for real-time applications (e.g., voice or video transmission). They have, respectively, the highest priority and the last-but-one highest priority.

Buffers AC1 and AC0 are reserved for best effort and background traffic. They have, respectively, the last-but-one lowest priority and the lowest priority.

Each data unit, MSDU, arriving at the MAC layer from an upper layer (e.g. Link layer) with a priority is mapped into an AC according to mapping rules. FIG. 3b shows an example of mapping between eight priorities of traffic class (User Priorities or UP, 0-7 according IEEE 802.1d) and the four ACs. The data frame is then stored in the buffer corresponding to the mapped AC.

When the backoff procedure for a traffic queue (or an AC) ends, the MAC controller (reference 704 in FIG. 7 below) of the transmitting node transmits a data frame from this traffic queue to the physical layer for transmission onto the wireless communication network.

Since the ACs operate concurrently in accessing the wireless medium, it may happen that two ACs of the same communication node have their backoff ending simultaneously. In such a situation, a virtual collision handler (312) of the MAC controller operates a selection of the AC having the highest priority (as shown in FIG. 3b) between the conflicting ACs, and gives up transmission of data frames from the ACs having lower priorities.

Then, the virtual collision handler commands those ACs having lower priorities to start again a backoff operation using an increased CW value.

FIG. 3c illustrates configurations of a MAC data frame and a QoS control field (300) included in the header of the IEEE 802.11e MAC frame.

The MAC data frame also includes, among other fields, a Frame Control header (301) and a frame body (302).

As represented in the Figure, the QoS control field 300 is made of two bytes, including the following information items:

- Bits B0 to B3 are used to store a traffic identifier (TID) which identifies a traffic stream. The traffic identifier takes the value of the transmission priority value (User Priority UP, value between 0 and 7—see FIG. 3b) corresponding to the data conveyed by the data frame or takes the value of a traffic stream identifier (TSID, value between 8 and 15) for other data streams;
- Bit B4 is set to 1 and is not detailed here;
- Bits B5 and B6 define the ACK policy subfield which specifies the acknowledgment policy associated with the data frame. This subfield is used to determine how the data frame has to be acknowledged by the receiving node; normal ACK, no ACK or Block ACK.

"Normal ACK" refers to the case where the transmitting node or source node requires a conventional acknowledgment to be sent (by the receiving node) for each data frame, after a short interframe space (SIFS) period following the transmission of the data frame.

"No ACK" refers to the case where the source node does not require acknowledgment. That means that the receiving node takes no action upon receipt of the data frame.

"Block ACK" refers to an acknowledgment per block of MSDUs. The Block Ack scheme allows two or more data frames 230 to be transmitted before a Block ACK frame is returned to acknowledge the receipt of the data frames. The Block ACK increases communication efficiency since only one signaling ACK frame is needed to acknowledge a block of frames, while every ACK frame originally used has a significant overhead for radio synchronization. The receiving node takes no action immediately upon receiving the last data frame, except the action of recording the state of reception in its scoreboard context. With such a value, the source node is expected to send a Block ACK request (BAR) frame, to which the receiving node responds using the procedure described below;

- Bit B7 is reserved (not used by the current 802.11 standards); and
- Bits B8-B15 indicate the amount of buffered traffic for a given TID at the non-AP station sending this frame. The AP may use this information to determine the next TXOP duration it will grant to the station. A queue size of 0 indicates the absence of any buffered traffic for that TID.

Figure 4:
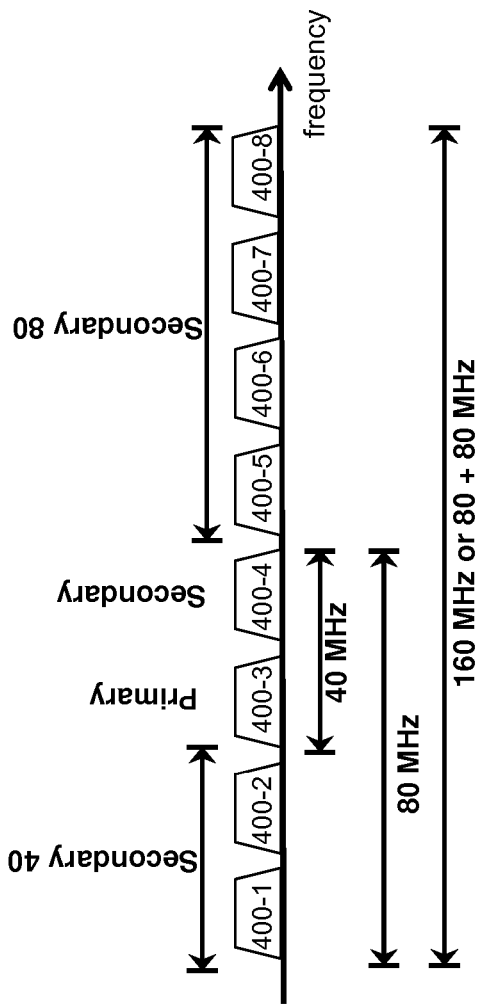
FIG. 4 illustrates 802.11ac channel allocation that support channel bandwidth of 20 MHz, 40 MHz, 80 MHz or 160 MHz as known in the art.

To meet the ever-increasing demand for faster wireless networks to support bandwidth-intensive applications, 802.11ac is targeting larger bandwidth transmission through multi-channel operations. FIG. 4 illustrates 802.11ac channel allocation that support composite channel bandwidth of 20 MHz, 40 MHz, 80 MHz or 160 MHz IEEE 802.11ac introduces support of a restricted number of predefined subsets of 20 MHz channels to form the sole predefined composite channel configurations that are available for reservation by any 802.11ac node on the wireless network to transmit data.

The predefined subsets are shown in the Figure and correspond to 20 MHz, 40 MHz, 80 MHz, and 160 MHz channel bandwidths, compared to only 20 MHz and 40 MHz supported by 802.11n. Indeed, the 20 MHz component channels 300-1 to 300-8 are concatenated to form wider communication composite channels.

In the 802.11ac standard, the channels of each predefined 40 MHz, 80 MHz or 160 MHz subset are contiguous within the operating frequency band, i.e. no hole (missing channel) in the composite channel as ordered in the operating frequency band is allowed.

The 160 MHz channel bandwidth is composed of two 80 MHz channels that may or may not be frequency contiguous. The 80 MHz and 40 MHz channels are respectively composed of two frequency adjacent or contiguous 40 MHz and 20 MHz channels, respectively. However the present invention may have embodiments with either composition of the channel bandwidth, i.e. including only contiguous channels or formed of non-contiguous channels within the operating band.

A node is granted a TxOP through the enhanced distributed channel access (EDCA) mechanism on the "primary channel" (300-3). Indeed, for each composite channel having a bandwidth, 802.11ac designates one channel as "primary" meaning that it is used for contending for access to the composite channel. The primary 20 MHz channel is common to all nodes (STAs) belonging to the same basic set, i.e. managed by or registered to the same local Access Point (AP).

However, to make sure that no other legacy node (i.e. not belonging to the same set) uses the secondary channels, it is provided that the control frames (e.g. RTS frame/CTS frame) reserving the composite channel are duplicated over each 20 MHz channel of such composite channel.

As addressed earlier, the IEEE 802.11ac standard enables up to four, or even eight, 20 MHz channels to be bound. Because of the limited number of channels (19 in the 5 GHz band in Europe), channel saturation becomes problematic. Indeed, in densely populated areas, the 5 GHz band will surely tend to saturate even with a 20 or 40 MHz bandwidth usage per Wireless-LAN cell.

Developments in the 802.11ax standard seek to enhance efficiency and usage of the wireless channel for dense environments.

In this perspective, one may consider multi-user transmission features, allowing multiple simultaneous transmissions to different users in both downlink and uplink directions. In the uplink, multi-user transmissions can be used to mitigate the collision probability by allowing multiple nodes to simultaneously transmit.

To actually perform such multi-user transmission, it has been proposed to split a granted 20 MHz channel (300-1 to 300-4) into sub-channels 410 (elementary sub-channels), also referred to as sub-carriers or resource units (RUs), that are shared in the frequency domain by multiple users, based for instance on Orthogonal Frequency Division Multiple Access (OFDMA) technique.

This is illustrated with reference to FIG. 5.

The multi-user feature of OFDMA allows the AP to assign different RUs to different nodes in order to increase competition. This may help to reduce contention and collisions inside 802.11 networks.

Contrary to downlink OFDMA wherein the AP can directly send multiple data to multiple stations (supported by specific indications inside the PLOP header), a trigger mechanism has been adopted for the AP to trigger uplink communications from various nodes.

To support an uplink multi-user transmission (during a pre-empted TxOP), the 802.11ax AP has to provide signaling information for both legacy stations (non-802.11ax nodes) to set their NAV and for 802.11ax nodes to determine the Resource Units allocation.

In the following description, the term legacy refers to non-802.11ax nodes, meaning 802.11 nodes of previous technologies that do not support OFDMA communications.

Figure 5:
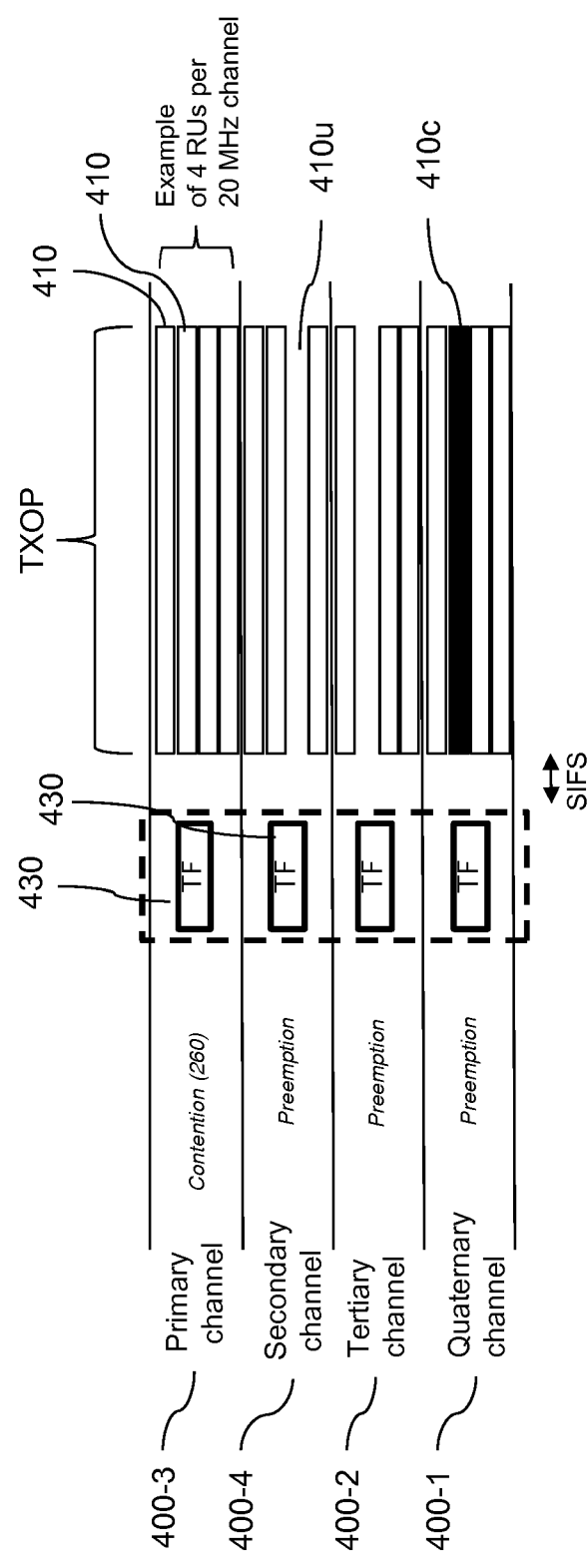
FIG. 5 illustrates an example of 802.11ax uplink OFDMA transmission scheme, wherein the AP issues a Trigger Frame for reserving a transmission opportunity of OFDMA sub-channels (resource units) on an 80 MHz channel as known in the art.

As shown in the example of FIG. 5, the AP sends a trigger frame (TF) 430 to the targeted 802.11ax nodes. The bandwidth or width of the targeted composite channel is signaled in the TF frame, meaning that the 20, 40, 80 or 160 MHz value is added. The TF frame is sent over the primary 20 MHz channel and duplicated (replicated) on each other 20 MHz channels forming the targeted composite channel. As described above for the duplication of control frames, it is expected that every nearby legacy node (non-HT or 802.11ac nodes) receiving the TF on its primary channel, then sets its NAV to the value specified in the TF frame in order. This prevents these legacy nodes from accessing the channels of the targeted composite channel during the TXOP.

Based on an AP's decision, the trigger frame TF may define a plurality of resource units (RUs) 410, or "Random RUs", which can be randomly accessed by the nodes of the network. In other words, Random RUs designated or allocated by the AP in the TF may serve as basis for contention between nodes willing to access the communication medium for sending data. A collision occurs when two or more nodes attempt to transmit at the same time over the same RU.

A trigger frame that can be randomly accessed is referred to as a trigger frame for random access (TF-R). A TF-R may be emitted by the AP to allow multiple nodes to perform UL MU (UpLink Multi-User) random access to obtain an RU for their UL transmissions.

The trigger frame TF may also designate Scheduled resource units, in addition or in replacement of the Random RUs. Scheduled RUs may be reserved by the AP for certain nodes in which case no contention for accessing such RUs is needed for these nodes. Such RUs and their corresponding scheduled nodes are indicated in the trigger frame. For instance, a node identifier, such as the Association ID (AID) assigned to each node upon registration, is added in association with each Scheduled RU in order to explicitly indicate the node that is allowed to use each Scheduled RU.

An AID equal to 0 may be used to identify random RUs.

The multi-user feature of OFDMA allows the AP to assign different RUs to different nodes in order to increase competition. This may help to reduce contention and collisions inside 802.11 networks.

Also the AP may assign Random RUs to a specific group of nodes, which thus compete for contending for access to these Random RUs. For instance, the AP may specify a node group ID, such as a BSSID (standing for "Basic Service Set Identification") in case the AP handles a plurality of BSSs.

In the example of FIG. 5, each 20 MHz channel (400-1, 400-2, 400-3 or 400-4) is sub-divided in frequency domain into four sub-channels or RUs 410, typically of size 5 Mhz.

Of course the number of RUs splitting a 20 MHz channel may be different from four. For instance, between two to nine RUs may be provided (thus each having a size between 10 MHz and about 2 MHz).

Once the nodes have used the RUs to transmit data to the AP, the AP responds with an acknowledgment (not show in the Figure) to acknowledge the data on each RU.

Document IEEE 802.11-15/1105 provides an exemplary random allocation procedure that may be used by the nodes to access the Random RUs indicated in the TF. This random allocation procedure is based on a new backoff counter, referred below to as the OFDMA or RU backoff value (or OBO), inside the 802.11ax nodes for allowing a dedicated contention when accessing an RU to send data.

The OFDMA backoff value OBO to contend for access to the random RUs is randomly selected within the contention window range [0, CWO] wherein CWO is the contention window size and is defined in a selection range [$CWO_{min}$, $CWO_{max}$].

The RU backoff counter may for instance be the same as a conventional backoff counter, i.e. be a simple copy thereof.

Each node STA1 to STAn is a transmitting node with regards to receiving AP, and as a consequence, each node has an active RU backoff engine separate from the one or more queue backoff engines, for computing an RU backoff value (OBO) to be used to contend for access to at least one random resource unit splitting a transmission opportunity granted on the communication channel, in order to transmit data stored in one or either traffic queue AC.

Below RU backoff and OBO backoff are synonymous and refer to the same backoff engine used to contend for access to the Random RUs.

The random allocation procedure comprises, for a node of a plurality of nodes having an active RU backoff value OBO, a first step of determining from the trigger frame the sub-channels or RUs of the communication medium available for contention, a second step of verifying if the value of the active RU backoff value OBO local to the considered node is not greater than a number of detected-as-available random RUs, and then, in case of successful verification, a third step of randomly selecting a RU among the detected-as-available RUs for sending data. In case of second step is not verified, a fourth step (instead of the third) is performed in order to decrement the RU backoff value OBO by the number of detected-as-available RUs.

As shown in the Figure, some Resource Units may not be used (410u) because no node with an RU backoff value OBO less than the number of available random RUs has randomly selected one of these RUs, whereas some other are collided (as example 410c) because two of these nodes have randomly selected the same RU.

The conventional handling of random RUs is not satisfactory. There is a need to provide fair use of the network in dense wireless environments with more efficient allocation schemes used to allocate the OFDMA RUs to the nodes.

Few allocation schemes are known in the prior art. For instance, the publication "Generalized CSMA/CA for OFDMA Systems" (Hojoong Kwon et al. [IEEE GLOBECOM 2008, ISBN 978-1-4244-2324-8]) proposed a CSMA/CA protocol for OFDMA systems providing a random access scheme based on backoff mechanism.

Unfortunately, the proposed scheme is not compliant with the conventional 802.11 random access. In particular, this is because the proposed scheme does not keep considering the 20 MHz channel as the main communication entity to allocate to the nodes. Furthermore, the use of the RUs is not optimum: as a random access, some collisions may occur on some RUs and some other RUs may remain empty or unused even if some nodes have data to transmit (because their associated backoff is not equal to zero).

More appropriate setting and updating of parameters for managing the RU backoff engine is proposed to be used in some improvements according to the invention. An idea of these improvements is to determine one or more RU backoff parameters based on one or more queue backoff parameters of the queue backoff engines; and then to compute the RU backoff value from the determined one or more RU backoff parameters. This approach may thus take into account the prioritization of un-managed traffic towards the AP to improve the management of the RU backoff parameters with regards to the pending traffic.

Also the coexistence of OFDMA (or RU) backoff scheme, when implemented, and EDCA queue backoff scheme for CSMA/CA contention may make the handling of Random RUs more difficult.

Other improvements according to the present invention provide improved wireless communications with more efficient use of the OFDMA Random RUs while limiting the risks of collisions on these RUs. All of this is preferably kept compliant with 802.11 standards.

An exemplary wireless network is an IEEE 802.11ac network (and upper versions). However, embodiments of the invention apply to any wireless network comprising an access point AP 110 and a plurality of nodes 101-107 transmitting data to the AP through a multi-user transmission. Embodiments of the invention are especially suitable for data transmission in an IEEE 802.11ax network (and future versions) requiring better use of bandwidth.

An exemplary management of multi-user transmission in such a network has been described above with reference to FIGS. 1 to 4.

First embodiments of first improvements according to the invention provide a dynamic control by the AP of parameters used by the nodes to contend for access to the Random RUs. Following one or more trigger frames reserving one or more transmission opportunities on at least one communication channel of the wireless network, each trigger frame defining resource units forming the communication channel and including a plurality of random resource units that the nodes access using a contention scheme, the wireless communication method according to the first embodiments has specific steps.

At the access point AP, they include:

determining statistics on random resource units not used by the nodes during the one or more transmission opportunities and/or random resource units on which nodes collide during the one or more transmission opportunities;

determining a correcting or "TBD" parameter based on the determined statistics, sending, to the nodes, a next trigger frame for reserving a next transmission opportunity, the next trigger frame including the determined TBD parameter.

At the nodes, they include:

determining, based on the received TBD parameter and on one random parameter local to the node, one of the random resource units (this step corresponds to the way the nodes contend for access to the random resource units according to the first embodiments of the invention);

transmitting data to the access point using the determined random resource unit.

All of this shows that a correcting or TBD parameter is exchanged between the access point and the nodes. On one hand, it is used by the nodes to adjust how the local random parameter impacts the choice of the random RUs to be used. On the other hand, this TBD parameter is calculated by the access point based on statistics related to the use of the Random RUs (unused or collided RUs) in one or more previous transmission opportunities. This is because the access point has an overall view of the network, as the nodes only communicate with it.

It results that the contention scheme used by the nodes to access the Random RUs can be dynamically adapted to the network environment. As a consequence, more efficient usage of the network bandwidth (of the RUs) with limited risks of collisions can be achieved.

Second embodiments of the first improvements provide a progressive contention scheme in the nodes for access to the Random RUs. Following a trigger frame reserving a transmission opportunity on at least one communication channel of the wireless network, the trigger frame defining resource units forming the communication channel including a plurality of random resource units that the nodes access using a contention scheme, the wireless communication method according to the second embodiments has specific steps.

At the nodes (not the AP), they include:

determining a first time instant based on one random parameter local to the node;

sending padding (or dummy) data on a first one of the random resource units from the determined first time instant up to the end of a predetermined time window after having received the trigger frame (the determining and sending steps thus forming a mechanism for contending for access to the RUs according to embodiments of the invention);

starting transmitting data to the access point on the first random resource unit when the predetermined time window ends (it defines a predefined second time instant).

This new contention mechanism particularly applies to OFDMA RUs. This is because, due to synchronization requirements between the OFDM symbols, the nodes implementing the second embodiments of the invention only send padding data. The padding data are sent up to a time point (predefined second time instant) at which all the nodes having data to transmit simultaneously start transmitting the data. Synchronization is thus saved, while having an efficient contention scheme to access the Random RUs.

Note that the nodes being allocated with a respective Scheduled RU in the communication channel should also wait for the end of the time window before transmitting their data. "Wait" may also mean sending padding data on the Scheduled RU.

The first and second embodiments can be implemented separately, or in combination as further described below to provide a progressive contention mechanism with dynamic adaptation to the network conditions.

Second improvements according to the invention provide a self-control of the nodes for accessing the Random RUs, using an RU backoff value computed by an RU backoff engine. Following a trigger frame reserving a transmission opportunity on at least one communication channel of the wireless network, the trigger frame defining resource units forming the communication channel including a plurality of random resource units that the nodes access using a contention scheme, the wireless communication method according to the second improvements has specific steps at one of the nodes.

Based on a current RU backoff value, the node accesses a random resource unit to transmit data to the access point; and after having transmitted the data, the node computes a new RU backoff value to contend for new access to random resource units (e.g. in a next trigger frame). The RU backoff value is a value randomly selected within a contention window range defined by a contention window size, and the contention window size CWO is updated depending on a success or failure in transmitting the data.

As described below, an approach for the second improvements is to double the contention window size CWO in case of transmission failure.

This approach restricts transmissions in case of collisions, which in turn reduces the probability of collisions and thus improves use of the communication network.

The above first and second improvements show two modes to drive the value CWO defining the contention window size at the node, in order to control the RU backoff value OBO and thus the access to the random RUs: the first improvements refer to an AP-initiated mode in which the access point sends a correcting parameter, noted below TBD parameter, to the nodes to drive them in defining their own contention window size; in the second improvements, each node is autonomous on computing its own contention window size CWO through a fully local mode.

The inventors have noticed that the relative efficiency between these two modes can change depending on network conditions, such as the number of available random RUs or the number of nodes competing for accessing the random RUs.

Figure 22:
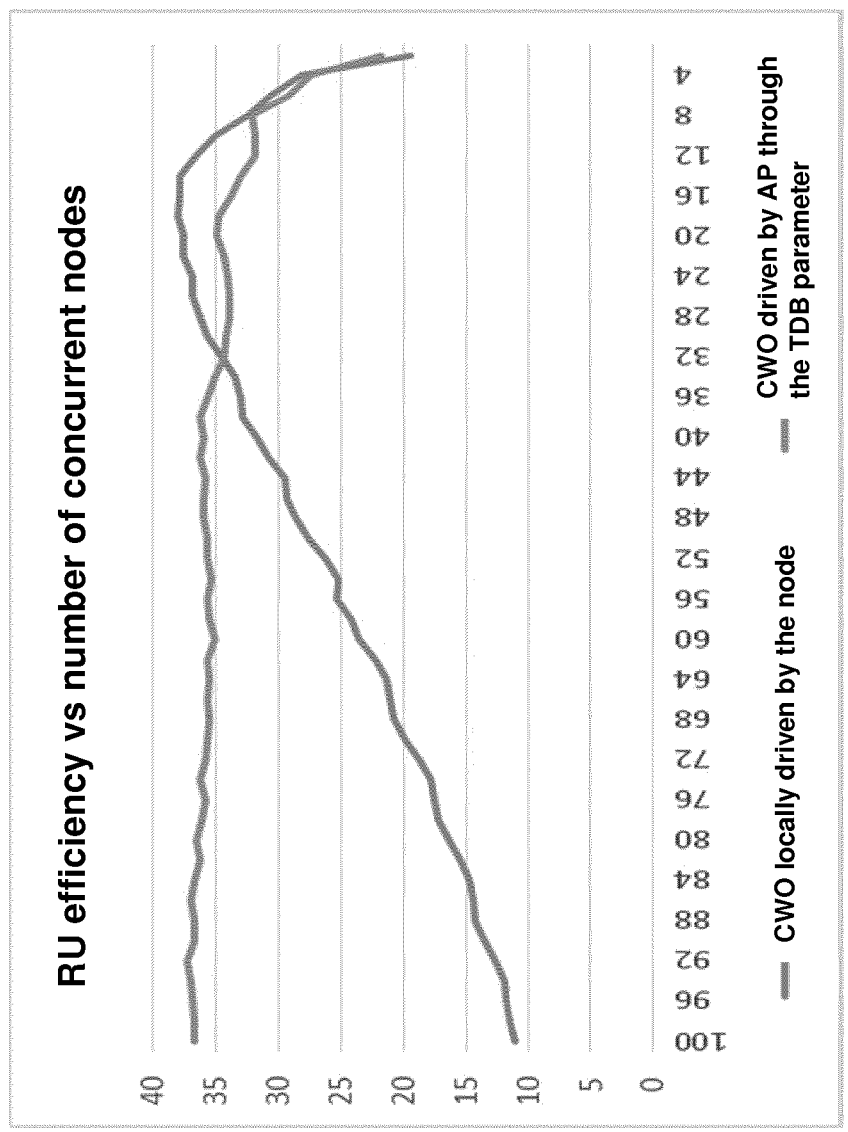
FIG. 22 illustrates, using curves obtained by simulation, the evolution of a random-RU efficiency metric depending on the number of the nodes contending for accessing the random RUs.

FIG. 22 illustrates simulation curves of the evolution of a random-RU use efficiency metric depending on the number of the competing nodes. One may note that in some network configurations, the fully local mode is more efficient than the AP-initiated mode, and that in other network configurations, the balance of efficiency is reversed.

In this context, the invention also provides a way to efficiently switch between the two modes in order to obtain more efficient usage of the network bandwidth (of the RUs) with limited risks of collisions. To do so, the access point may:

determining use statistics on the use of the random resource units by the nodes during the one or more transmission opportunities;

determine, based on the determined use statistics, a TBD parameter to drive nodes in defining their own contention window size;

evaluate a measure of use efficiency of the random resource units based on the determined use statistics; and deciding, based on the evaluated use efficiency measure, to transmit or not, to the nodes, the determined TBD parameter within a next trigger frame for reserving a next transmission opportunity.

Correspondingly, any node may:

determine whether or not the received trigger frame includes a TBD parameter to drive the node in defining its own contention window size;

in case of positive determining, compute a new contention window size based on the received TBD parameter; otherwise, use a local contention window size as new contention window size, to contend for access to the random resource units splitting the transmission opportunity; and then transmit data to the access point upon accessing one of the random resource units.

The controlled switch between the two modes for computing CWO at the nodes thus takes advantage of an overall analysis by the access point (through the TBD parameter) or of specificities local to each node, depending on which may provide the better use of the random RUs. The controlled switch dynamically adapts thanks to an analysis of use statistics on the use of the random RUs of the one or more transmission opportunities reserved by the one or more trigger frames.

As a consequence, the nodes dynamically adapt the computation of their contention window sizes, as they receive or not the TBD parameter.

FIG. 6 schematically illustrates a communication device 600 of the radio network 100, configured to implement at least one embodiment of the present invention. The communication device 600 may preferably be a device such as a micro-computer, a workstation or a light portable device. The communication device 600 comprises a communication bus 613 to which there are preferably connected:

a central processing unit 611, such as a microprocessor, denoted CPU;

a read only memory 607, denoted ROM, for storing computer programs for implementing the invention;

a random access memory 612, denoted RAM, for storing the executable code of methods according to embodiments of the invention as well as the registers adapted to record variables and parameters necessary for implementing methods according to embodiments of the invention; and at least one communication interface 602 connected to the radio communication network 100 over which digital data packets or frames or control frames are transmitted, for example a wireless communication network according to the 802.11ax protocol. The frames are written from a FIFO sending memory in RAM 612 to the network interface for transmission or are read from the network interface for reception and writing into a FIFO receiving memory in RAM 612 under the control of a software application running in the CPU 611.

Optionally, the communication device 600 may also include the following components:

a data storage means 604 such as a hard disk, for storing computer programs for implementing methods according to one or more embodiments of the invention;

a disk drive 605 for a disk 606, the disk drive being adapted to read data from the disk 606 or to write data onto said disk;

a screen 609 for displaying decoded data and/or serving as a graphical interface with the user, by means of a keyboard 610 or any other pointing means.

The communication device 600 may be optionally connected to various peripherals, such as for example a digital camera 608, each being connected to an input/output card (not shown) so as to supply data to the communication device 600.

Preferably the communication bus provides communication and interoperability between the various elements included in the communication device 600 or connected to it. The representation of the bus is not limiting and in particular the central processing unit is operable to communicate instructions to any element of the communication device 600 directly or by means of another element of the communication device 600.

The disk 606 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to the invention to be implemented.

The executable code may optionally be stored either in read only memory 607, on the hard disk 604 or on a removable digital medium such as for example a disk 606 as described previously. According to an optional variant, the executable code of the programs can be received by means of the communication network 603, via the interface 602, in order to be stored in one of the storage means of the communication device 600, such as the hard disk 604, before being executed.

The central processing unit 611 is preferably adapted to control and direct the execution of the instructions or portions of software code of the program or programs according to the invention, which instructions are stored in one of the aforementioned storage means. On powering up, the program or programs that are stored in a non-volatile memory, for example on the hard disk 604 or in the read only memory 607, are transferred into the random access memory 612, which then contains the executable code of the program or programs, as well as registers for storing the variables and parameters necessary for implementing the invention.

In a preferred embodiment, the apparatus is a programmable apparatus which uses software to implement the invention. However, alternatively, the present invention may be implemented in hardware (for example, in the form of an Application Specific Integrated Circuit or ASIC).

FIG. 7 is a block diagram schematically illustrating the architecture of a communication device or node 600, either the AP 110 or one of nodes 100-107, adapted to carry out, at least partially, the invention. As illustrated, node 600 comprises a physical (PHY) layer block 703, a MAC layer block 702, and an application layer block 701.

The PHY layer block 703 (here an 802.11 standardized PHY layer) has the task of formatting, modulating on or demodulating from any 20 MHz channel or the composite channel, and thus sending or receiving frames over the radio medium used 100, such as 802.11 frames, for instance medium access trigger frames TF 430 to reserve a transmission slot, MAC data and management frames based on a 20 MHz width to interact with legacy 802.11 stations, as well as of MAC data frames of OFDMA type having smaller width than 20 MHz legacy (typically 2 or 5 MHz) to/from that radio medium.

The MAC layer block or controller 702 preferably comprises a MAC 802.11 layer 704 implementing conventional 802.11ax MAC operations, and an additional block 705 for carrying out, at least partially, the invention. The MAC layer block 702 may optionally be implemented in software, which software is loaded into RAM 512 and executed by CPU 511.

Preferably, the additional block, referred as to random RU procedure module 705 for controlling access to OFDMA resource units (sub-channels), implements the part of the invention that regards node 600, i.e. transmitting operations for a source node, receiving operations for a receiving node, or operations for the AP.

For instance and not exhaustively, the operations for the AP may include gathering statistics on use of the Random RUs, computing a correcting "TBD" parameter and optionally a time window size, adjusting the number of Random RUs; the operations for a node different from the AP may include using such information from the AP to compute a contention window size and thus to contend for access to the RUs, calculating a local RU backoff value for such contention, sensing use or not of the Random RUs before accessing one of them, at the nodes.

MAC 802.11 layer 704 and random RU procedure module 705 interact one with the other in order to provide management of the queue backoff engines and RU backoff engines.

On top of the Figure, application layer block 701 runs an application that generates and receives data packets, for example data packets of a video stream. Application layer block 701 represents all the stack layers above MAC layer according to ISO standardization.

Embodiments of the present invention are now illustrated using various exemplary embodiments. Although the proposed examples use the trigger frame 430 (see FIG. 5*a*) sent by an AP for a multi-user uplink transmissions, equivalent mechanisms can be used in a centralized or in an adhoc environment (i.e. without an AP).

Figure 11:
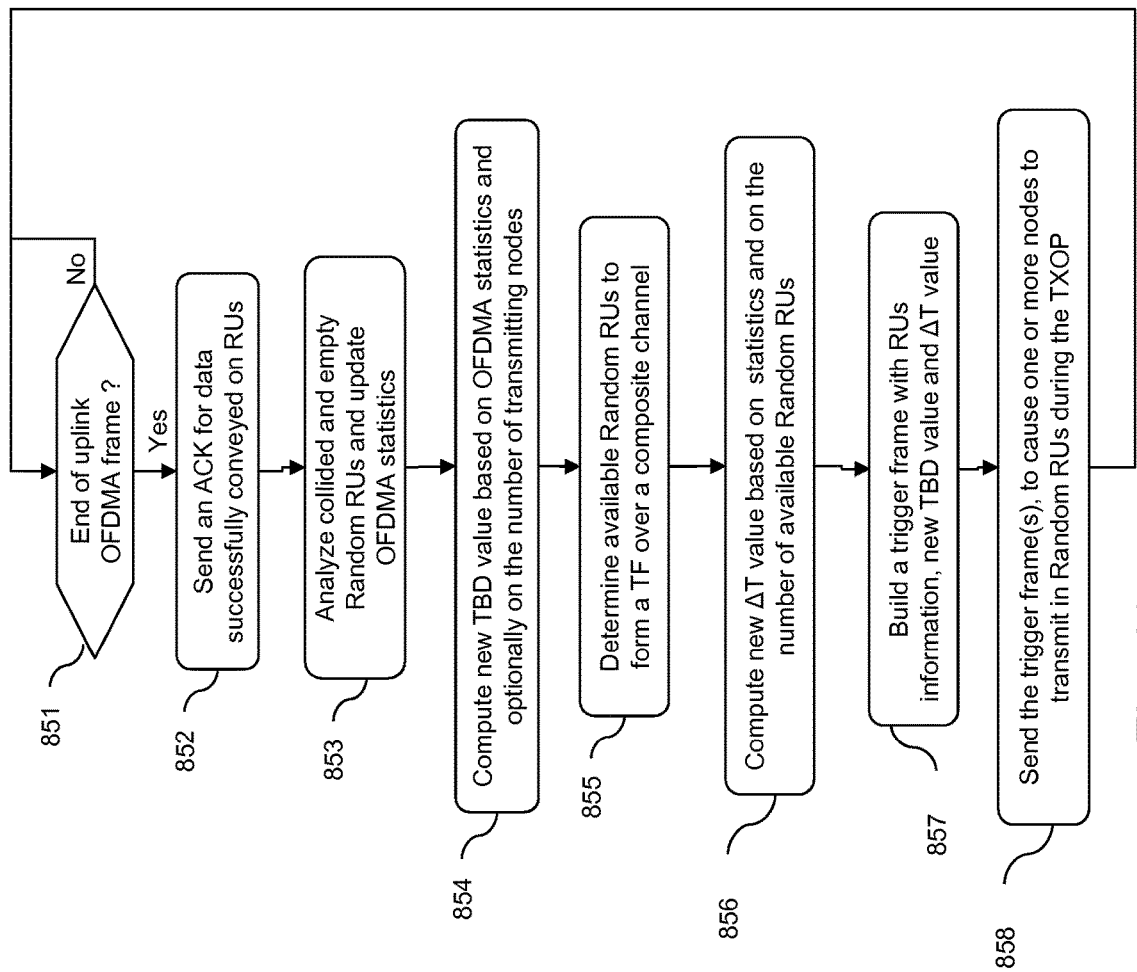
FIG. 11 illustrates, using a flowchart, general steps of a wireless communication method at the AP adapted to the first and/or second exemplary embodiments.

First and second embodiments of first improvements are illustrated from the nodes' perspective through FIG. 8 and from the AP's perspective through FIG. 11. In these exemplary embodiments, the trigger frame includes a correcting or TBD parameter used to optimize the OFDMA Random RUs allocation for the next OFDMA TXOP.

Figure 8A:
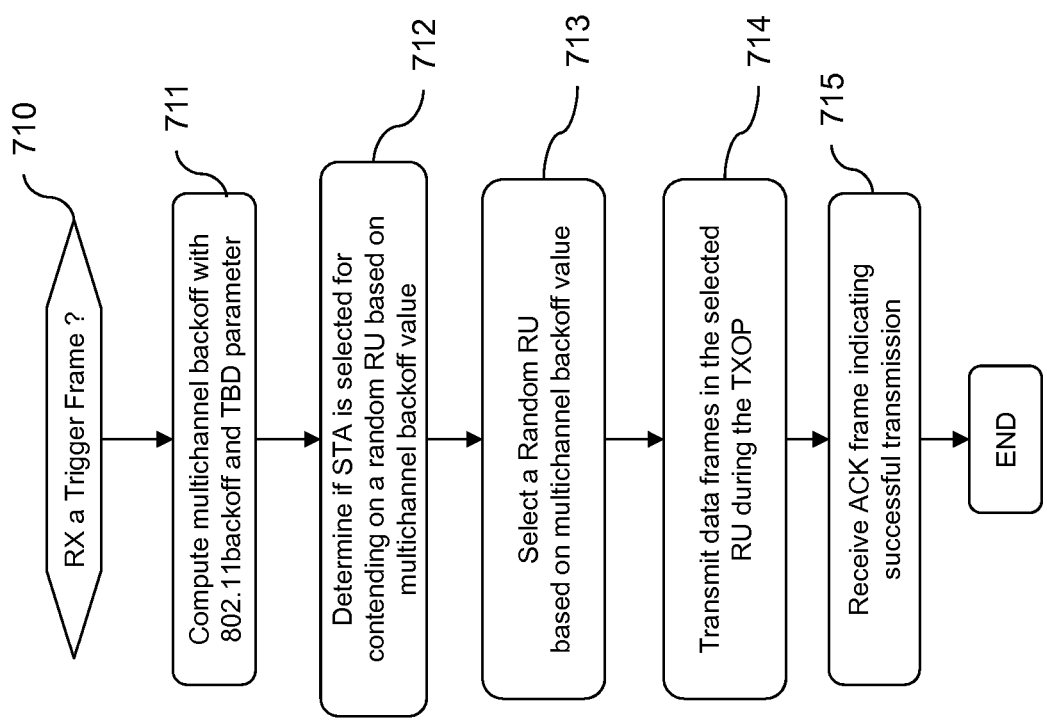
FIG. 8a illustrates, using a flowchart, general steps of a wireless communication method at one of the nodes (not the AP) according to a first exemplary embodiment of the invention.

FIG. 8*a* illustrates, using a flowchart, general steps of a wireless communication method at one of the nodes (not the AP) according to a first exemplary embodiment of the invention. In this first exemplary embodiment, the random resource units (Random RUs) have respective unique indexes (for instance an ordering index), and the correcting parameter TBD is applied to a local random parameter to obtain a result, the result identifying the index of the random resource unit to be used by the node to transmit the data to the access point.

In this example, the random parameter local to the node is based on the conventional backoff value (or counter) of the node used to contend for access to the communication channel (i.e. a value corresponding to the number of timeslots the node waits before accessing the communication medium).

In other words, the correcting parameter TBD is used (with the local backoff counter) to allocate the Random RUs.

Upon receiving of a trigger frame from the AP (710), the node STA extracts the correcting parameter TBD value and the number of RUs subject to random allocation, from the trigger frame.

By default, a transmitting 802.11 node has its own (local) backoff counter different from zero (otherwise it would have accessed the medium).

In this first exemplary embodiment, the transmitting node computes a multichannel backoff value (i.e. a local random parameter or OBO for OFDMA BackOff counter) based on the current value of the standard 802.11 backoff counter value and based on the extracted correcting parameter TBD value. This is step 711.

For instance, to speed up the backoff decrement over time as explained below (step 712) and to tend to allocate all the Random RUs, the local multichannel backoff value OBO may be equal to the standard 802.11 backoff value divided by the correcting parameter TBD value. A rounding operation is used to obtain an integer, if appropriate. This approach can be implemented in a simple way, which is particularly adapted to low resource nodes.

Of course, operations other than a division (e.g. multiplication, more complex mathematical functions) may be used, and the TBD parameter sent by the AP can be adapted to the operation used by the nodes.

To increase the number of nodes (i.e. multichannel backoff values) that can access the Random RUs, all the multichannel backoff values OBO below a predefined threshold (for instance N×M where N is an integer and M is the number of Random RUs) can be kept and a modulo M operation can be applied to them in order to map each kept multichannel backoff value OBO on one of the Random RUs. Depending on the network conditions, this approach may increase the risk of collisions on the Random RUs.

Once the local multichannel backoff value OBO has been computed, step 712 consists for the node to determine whether or not it is selected for contenting on a random RU.

One solution for the selection of contenting nodes is to compare the local multichannel backoff value OBO with the number of RUs to be allocated. For instance, when the number of RUs to be allocated is 8 (as an example, a 40 MHz band, wherein each 20 MHz channel band contains 4 OFDMA RUs), all the transmitting nodes with a local multichannel backoff value OBO less than 8 are considered as eligible for having access onto a Random RU. On the other hand, the other transmitting nodes are not selected for Random RU allocation in the current TXOP and must wait for another transmission opportunity (OFDMA TXOP or standard TXOP) before sending their data.

Next step is step 713 in which the node selects the Random RU to be used. In this exemplary embodiment, the Random RU having an index equal to the local multichannel backoff value OBO computed at step 712 is selected.

Next, at step 714, the node transmits at least one 802.11 PPDU frame in a 802.11ax format in the selected Random RU.

Then, it waits for an acknowledgment of the transmitted PPDU frame from the AP. This is step 715.

Figure 9:
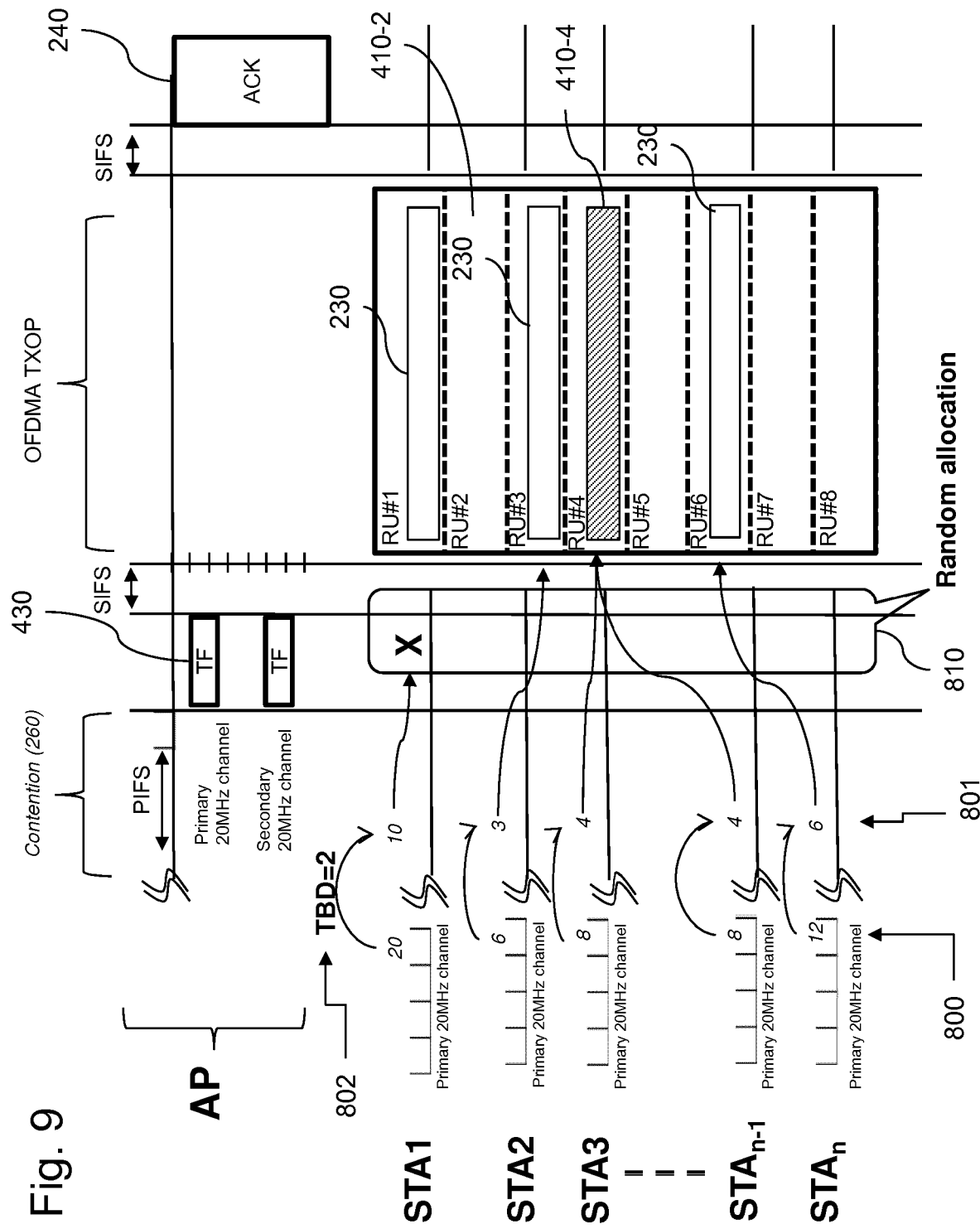

This exemplary embodiment is illustrated through FIG. 9.

FIG. 9 illustrates exemplary communication lines according to such exemplary random allocation procedure that is used by the nodes to access the Random RUs indicated in the TF. As explained above, this random allocation procedure is based on the reuse of the conventional backoff counter values of the nodes for assigning an RU to a node of the network to send data.

An AP sends a trigger frame TF defining RUs with random access and including the TBD parameter. In the example of the Figure, eight RUs with the same bandwidth are defined for a 40 MHz composite channel, and the TF 430 is duplicated on the two 20 MHz channels forming the composite channel. In other words, the network is configured to handle four OFDMA Resource Units per each 20 MHz channel.

Each node STA1 to STAn is a transmitting node with regards to receiving AP, and as a consequence, each node has at least one active 802.11 backoff value (800), based on which it computes the local multichannel backoff value (801), using the TBD parameter (802). TBD=2 in this example. For instance, node STA2 has an 802.11 backoff value equal to 6, and using TBD=2, it obtains a local multichannel backoff value equal to 3.

The random allocation procedure 810 of FIG. 9 comprises, for a node of a plurality of nodes having an active backoff and calculating a local multichannel backoff value OBO using the TBD parameter specified in the TF, a first step of determining from the trigger frame the Random sub-channels or RUs of the communication medium available for contention, a second step of verifying if the value of the multichannel backoff value local OBO to the considered node is not greater than the number of detected-as-available Random RUs, and then a step of sending data is performed on the RU whom number equals the local multichannel backoff value OBO.

In other words, the Random RUs may be indexed in the TF, and each node uses the RUs having an index equal to the local multichannel backoff value OBO of the node.

As shown in the Figure, some Random Resource Units may not be used, for instance RUs indexed 2 (410-2), 5, 7 and 8. This is due to the randomization process, and in the present example, due to the fact that none of the nodes has a backoff value OBO equal to 2, 5, 7 or 8 after the TF has been sent.

To base the Random RU allocation on the conventional 802.11 backoff value allows maintaining the access priority defined in the 802.11 standard. Another advantage is that the Random RU allocation keep relying on classical random generation resources present in conventional 802.11 hardware.

While the above example selects the Random RUs based on its RU index matching the local multichannel backoff value OBO, other approaches, for instance selecting randomly the Random RU, can be implemented. In any case, the overall allocation is randomized since the local multichannel backoff value OBO is intrinsically randomly computed.

Figure 8B:
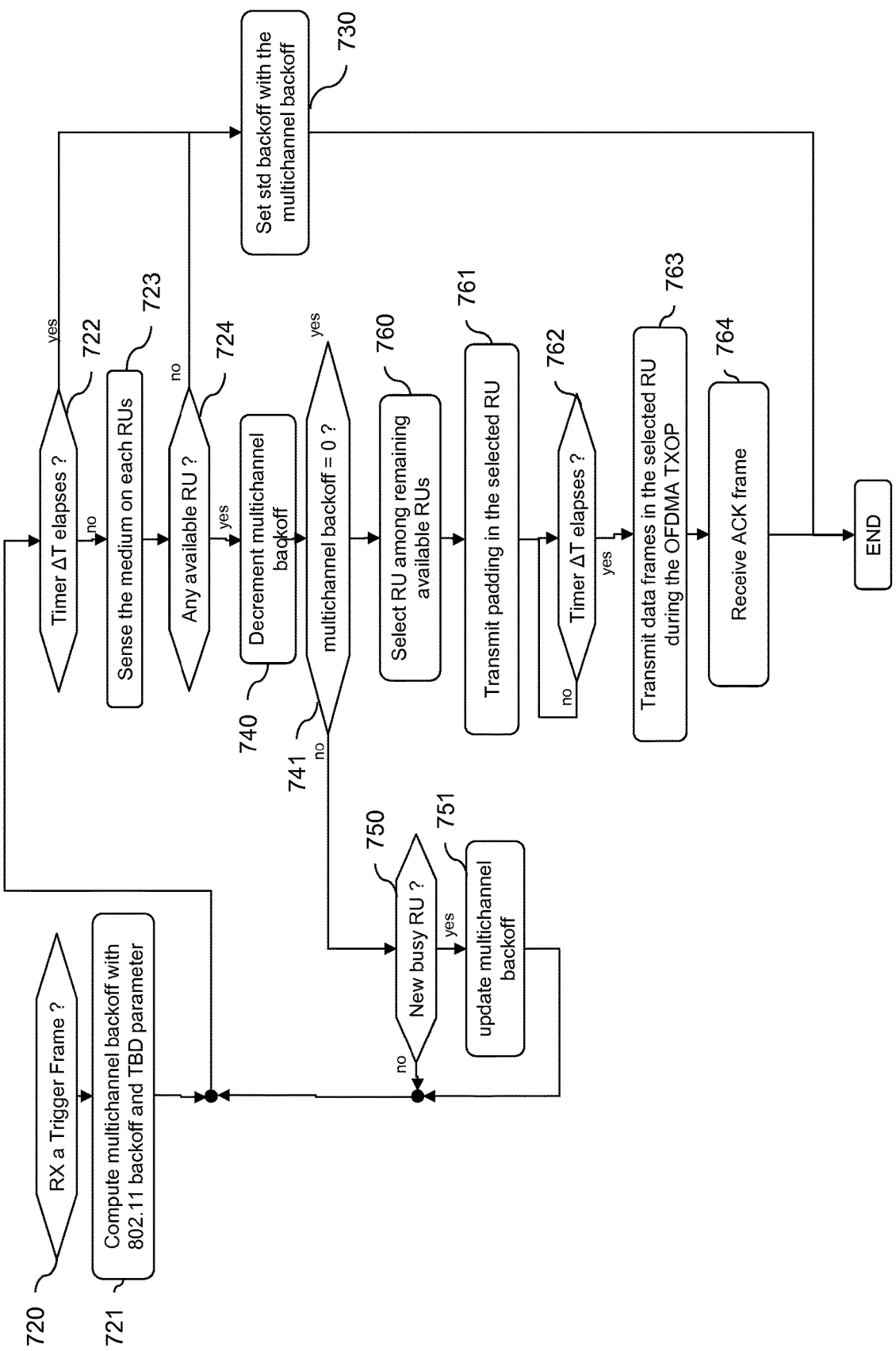
FIG. 8b illustrates, using a flowchart, general steps of a wireless communication method at one of the nodes (not the AP) according to a second exemplary embodiment of the invention.

FIG. 8*b* illustrates, using a flowchart, general steps of a wireless communication method at one of the nodes (not the AP) according to a second exemplary embodiment of the invention. In this second exemplary embodiment, the AP defines a time window size, denoted $\Delta T$ (specified in the TF), in which the nodes can perform contention on the Random RUs. Once the time window ends, all the nodes to which a RU has been allocated (thus including the Scheduled RUs) start transmitting their data simultaneously. This is to keep OFDMA synchronization between the nodes.

As an alternative to an explicit indication in the TF, the time window size may be determined locally on each node using the same determination scheme.

Upon receiving a trigger frame from the AP (720), the node STA extracts, from the trigger frame, the TBD parameter value, the $\Delta T$ period and the number of RUs subject to random allocation.

By default, a transmitting 802.11 node has its own (local) backoff counter different from zero (otherwise it would have access the primary 20 MHz channel).

In this second exemplary embodiment, the transmitting node computes a multichannel backoff value OBO (i.e. a local random parameter) based on the current value of the standard 802.11 backoff counter value and based on the extracted TBD parameter value. This is step 721.

For instance, to speed up the backoff decrement over time as explained above (step 702) and to tend to allocate all the Random RUs, the local multichannel backoff value OBO may be equal to the standard 802.11 backoff value divided by the TBD parameter value. A rounding operation is used to obtain an integer, if appropriate. This approach can be implemented in a simple way, which is particularly adapted to low resource nodes.

Other variants as described above with reference to FIG. 8*a* may also be implemented. In addition, the standard 802.11 backoff value may also be used as the local multichannel backoff value OBO when the contention scheme of FIG. 8*b* is implemented.

Upon reception of the trigger frame, after a SIFS time, the local multichannel backoff OBO is decremented by one at each multichannel backoff time interval (typically the 802.11ax standard value: 9 μs) during the $\Delta T$ period. This is the loop 722-740-output 'no' at 741.

Through this loop, as long as the medium is sensed as idle on Random RUs, the local multichannel backoff value OBO is counted down until it goes to 0 (test 741). This makes it possible to determine a first time instant based on the random parameter local to the node (i.e. the local multichannel backoff value OBO).

At each multichannel backoff time interval, if the multichannel backoff OBO of the STA is not equal to 0 (test 741), the RU distribution is analysed. It means that the node continuously senses the use of the random resource units during the time window. This is step 723.

If a new Random RU is sensed as busy during the current time interval (test 750), the local multichannel backoff value OBO may be updated at step 751. This is to speed up the RU allocation for the remaining time.

The local multichannel backoff value OBO may be updated based on at least one correcting parameter specified in the trigger frame received from the access point, for instance the TBD parameter defined above. For instance, the starting formula to compute the local multichannel backoff value OBO may be applied again on the current local multichannel backoff value: new local multichannel backoff value OBO=current multichannel backoff/TBD value. Of course, other embodiments may be used.

Steps 750-751 are optional. If they are not implemented, the loop from output 'no' at step 741 directly goes to step 722.

During the countdown of the local multichannel backoff value OBO, it is determined whether or not at least one Random RU is still available. This is step 724. Indeed, as soon as all the random resource units of the at least one communication channel are sensed as used, the node may stop the process of sensing the use of the Random RUs and of counting down its local multichannel backoff value OBO. This is to avoid useless processing as soon as no further Random RU is available.

In the example of the Figure, upon detecting all the Random RUs are used, the process goes to optional step 730.

If the local multichannel backoff value OBO does not reach zero at the end of the time window $\Delta T$ (the $\Delta T$ period expires—test 722), no random resource unit is selected for the node within the transmission opportunity. The process thus goes to optional step 730.

As no Random RU has been allocated to the node after expiry of $\Delta T$ period or if all Random RUs have been allocated, the node comes back to conventional 802.11 contention for access to the network. At step 730, the 802.11 standard backoff value is set to the current local multichannel backoff value OBO, i.e. to the value taken by the local random parameter at said first time instant. This is to speed up access to the network for the node, since a number of other nodes with lower backoff values have already accessed the network during the $\Delta T$ period. Next to step 730, the process ends.

Back to test 741, if the local multichannel backoff value OBO of the node reaches zero, a first time instant has thus been determined. At this time instant, a Random RU is selected and allocated to the node at step 760.

In particular a Random RU is selected from the available Random RUs. In other words, one of the random resource units sensed as unused is selected.

In embodiments, the selection can be controlled by using the first available Random RUs. In these embodiments, the random resource units are ordered within the communication channel (they have respective unique indexes), and the selected unused random resource unit is the first one of the sensed unused random resource units according to the order.

Next to step 760, the node starts sending padding data on the selected random resource unit, at step 761. In particular it sends the padding data from the determined first time instant up to the end of a predetermined time window $\Delta T$ (loop 762). Sending dummy data (i.e. padding) in the selected Random RU ensures this RU is sensed as busy by other nodes.

Note that the dummy/padding data are sent by the nodes on the allocated Random RUs to ensure the OFDM symbol to be synchronized between the transmitting nodes. This requires that the same padding is also performed for any Scheduled RU in the composite channel forming the TXOP.

At the end of the $\Delta T$ period (test 762), the node stops sending padding data and starting transmitting data to the access point on the selected random resource unit. At step 763, the node thus sends at least one real data 802.11 PPDU frame during the OFDMA TXOP in an 802.11ax format in the selected RU.

Preferably, when the node ends sending the data intended to the access point, the node may continue emitting a signal, for instance by sending new padding data, on the selected RU until the end of the TXOP. This is to ensure a correct energy level to be detected by legacy node on the 20 MHz channel including the selected RU.

Next at step 764, the node waits for an acknowledgment response from the AP before the next data transmission TXOP.

The process then ends.

Figure 10:
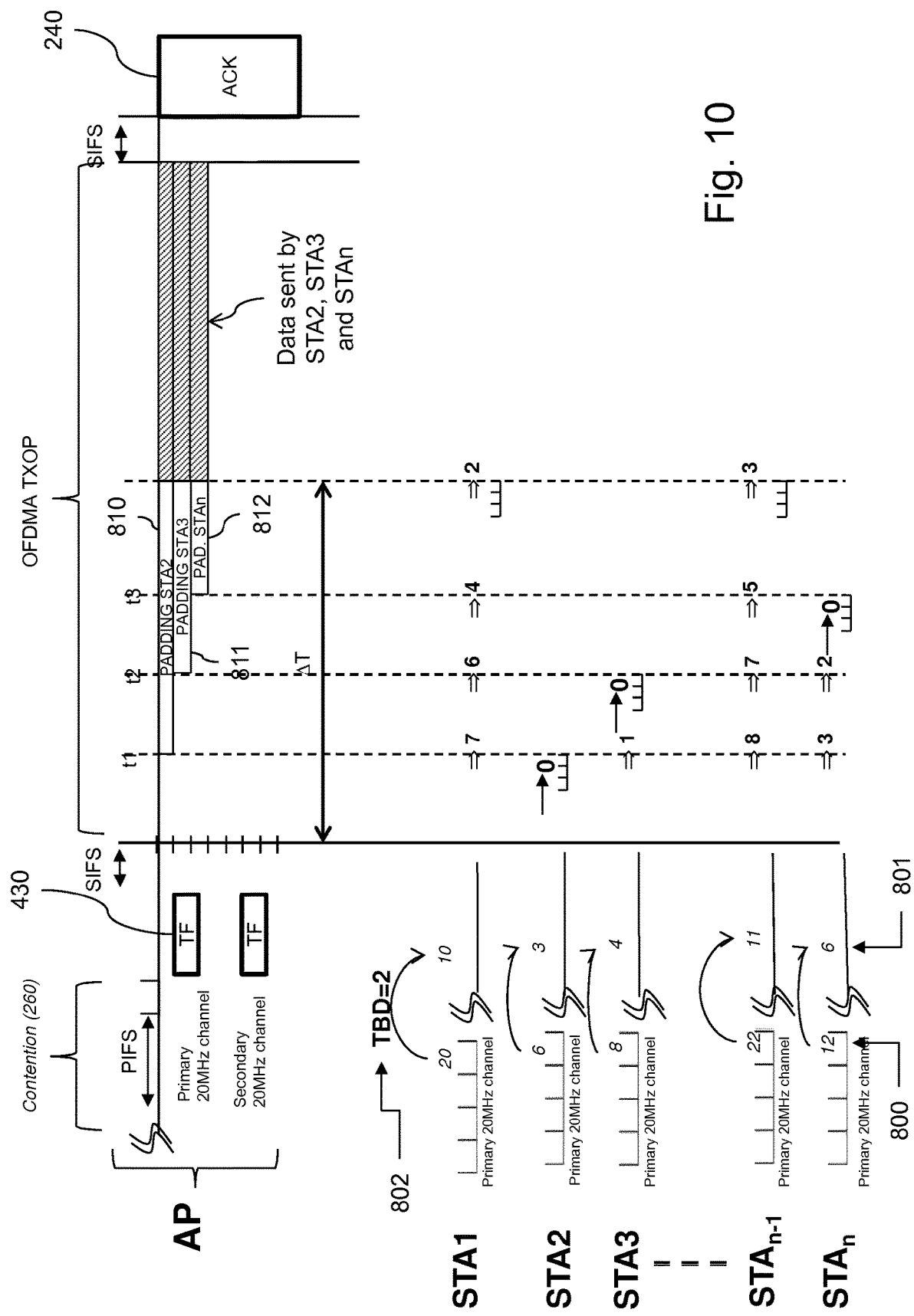
FIG. 10 illustrates exemplary communication lines according to the second exemplary embodiment of FIG. 8b.

This exemplary embodiment is illustrated through FIG. 10.

The 802.11 backoff values 800 are converted into local multichannel backoff values OBO 801 using TBD parameter 802 as explained above.

From a SIFS after the TF 430, the countdown of the local multichannel backoff values OBO starts, for the $\Delta T$ period.

The first node having a local multichannel backoff value OBO reaching zero (at time t1) is allocated the first Random RU (#1), on which it starts sending padding data (810). This is STA2.

Next a second node, STA3, has its local multichannel backoff value OBO reaching zero at t2. It then selects the second Random RU (#2, first available one), on which it starts sending padding data (811).

The countdown is performed during the whole $\Delta T$ period. In the example of the Figure, a third node, STAn, has its local multichannel backoff value OBO reaching zero before the end of the $\Delta T$ period, at t3. It then selects the third Random RU (#3, first available one), on which it starts sending padding data (812).

At the end of the $\Delta T$ period, nodes STA1 and STAn-1 have non-zero local multichannel backoff values OBO: they are not allocated with a Random RUs.

Simultaneously, STA2, STA3 and STAn start transmitting their data using OFDMA on their respective selected Random RU. They send data up to the end of the TXOP (possibly using padding data if necessary). An ACK then follows, sent by the AP.

Turning now to the operations performed by the access point, FIG. 11 illustrates, using a flowchart, general steps of a wireless communication method at the AP adapted to the first and/or second exemplary embodiments introduced above.

One skilled in the art will unambiguously identify which parts of FIG. 11 are required for the first exemplary embodiments of FIG. 8a and which parts of FIG. 11 are required for the second exemplary embodiments of FIG. 8b. In particular, the AP is configured to compute, update and send the TBD parameter used to optimize the OFDMA Random RU allocation for the next OFDMA TXOP in the first exemplary embodiments, and to compute, update and send the $\Delta T$ value in some embodiments of the second exemplary embodiments. In any case, such information is encapsulated inside a new Trigger Frame (TF) sent by the AP.

Upon receiving an uplink OFDMA frame (851), the AP is in charge of sending an acknowledgment frame to acknowledge safe reception of transmitted data by all or part of the nodes over the OFDMA RUs (852).

At step 853, the AP analyses the number of collided and empty (i.e. unused) OFDMA RUs. It may perform this step by sensing each RU forming the composite channel. These values are used to update OFDMA statistics. In particular, the AP determines statistics on random resource units not used by the nodes during the transmission opportunity and/or random resource units on which nodes collide during the transmission opportunity.

The OFDMA statistics are used by the AP at steps 854-856 to determine various parameters to dynamically adapt (from one TXOP to the other) the contention scheme for access to the Random RUs.

It includes determining the TBD parameter for the next OFDMA transmission (854) at least for the first exemplary embodiments.

It may also include determining and thus modifying the number of random resource units within the communication channel for the next transmission opportunity (855).

It also includes determining the size of the ΔT period (856).

For the first exemplary embodiments of FIG. 8a, steps 854-855 thus dynamically adapt (from one TXOP to the other) the contention scheme for access to the Random RUs, by both adjusting the TBD parameter and the number of Random RUs available to the nodes.

To illustrate such dynamical adaptation, it may be considered the case where all (or more than 80%) OFDMA Random RUs are used in the last OFDMA TXOP (or N previous OFMDA TXOPs, N being integer). It means that many nodes are requesting to transmit data. As a consequence, the number of Random RUs for the next OFDMA transmission can be increased by the AP (for instance by 1 up to a maximum number), while the TBD parameter can remain the same.

In addition, if collisions occur on several used OFDMA Random RUs (at least for instance more than a third), it means that the TBD parameter should be decreased to minimize the collisions between the nodes during the RU allocation. For instance, the TBD parameter may be decreased by about 30%.

A drawback of decreasing the TBD parameter (used as a divisor of the 802.11 backoff value by the nodes) is that the Random RU allocation is less optimized.

On the other hand, if several OFDMA Random RUs remain unused (at least for instance more than a third—or less than 50% of the RUs are used), the TBD parameter can be increased, for instance by 30%, and/or the number of Random RUs for the next OFDMA transmission can be decreased by the AP (for instance by 1) to optimize the OFDMA Random RU allocation.

A drawback of increasing the TBD parameter is that the collisions during the Random RU allocation may increase.

This illustrates that, upon termination of each uplink OFDMA TXOP, the updating of the TBD parameter is a trade-off between minimizing collisions during Random RU allocation and optimizing the filling of the OFDMA Random RUs.

To be precise, at step 854, the AP computes a new TBD parameter based on the determined OFDMA statistics, optionally further based on the number of nodes transmitting on the random resource units during the previous transmission opportunity. Note that the OFDMA statistics may be statistics on the previous TXOP only or on N (integer) previous TXOPs.

For instance, as introduced in the first embodiments of FIG. 8a, the TBD parameter includes a value to apply to a random parameter local to each node, for the node to determine which one of the random resource units to access. For instance, the random parameter can be based on a backoff value used by the node to contend for access to the communication channel.

In embodiments, a good starting value for the TBD parameter is 2 (used as a divisor of the 802.11 backoff value by the nodes). This value substantially increases the speed of the backoff counter, with limited risk of addition collisions.

However this value can be adjusted as the OFDMA statistics show that too many collisions occur on the Random RUs or too many Random RUs remain unused.

Next, at step 855, the AP determines the number of Random RUs to consider for the next multi-user TXOP about to be granted (because the AP can pre-empt the wireless medium over the nodes, since it must wait for the medium to be idle during a shorter duration than the waiting duration applied by the nodes).

The determination of step 855 can based on the BSS configuration environment, that is to say the basic operational width (namely 20 MHz, 40 MHz, 80 MHz or 160 MHz composite channels that include the primary 20 MHz channel according to the 802.11ac standard).

For the sake of simplicity, one may consider that a fixed number of OFDMA RUs is allocated per 20 MHz band by the 802.11ax standard: in that case, it is sufficient that the Bandwidth signaling is added to the TF frames (i.e. 20, 40, 80 or 160 MHz values is added). Typically, such information is signaled in the SERVICE field of the DATA section of non-HT frames according the 802.11 standard. As a consequence, compliance with 802.11 is kept for the medium access mechanism.

For the second exemplary embodiments of FIG. 8b, step 856 dynamically adapts the ΔT value to the network conditions. This adaptation may thus be based on the OFDMA statistics, i.e. on the number of random resource units not used by the nodes during one or more previous transmission opportunities and/or of random resource units on which nodes collide during one or more previous transmission opportunities. It is also adjusted based on the number of available Random RUs provided in the TXOP.

For instance, the ΔT value is computed as a multiple of the multichannel backoff time interval (used by the nodes when decrementing their local multichannel backoff values OBO—equal to 9 μs). As an example, the multiplicity may be equal to the number of available Random RUs (determined at step 855 for the next TXOP). Generally, one can consider the following equation:

$$\Delta T = (\text{number of available Random RUs} \times \text{elementary 9 μs time unit}) * k$$

wherein k is an adjusting parameter function of the OFDMA statistics.

Typically 'k' value can be set to 2. Its minimum value is 1 to allow the allocation of one Random RU at least at each backoff decrement (9 μs).

The 'k' value can be adjusted depending on the number of empty Random RUs on the past OFDMA TXOP: for instance, if a third of the Random RUs remain unused in the last OFDMA TXOP, the 'k' value may be increased by 30%.

However, the ΔT value is kept below a predefined threshold, in order to avoid having it too high. This is to avoid spending too much time for the Random RU allocation.

Next to step 856, steps 857/858 consist for the AP to build and send the next trigger frame with the above determined information: Random RUs information, TBD parameter value, ΔT value.

It is expected that every nearby node (legacy or 802.11ac, i.e. which is neither STA1 nor STA2) can receive the TF on its primary channel. Each of these nodes then sets its NAV to the value specified in the TF frame: the medium is thus reserved by the AP.

Figure 12:
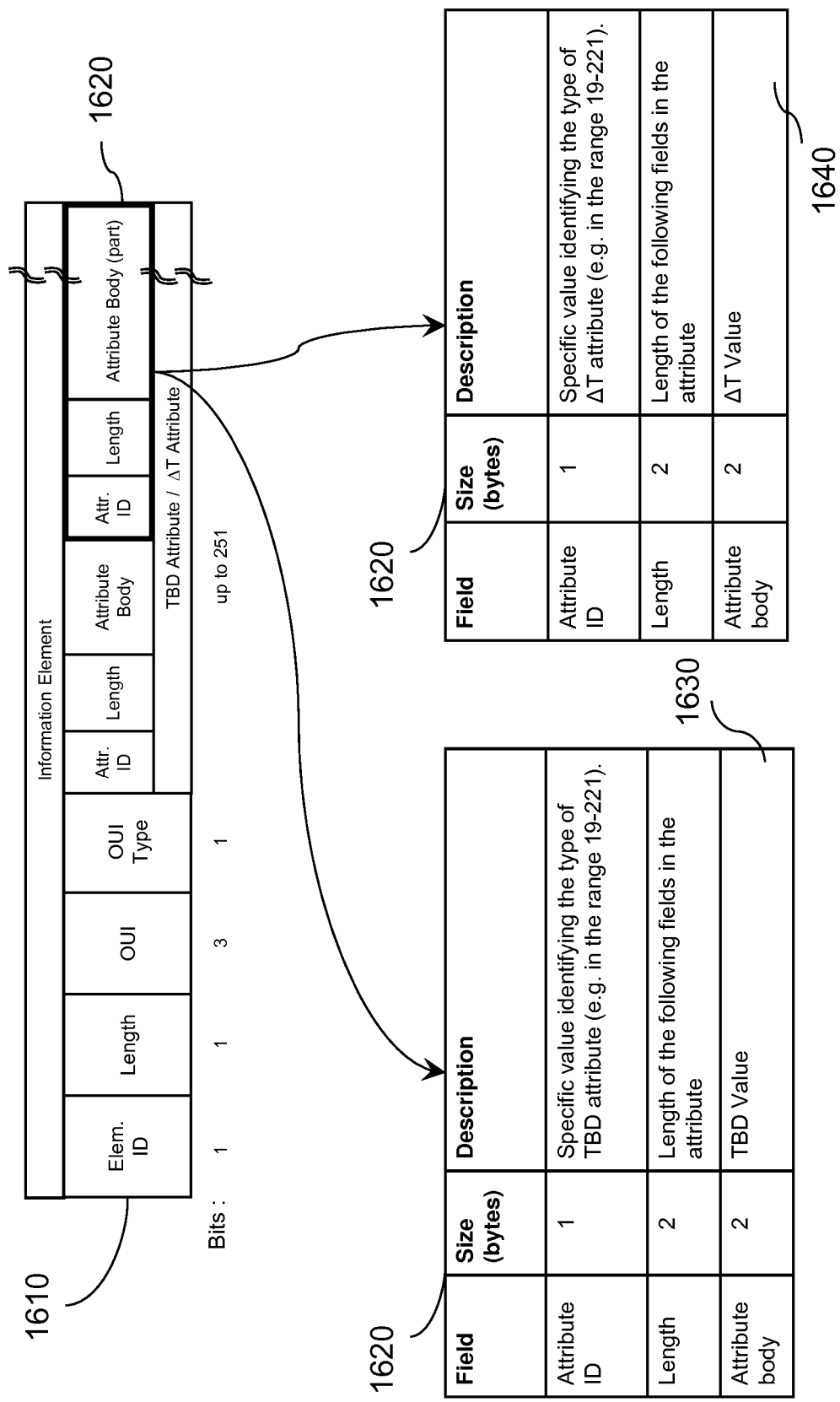
FIG. 12 illustrates an exemplary format for an information Element dedicated to the transmission of parameter values from the AP to the nodes in embodiments of the invention.

FIG. 12 illustrates an exemplary format for an information Element dedicated to the transmission of the TBD parameter and/or the ΔT value within the TF. The 'TBD Information Element' (1610) is used by the AP to embed additional information within the trigger frame TF related to the OFDMA TXOP.

The proposed format follows the 'Vendor Specific information element' format as defined in IEEE 802.11-2007 standard.

The 'TBD Information Element' (1610) is a container of the TBD parameter attributes (1620), having each a dedicated attribute ID for identification. The header of TBD Information Element can be standardized (and thus easily identified by stations 600) through the Element ID.

The TBD attributes 1620 are defined to have a common general format consisting of a 1-byte TBD Attribute ID field, a two-byte Length field and a TBD attribute body (1630) including the TBD parameter (value) computed by the AP.

As for the TBD attributes, the $\Delta T$ attribute is built on the same way, when required. It is defined to have a common general format consisting of a 1-byte AT Attribute ID field, a 2-byte Length field and a $\Delta T$ attribute body (1640) including the $\Delta T$ value computed by the AP.

The usage of the Information Element inside the MAC frame payload is given for illustration only, any other format may be supportable. The choice of embedding additional information in the MAC payload is advantageous in that it keeps legacy compliancy for the medium access mechanism. This is because any modification performed inside the PHY header of the 802.11 frame would have inhibited any successful decoding of the MAC header (the Duration field would not have been decoded, so the NAV would not have been set by legacy devices).

Turning now to other illustrative embodiments of improvements according to the invention, one may note that the above-mentioned trigger frame may be dedicated to a specific data traffic, in which case it includes a reference to a type of data traffic, for instance any priority or AC as shown in FIG. 3*b*.

As a consequence, the management of the RU backoff value may be performed with respect to a single type of data traffic, i.e. more generally with respect to any data regardless of the data traffic. In other words, the contention for access to the Random RUs according to these embodiments can be conducted regardless of the ACs.

More generally, these embodiments may apply for transmitting data, regardless of the ACs, meaning that a general transmission buffer is used instead of a plurality of AC queues. In such a case, the references below to "active AC" are meaningless, and only refer to such general transmission buffer.

However, for illustrative purposes, specific implementations taking into account the ACs are described below.

Figure 13:
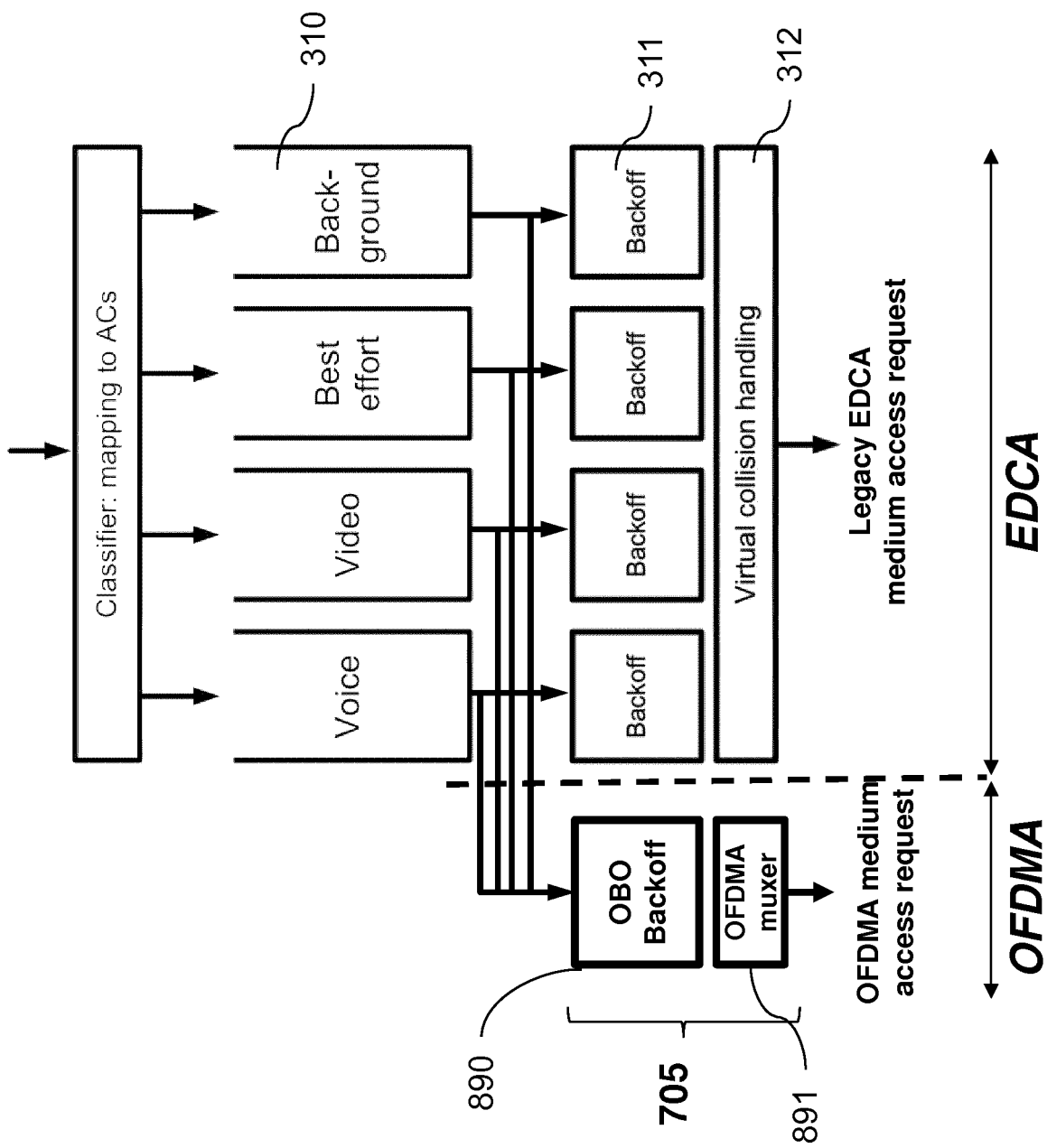
FIG. 13 illustrates an exemplary transmission block of a communication node according to embodiments of the invention.

FIG. 13 illustrates an exemplary transmission block of a communication node 600 according to illustrative embodiments of the invention.

The node includes:
 a plurality of traffic queues 310 for serving data traffic at different priorities;
 a plurality of queue backoff engines 311, each associated with a respective traffic queue for computing a respective queue backoff value to be used to contend for access to at least one communication channel in order to transmit data stored in the respective traffic queue. This is the EDCA; and
 an RU backoff engine 890 separate from the queue backoff engines, for computing an RU backoff value to be used to contend for access to the OFDMA resources defined in a received TF (sent by the AP for instance), in order to transmit data stored in either traffic queue in an OFDMA RU. The RU backoff engine 890 belongs to a more general module, namely Random RU procedure module 705, which also includes a transmission module, referred to as OFDMA muxer 891.

The conventional AC queue back-off registers 311 drive the medium access request along EDCA protocol, while in parallel, the RU backoff engine 890 drives the medium access request onto OFDMA multi-user protocol.

As these two contention schemes coexist, the source node implements a medium access mechanism with collision avoidance based on a computation of backoff values:
 a queue backoff counter value corresponding to a number of time-slots the node waits, after the communication medium has been detected to be idle, before accessing the medium. This is EDCA;
 an RU backoff counter value (OBO) corresponding to a number of idle RUs the node detects, after a TxOP has been granted to the AP over a composite channel formed of RUs, before accessing the medium. This is OFDMA.

RU backoff engine 890 is in charge of determining appropriate RU backoff parameters based on one or more queue backoff parameters of the queue backoff engines, in particular during initialization and management of the RU backoff value OBO and of its associated congestion window size noted CWO. For instance, RU backoff engine 890 computes the RU backoff value OBO by randomly selecting a value within a contention (or congestion) window range [0, CWO], wherein the contention window size CWO is selected from selection range [$CWO_{min}$, $CWO_{max}$].

OFDMA muxer 891 is in charge, when the RU backoff value OBO reaches zero, of selecting data to be sent from one or more AC queues 310 (or the general transmission buffer in a more general context). Various ways to select the data to be sent from the one or more queues can be implemented. As it is not the core of the present invention, such selection approaches are not further detailed here.

One main advantage of embodiments of the present invention is to still be able to use, for the OBO/RU backoff engine, a classical hardware/state-machine of standard back-off mechanism, in particular the basic mechanism that enables, when a back-off value reaches zero, a medium access to be requested. Adjusting back-off parameters (back-off value, contention window min and max) is implemented simply by overwriting registers.

Upon receiving a Trigger Frame 430, the contention procedure for counting down the OBO backoff may consist in decreasing the OBO backoff count value by the number of detected-as-available RUs in the received trigger frame, or in a variant in decreasing the OBO backoff count value each elementary time unit (which may be different in size, in particular shorter, compared to the time units used when contending for access to the 20 MHz communication channels).

The medium access to be requested when OBO is down to zero (or less than), may consist in applying a random selection of a RU among the detected-as-available RUs for sending data (according example of FIG. 5). In a variant, the random RUs may be indexed from 1 to $Nb_{RU}$, and the selected random RU is the one having the RU backoff value OBO (before the above decrementing by the number of detected-as-available RUs) as index.

According to first improvements of the invention, the Trigger Frame 430 includes a correcting "TBD" parameter calculated by the AP, and one random resource unit is determined from the detected-as-available random resource units, based on the received TBD parameter and on one random parameter local to the node, The random parameter local to the node is for instance the OBO backoff value randomly selected from contention window range [0, CWO].

According to second improvements of the invention, the contention window range [0, CWO] from which any new OBO backoff value is randomly selected is updated depending on a success or failure in transmitting the data during the previous RU access.

Embodiments of the invention are now described with reference to FIGS. 14 to 22.

Figure 14:
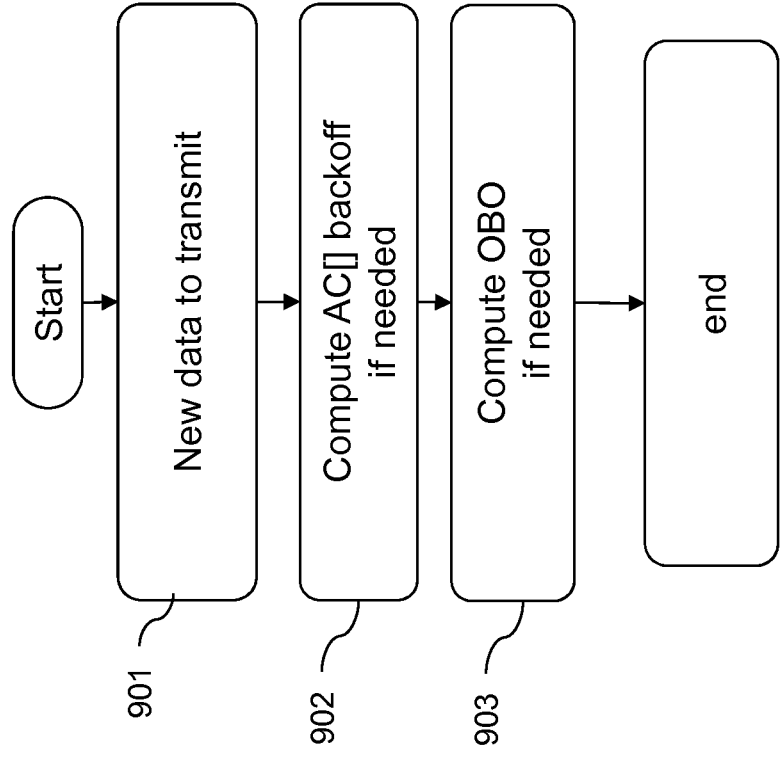
FIG. 14 illustrates, using a flowchart, main steps performed by a MAC layer of a node, when receiving new data to transmit, in first embodiments of the invention.

FIG. 14 illustrates, using a flowchart, main steps performed by MAC layer 702 of node 600, when receiving new data to transmit.

At the very beginning, none traffic queue (or the general transmission buffer) stores data to transmit. As a consequence, no queue backoff value has been computed. It is said that the corresponding queue backoff engine or corresponding AC (Access Category) is inactive. As soon as data are stored in a traffic queue, a queue backoff value is computed (from corresponding queue backoff parameters), and the associated queue backoff engine or AC is said to be active.

At step 901, new data is received from an application local running on the device (from application layer 701 for instance), from another network interface, or from any other data source. The new data are ready to be send by the node.

At step 902, conventional 802.11 AC backoff computation is performed by the queue backoff engine corresponding to the type of the received data.

If the AC queue corresponding to the type (Access Category) of the received data is empty (i.e. the AC is originally inactive), then there is a need to compute a queue backoff value for the corresponding backoff counter.

The node then computes the queue backoff value as being equal to a random value selected in range [0, CW]+AIFS, where CW is the current value of the contention window size for the Access Category considered (as defined in 802.11 standard and updated for instance in step 1170 below), and AIFS is an offset value which depends on the AC of the data (all the AIFS values being defined in the 802.11 standard) and which is designed to implement the relative priority of the different access categories.

As a result the AC is made active.

Next to step 902, step 903 computes the RU backoff value OBO if needed.

An RU backoff value OBO needs to be computed if the RU backoff engine 800 was inactive (for instance because there were no data in the traffic queues/general transmission buffer until previous step 901) and if new data to be addressed to the AP have been received. This step 903 is thus a step of initializing OBO.

It first includes initializing the Contention Window size CWO (note that CW refers to the conventional contention window size for the ACs while CWO refers to the contention window size for the RU/OBO backoff, specific to embodiments of the invention) as explained below with reference to FIG. 15, and then computing RU backoff value OBO from CWO.

In particular, RU backoff value OBO may be determined as a random integer selected from contention window range [0, CWO] uniformly distributed: OBO=random[0, CWO]. This is why the random RUs selected by the nodes for transmission are based on one random parameter local to the node.

In variants, RU backoff value OBO may be determined by adding, to a value randomly selected from contention window range [0, CWO] uniformly distributed, a value computed from one or more arbitration interframe spaces, AIFS:

OBO=random[0,CWO]+AIFS[AC].

For instance, AIFS[AC] is either the lowest AIFS value from the EDCA AIFS value or values of the active AC or ACs in considered node 600, or an average value from the same the EDCA AIFS value or values.

According to the first embodiments of the invention, RU backoff value OBO is determined based on a correcting parameter TBD, such as an RU collision and unuse factor, received from the AP (in the Trigger Frame), for instance because CWO itself may be computed from TBD parameter. The RU collision and unuse factor TBD is further explained below. It is an adjustment parameter transmitted by the AP to drive node 600 to adjust its RU backoff value OBO. This adjustment parameter preferably reflects the AP point of view of collisions on RUs and/or of unuse of RUs, in the overall 802.11ax network.

Thus, the RU collision and unuse factor TBD is preferably function of the number of unused random resource units and of the number of collided random resource units in one or more previous trigger frames, as detected by the AP.

Symmetrically, it may also be function of a number of random resource units that are used by the nodes and that do not experience collision during the one or more transmission opportunities.

Next to step 903, the process of FIG. 14 ends.

For completeness of description, an exemplary determination of TBD parameter is provided. It takes place at the AP upon providing random RUs in trigger frames. The number of RUs in the trigger frame may also evolve simultaneously.

Figure 20:
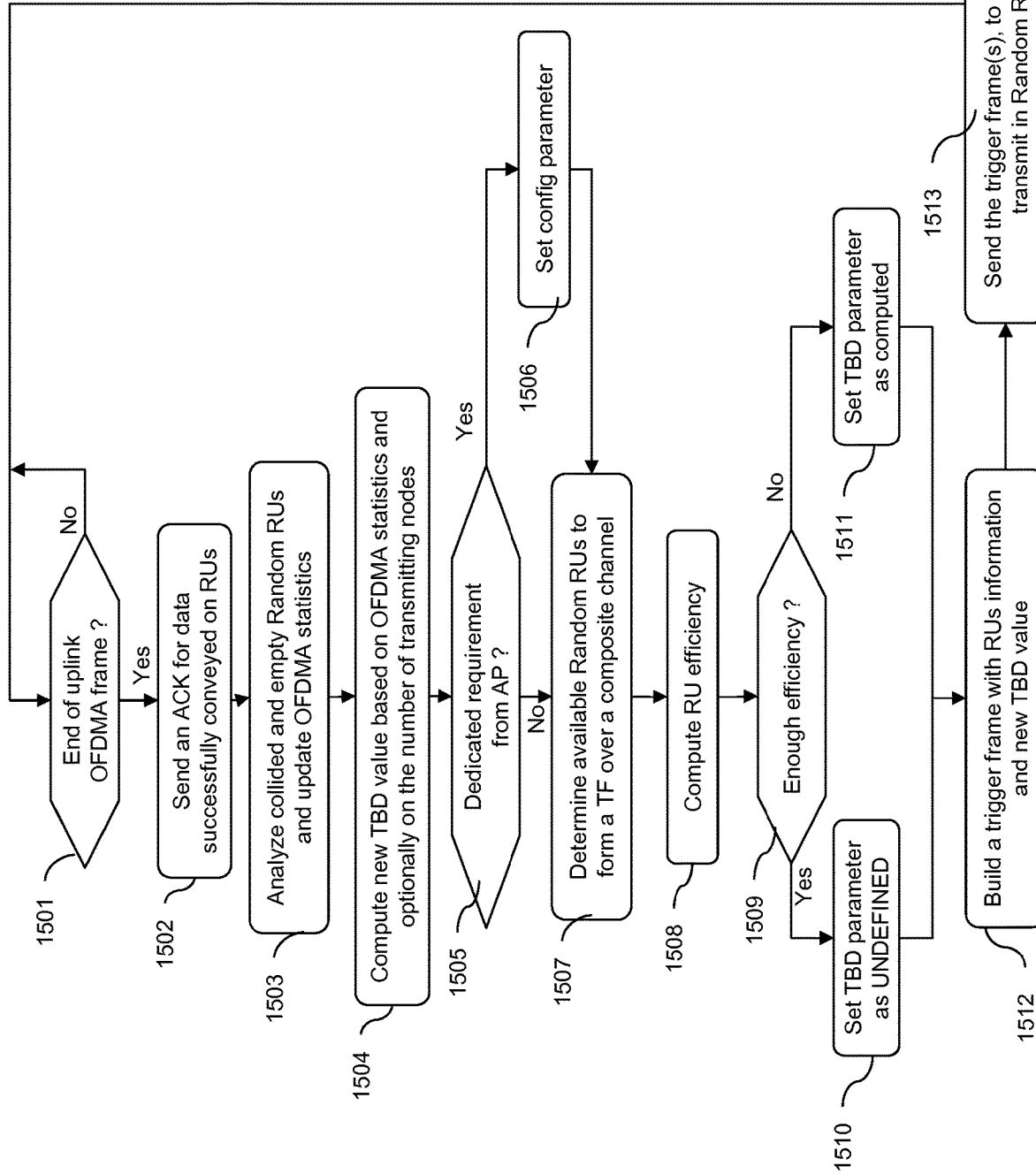
FIG. 20 illustrates, using a flowchart, steps of a wireless communication method at the access point.

FIG. 20 illustrates, using a flowchart, general steps of a wireless communication method at the AP adapted to compute the TBD parameter or RU collision and unuse factor TBD. It is a slight adaptation of the process of FIG. 11. Such TBD information is encapsulated inside a new Trigger Frame (TF) sent by the AP, for instance as already explained above with reference to FIG. 12.

According to some embodiments, the TBD parameter is added to TF only if it is relevant, i.e. if its use improves efficiency of the network. Implementations of this approach are described below with reference to FIG. 21.

Upon receiving an uplink OFDMA frame (1501), the AP is in charge of sending an acknowledgment frame to acknowledge safe reception of transmitted data by all or part of the nodes over the OFDMA RUs (1502).

At step 1503, the AP analyses the number of collided and empty (i.e. unused) OFDMA random RUs. It may perform this step by sensing each RU forming the composite channel. These values are used to update OFDMA use statistics. In particular, the AP determines statistics on random resource units not used by the nodes during the transmission opportunity and/or random resource units on which nodes collide during the transmission opportunity.

The OFDMA use statistics are used by the AP at steps 1504-1505 to determine various parameters to dynamically adapt (from one TXOP to the other) the contention scheme of the nodes for accessing the Random RUs.

It includes determining the TBD parameter for the next OFDMA transmission (1504).

It may also include determining and thus modifying the number of random resource units within the communication channel for the next transmission opportunity (1505).

Steps 1504-1508 thus dynamically adapt (from one TXOP to the other) the contention scheme of the nodes for accessing the Random RUs, by both adjusting the TBD parameter and the number of Random RUs available for the nodes.

It may be considered the case where all (or more than 80%) OFDMA Random RUs are used in the last OFDMA TXOP (or N previous OFMDA TXOPs, N being integer). It means that many nodes are requesting to transmit data. As a consequence, the number of Random RUs for the next OFDMA transmission can be increased by the AP (for instance by 1 up to a maximum number), while the TBD parameter can remain the same.

In addition, if collisions occur on several used OFDMA Random RUs (at least for instance more than a third), it means that the TBD parameter should be decreased to minimize the collisions between the nodes during the RU allocation. For instance, the TBD parameter may be decreased by about 30%.

A drawback of decreasing the TBD parameter (in case it is used as a divisor of the RU backoff value OBO by the nodes) is that the Random RU allocation is less optimized.

On the other hand, if several OFDMA Random RUs remain unused (at least for instance more than a third—or less than 50% of the RUs are used), the TBD parameter can be increased, for instance by 30%, and/or the number of Random RUs for the next OFDMA transmission can be decreased by the AP (for instance by 1) to optimize the OFDMA Random RU allocation.

A drawback of increasing the TBD parameter is that the collisions during the Random RU allocation may increase.

This illustrates that, upon termination of each uplink OFDMA TXOP, the updating of the TBD parameter is a trade-off between minimizing collisions during Random RU allocation and optimizing the filling of the OFDMA Random RUs.

To be precise, at step 1504, the AP may compute a new TBD parameter based on the determined OFDMA use statistics, optionally further based on the number of nodes transmitting on the random resource units during the previous transmission opportunity. Note that the OFDMA use statistics may be statistics on the previous TXOP only or on N (integer) previous TXOPs.

In variants, the TBD parameter may be a percentage according to the collision ratio detected by the AP among the OFDMA RUs, and/or the ratio of unused OFDMA RUs in previous MU OFDMA transmission opportunities and/or the ratio of used and non-collided OFDMA RUs. Depending on whether the TBD parameter is a percentage or an integer value, the formulae involving TBD may be slightly adapted, in particular at the nodes.

For instance, the TBD parameter includes a value used together with a random parameter local to each node, for the node to determine which one of the random resource units to access. For instance, the random parameter can be based on an RU backoff value used by the node to contend for access to the communication channel, and the TBD parameter may be used to define the contention window size CWO from which the RU backoff value is randomly selected.

In embodiments where the TBD parameter is used to define the contention window size CWO at the nodes, the TBD parameter may be function of a ratio between the number of collided random RUs and the number of random RUs in the one or more transmission opportunities. The other ratio defined above may also be used.

The above ratio may be multiplied by a predefined factor, for instance 0.08, such that TBD is function of CRF=α. (Nb_collided_RU/Nb_RU_total) with α=0.08.

Using this formula advantageously makes it possible for the AP to determine an optimum CWO for the nodes without knowledge of the number of concurrent nodes. Indeed, the AP cannot know the number of nodes having tried to send data by analysing the result of transmissions in response to a previous trigger frame, because the AP cannot differentiate between the different nodes colliding on a single RU (the collision detection result is the same if 2 or more nodes are colliding).

However, statistically, the proportion of collided RUs reflects the number of concurrent nodes. So if the AP analyses the number of collided RUs from the previous TFs and creates corresponding statistics, it can use them to determine CWO.

In details, increasing CWO is a way to adapt the frequency at which the nodes try to access the medium, to the effective number of free channels (number of random RUs). So the AP just needs to determine value CRF according to the collided RU statistics, which in turns can be applied to $CWO_{min}$ value to adapt CWO.

In specific embodiments, TBD equals this value CRF.

In other specific embodiments, TBD equals 2^CRF (^ being the power function).

In yet other specific embodiments, TBD directly defines the contention window size to be used by the nodes, i.e. directly defines CWO. For instance, TBD=$CWO_{min}$*2^CRF, where $CWO_{min}$ is a (predetermined) low boundary value.

Indeed, CWO is selected from [$CWO_{min}$, $CWO_{max}$]. $CWO_{min}$ is the lower boundary of a selection range from which the nodes select the contention window size to use to contend for access to the random RUs. Symmetrically, $CWO_{max}$ is the upper boundary of the selection range from which the nodes select the contention window size to use to contend for access to the random RUs.

As an example, $CWO_{min}$ is (or more generally may be determined as a function of) the number of random resource units defined in the trigger frame (in which TBD is to be encapsulated).

Defining TBD as CWO to be used by the nodes advantageously avoids having the nodes performing a certain number of tries before reaching an optimum CWO value. Indeed, the AP has an overall view of the traffic in the network, and thus can directly compute an optimum CWO for the nodes. Higher stability in latency is thus achieved.

In other specific embodiments, TBD is used to define the above selection range. For instance, TBD as provided by the AP defines $CWO_{min}$ or defines $CWO_{max}$.

Setting $CWO_{max}$ with TBD advantageously makes it possible for the AP to control the maximum latency, in particular if the nodes increase their CWO as they experience data collisions in the accessed random RUs. Thus the AP globally controls the latency in the network.

This is for example useful in the scenario where the AP wants to get timely reports from the nodes (by using aging mechanisms, i.e. cancelling outdated packets, to avoid outdated report emission), such as buffer status or MIMO efficiency reports (sounding reports).

Furthermore, it may be noted that increasing $CWO_{max}$ may enhance efficiency of random RU usage (i.e. number of used random RUs without collisions). Thus, $CWO_{max}$ set by the AP through the TBD parameter may be a tradeoff between the maximum latency and RU usage efficiency.

In yet other embodiments, TBD may also be used to identify an entry to select in a predefined table of contention window sizes.

Such a table may be shared between the AP and the nodes or can be predetermined at each node. Thus the AP identifies a CWO value to be used by the nodes from the table, by specifying an entry index therein.

These values can be adjusted as the OFDMA use statistics show that too many collisions occur on the Random RUs or too many Random RUs remain unused.

Any of the TBD parameters above may be adjusted or adapted to a specific group of nodes in which case the TBD parameter is preferably computed from OFDMA use statistics related to the nodes of the specific group, if such statistics can be identified. This is to assign different priorities to different groups of nodes, and to control different QoS between the node groups. Preference is given to setting different values of CWO through TBD, instead of different values of $CWO_{max}$ for instance, because it provides a finer granularity/better control of the discrimination/prioritization between the node groups (by setting $CWO_{max}$ for different node groups, the discrimination is obtained only when CWO in one group is above $CWO_{max}$ of another group).

Different groups of nodes may be identified through different BSSIDs, thus corresponding to different virtual sub-networks managed by the AP.

In a variant to the node group approach or in combination therewith, different TBD parameters (values) may be set for different types of data (ACs). Since the trigger frame may be restricted to a specific type of data (specified in the frame), a corresponding TBD parameter may be provided to drive the nodes along a specific behaviour when access random RUs to transmit this type of data. In this way, the AP can manage the latency of given type of required data.

This optional assignment of the TBD value to a group (BSSID) of nodes or to a type of data is shown through optional blocks 1505 and 1506 in the Figure. Step 1505 checks whether a specific requirement is defined at the AP, in which case the assignment is performed at step 1506.

Next, at step 1507, the AP determines the number of Random RUs to consider for the next multi-user TXOP about to be granted (because the AP can pre-empt the wireless medium over the nodes, since it must wait for the medium to be idle during a shorter duration than the waiting duration applied by the nodes).

The determination of step 1507 can based on the BSS configuration environment, that is to say the basic operational width (namely 20 MHz, 40 MHz, 80 MHz or 160 MHz composite channels that include the primary 20 MHz channel according to the 802.11ac standard).

For the sake of simplicity, one may consider that a fixed number of OFDMA RUs is allocated per 20 MHz band by the 802.11ax standard: in that case, it is sufficient that the Bandwidth signaling is added to the TF frames (i.e. 20, 40, 80 or 160 MHz values is added). Typically, such information is signaled in the SERVICE field of the DATA section of non-HT frames according the 802.11 standard. As a consequence, compliance with 802.11 is kept for the medium access mechanism.

Note that in embodiments where the number of random RUs is kept fixed, step 1507 may be avoided.

Next to step 1507, the OFDMA use statistics may also be used to evaluate a use efficiency of the random resource units based on the determined use statistics. The related steps 1508 to 1511 are implemented when a switch between the AP-initiated mode and the local mode to drive the computation of CWO by the nodes is searched.

Step 1508 evaluates the use efficiency of the random resource units based on the determined OFDMA use statistics. A metric or measure, function of a number of random resource units that are used by the nodes and that do not experience collision during the one or more transmission opportunities, can be used. It means that the use efficiency metric is based on statistics on the RUs that have been successfully used by the nodes (i.e. neither the collided random RUs nor the non-used random RUs).

For instance, the evaluated use efficiency measure may include a ratio between the number of random resource units that are used by the nodes and that do not experience collisions, and a total number of random resource units available during the one or more transmission opportunities. This metric thus mirrors how efficiently the available random RUs have been used.

In variants, the evaluated use efficiency measure may include a ratio between a number of collided random resource units and the total number of random resource units available during the one or more transmission opportunities.

In another variant, the evaluated use efficiency measure may include a ratio between a number of unused random resource units and the total number of random resource units available during the one or more transmission opportunities.

Of course, other formulae mixing the above numbers can be used, provided that they mirror how efficiently the available random RUs have been used.

All of these alternative metrics are based on use statistics accumulated during the one or more transmission opportunities. Any number of transmission opportunities considered can be envisioned. Also, all the transmission opportunities within a sliding time window can be taken into account, as a variant.

Next to step 1508, step 1509 consists in determining whether the evaluated use efficiency measure (e.g. any ratio defined above) indicates that the random RUs are efficiently used or not.

Indeed, FIG. 13 shows that sometimes the local mode is more efficient than the AP-initiated mode, and sometimes the reverse happens. Taking into account this information, it is worth trying to switch to the other mode in case the current use efficiency measure is too low.

Thus depending on the evaluated RU efficiency measure, the TBD parameter sent to the nodes to drive them in computing their own RU contention window size CWO should be set to a dedicated value or an UNDEFINED value.

Thus the access point decides, based on the evaluated use efficiency measure, between the two modes, from which results the decision to transmit or not, to the nodes, the determined TBD parameter within the next trigger frame to drive the nodes in determining their own contention window size.

A simple approach may be used, for instance by comparing the evaluated use efficiency measure to an efficiency threshold, e.g. 30%, to determine whether the current use of the random RUs is efficient or not.

For instance, if the evaluated use efficiency measure is below the efficiency threshold, a TBD Information Element (to be included in the next trigger frame as described above with reference to FIG. 12) is set to the TBD parameter as determined at step 1504. This is step 1511. This aims at transmitting, to the nodes, the determined TBD parameter TBD within a next trigger frame for reserving a next transmission opportunity, in case of low use efficiency.

On the contrary, in case of an evaluated use efficiency measure above the efficiency threshold, a local approach for computing CWO is sufficient. In this case, the TBD Information Element is set to an UNDEFINED (or UNUSED) value. This is step 1510 for the AP to have a next trigger frame to transmit that does not define a TBD parameter to drive nodes in defining their own contention window size. In this particular case, the transmitted next trigger frame includes a TBD parameter field set to undefined.

Of course, more complex use efficiency metrics (more complex to the ratios mentioned above) and more complex tests for step 1509 can be used to evaluate whether it is opportune to switch to one or the other mode between the local and AP-initiated modes.

Figure 20A:
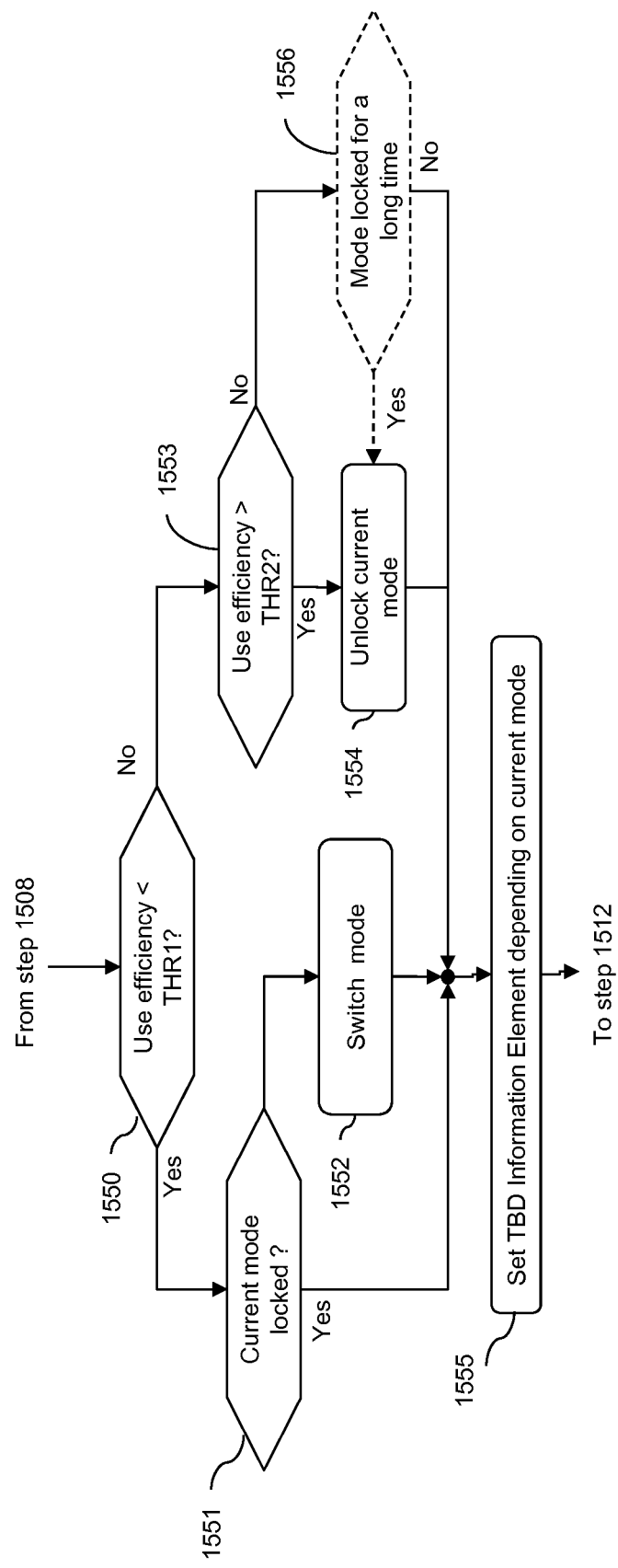
FIG. 20a illustrates a variant of the process of FIG. 20.

A variant is shown in FIG. 20a based on an hysteresis cycle.

To switch from one of the local or AP-initiated mode to the other, two predefined efficiency thresholds (THR1 and THR2) may be defined in order to avoid noisy switching. The two thresholds are used in an hysteresis cycle, to lock a current mode as long as an unlocking criterion (e.g. a comparison with THR2) is not reached. With this hysteresis cycle, the access point decides to switch from a current mode among a first mode in which the determined TBD parameter is transmitted within a trigger frame and a second mode in which the determined TBD parameter is not transmitted, to the other mode when the evaluated use efficiency measure falls below a first predefined efficiency threshold.

The evaluated use efficiency measure is first compared to THR1, for instance 30% in case the measure used includes a ratio between the number of random resource units that are used by the nodes and that do not experience collisions, and a total number of random resource units available during the one or more transmission opportunities. This is step 1550.

In case the evaluated use efficiency measure is less than THR1 (output "yes"), it is determined at step 1551 whether the current mode (either local or AP-initiated) is locked or not. The lock may be implemented using one bit in a memory or register.

If it is locked (output "yes" at test 1551), no switch can be performed and the current mode is kept. The next step is step 1555.

Otherwise (output "no" at test 1551), the current mode can be switched to the other mode, i.e. either local mode to AP-initiated mode, or the reverse. This is step 1552, at the end of which the new mode is locked (a locking bit in the register is set to "on"). The next step is step 1555.

Back to step 1550, if the evaluated use efficiency measure is above THR1 (output "no" at test 1550), the next steps are used to determine whether or not the current mode can be unlocked.

To do so an unlocking criterion is evaluated at step 1553 using THR2, for instance the evaluated use efficiency measure is compared to THR2, e.g. 32% for the above mentioned ratio. This idea behind step 1553 is to allow the current mode to be unlocked only if it has provided some benefits in the use of the random RUs.

If the unlocking criterion is not met (e.g. the evaluated use efficiency measure remains below THR2), the current mode is kept locked by going to next step 1555.

Otherwise (the unlocking criterion is met), the current mode is unlocked (the locking bit in the register is set to "off"). It means that the current mode is locked until an evaluated use efficiency measure reaches a second predefined efficiency threshold. The next step is step 1555.

In a variant shown through the optional step 1556, it may be decided to unlock the current mode in case the last mode switch occurred a long time ago (a time threshold may be used). This is to avoid blocking the network in a specific mode with low efficiency, in case the other mode could provide better results. Indeed, after the unlocking due to expiry of the time threshold, the AP can switch to the other mode in case the evaluated use efficiency measure remains low.

Following the hysteresis steps, step 1555 consists to set the TBD Information Element to the appropriate value depending on the current mode. If the current mode is the local mode, then the TBD Information Element is set to UNDEFINED (similarly to step 1510). On the other hand, if the current mode is the AP-initiated mode, the TBD Information Element is set to the TBD parameter (value) obtained at step 1504 (similarly to step 1511).

Once the TBD Information Element has been set at step 1510 or 1511 (or 1555 in FIG. 20a), it is inserted in the next trigger frame to be sent. Thus, next steps 1512/1513 consist for the AP to build and send the next trigger frame with the above determined information: Random RUs information and TBD value (in the TBD Information Element).

It is expected that every nearby node (legacy or 802.11ac, i.e. which is neither STA1 nor STA2) can receive the TF on its primary channel. Each of these nodes then sets its NAV to the value specified in the TF frame: the medium is thus reserved by the AP.

The process of FIG. 20 can be performed at each new trigger frame (step 1501 occurs following transmissions triggered by a trigger frame). However, it may be contemplated performing the process at each N (integer) trigger frames, in order to reduce the maximum frequency of switching. This is to have time to accurately evaluate the RU use efficiency of the mode (local or AP-initiated) to which the network has switched.

Figure 15:
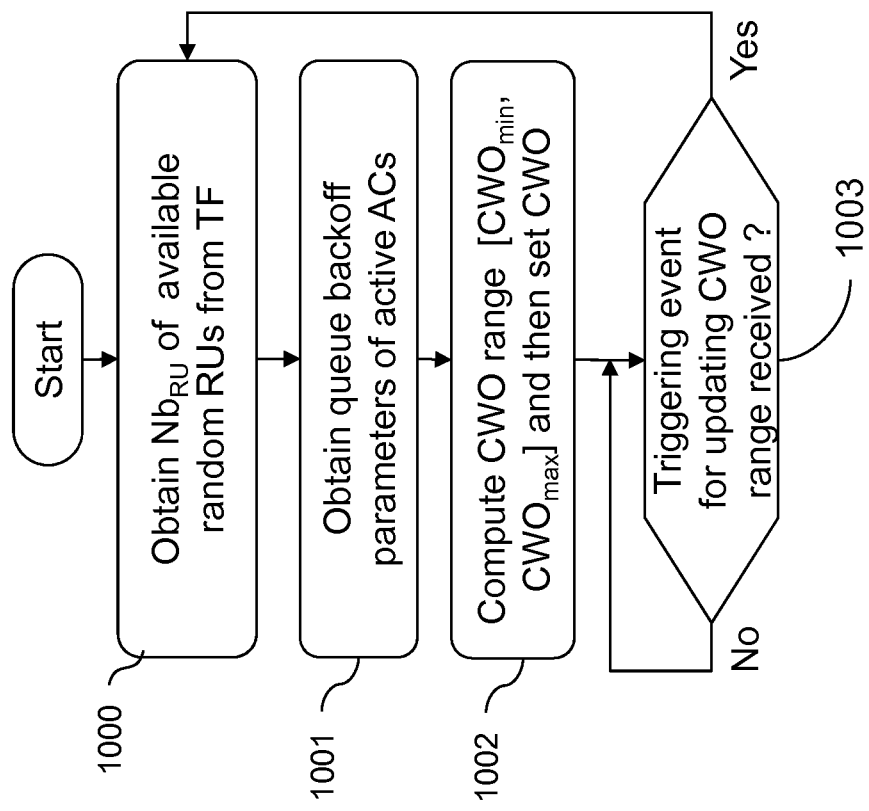
FIG. 15 illustrates, using a flowchart, main steps for setting an RU backoff parameter, namely contention window size CWO for OFDMA contention, in first embodiments of the invention.

FIG. 15 illustrates, using a flowchart, main steps for setting (including initializing) CWO at node 600. In other words, it describes a first sub-step within step 903 to prepare a random access (contention) for (UL) MU OFDMA transmission in the context of 802.11. It may include computing RU backoff parameters.

It starts initially when node 600 receives (e.g. locally from upper layer 701) new data in any of its AC queue 310 or its general transmission buffer, to be addressed to the AP.

At step 1000, node 600 determines the number $Nb_{RU}$ of random RUs, i.e. of the RUs available for contention, to be considered for the multi-user TxOP upon next grant. This information may be provided by the AP through beacon frames or trigger frames themselves, or both. For instance, the information may be retrieved from the last TF detected. An initial value may be used as long as no TF (or beacon frame) is detected.

When the information is conveyed inside a Trigger Frame TF, it may be deduced by counting the number of random RUs, that is to say each RU having an associated address identifier (AID) equal to 0 (contrary to Scheduled RUs which have non-zero AIDs).

Step 1000 may be optional in embodiments where the RU backoff parameters (and thus the computation of CWO) are not function of the number $Nb_{RU}$ of random RUs.

Next, at step 1001, node 600 obtains queue backoff parameters for the active ACs. Indeed, they may be used to compute the RU backoff parameters for OFDMA access as described below. These queue backoff parameters may be retrieved from the active queue backoff engines 311. At step 903, we know that at least one AC is active, but also that data it stores are intended to the AP.

Each active AC maintains contention window size CW of its contention window range [0,CW] within the interval [$CW_{min}$, $CW_{max}$], and uses it to select the random queue backoff value.

Thus, examples of queue backoff (AC) parameters are the following:
  boundaries ($CW_{min}$, $CW_{max}$);
  arbitration interframe spaces (AIFS);
  contention window size CW.

Next to step 1001, step 1002 consists for node 600 in computing the selection interval [$CWO_{min}$, $CWO_{max}$] and then CWO. It may be based on the retrieved queue backoff parameters.

In the first improvements of the invention, step 1002 is based on the TBD parameter received from the AP in a Trigger Frame, in particular the last received Trigger Frame. In particular, the contention window size, i.e. CWO, is determined (directly or indirectly through $CWO_{min}$ and/or $CWO_{max}$) based on the TBD parameter received from the access point.

In the second improvements of the invention, step 1002 is based on a success or failure in transmitting data during a previous RU access. A local value of CWO may be doubled or the like in case of failure, in order to restrict transmissions in case of collisions, which in turn reduces the probability of collisions and thus improves use of the communication network.

Step 1002 may include two sub-steps:
- a first sub-step to determine $CWO_{min}$ and $CWO_{max}$, wherein at least one of $CWO_{min}$ and $CWO_{max}$, preferably both, is an RU backoff parameter determined based on one or more queue backoff parameters;
- a second sub-step to compute or select CWO from range $[CWO_{min}, CWO_{max}]$.

This ensures CWO to be dependent on the current EDCA parameters, such as the CWs. As a consequence, this advantageously takes into account the priorities raised by EDCA ACs in the process of computing the RU backoff parameters for OBO.

However, in a more general approach that does not take into account the data traffic ACs, $CWO_{min}$ and $CWO_{max}$ can be computed using other parameters or using the backoff parameters defining the sole general transmission buffer.

According to some embodiments of the second improvements, $CWO_{min}$ and $CWO_{max}$ and CWO are computed only from information computed locally by node 600. This is for instance the case in the process of FIG. 18 described below.

Regarding the first sub-step, as the targeted transmission is of UL OFDMA type, RU backoff parameters $CWO_{min}$ and $CWO_{max}$ should be computed differently than the corresponding $CW_{min}/CW_{max}$ values of the EDCA scheme.

As an example, $CWO_{min}$ may be set to the number of random resource units defined in a received trigger frame: $CWO_{min}=Nb_{RU}$. This improves usage OFDMA RUs. This advantageously does not take into account the ACs.

As another example, $CWO_{min}$ may be the lowest lower boundaries ($CW_{min}$) from selection intervals $[CW_{min}, CW_{max}]$ of the active queue backoff engines at node 600, i.e. having non-zero queue backoff values:

$CWO_{min}=Min(\{CW_{min}\}_{active\ AC})$. This option is preferably performed when the $CW_{min}$ are greater than the number of random RUs. Indeed, there is no interest to have $CW_{min}$ lower than $Nb_{RU}$ since the risk of collisions would be very high.

As another example, $CWO_{min}$ may be set both according to the lowest lower boundaries ($CW_{min}$) from selection intervals $[CW_{min}, CW_{max}]$ of the active queue backoff engines at node 600 (i.e. having non-zero queue backoff values), and according to the number of random RUs:

$$CWO_{min}=Min(\{CW_{min}\}_{active\ AC}) \times Nb_{RU}.$$

In case of a single general transmission buffer, $CW_{min}$ for this buffer may be used to compute $CWO_{min}$ according any of the above formulae.

Similarly regarding $CWO_{max}$, it may be set to an upper boundary ($CW_{max}$) of a selection interval $[CW_{min}, CW_{max}]$ of the active queue backoff engine 311 having the lowest non-zero queue backoff value, i.e. the next AC to transmit, reflecting the highest priority AC: $CWO_{max}=(CW_{max})_{lowest\ non-zero\ AC}$. This exemplary configuration advantageously takes the same priority as the AC.

In another example, $CWO_{max}$ may be a mean of upper boundaries ($CW_{max}$) of selection intervals $[CW_{min}, CW_{max}]$ of the active queue backoff engines 311, i.e. having non-zero queue backoff values:

$CWO_{max}=average(\{CW_{max}\}_{active\ AC})$. This exemplary configuration advantageously takes a medium priority, and is more relaxed compared to the first exemplary configuration.

In another example $CWO_{max}$ may be the highest upper boundaries ($CW_{max}$) from selection intervals $[CW_{min}, CW_{max}]$ of the active queue backoff engines 311, i.e. having non-zero queue backoff values:

$CWO_{max}=max(\{CW_{max}\}_{active\ AC})$. Thus node 600 is even more relaxed. This exemplary configuration advantageously ensures that OFDMA will not take a medium priority lowest than EDCA.

In case of a single general transmission buffer, $CW_{max}$ for this buffer may be used to compute $CWO_{max}$ according to any of the above formulae.

According to a particular option, the various configurations may be used in turns, instead of selecting only one of them. Either the configuration to use is randomly selected, or it may be based on use statistics: for instance if feedback information of large number of collisions is received, the third configuration may be used. Another configuration will be used as soon as the feedback information informs of a number of collisions under a predefined threshold.

Regarding the second sub-step, CWO may be initially assigned the $CWO_{min}$ value. Exemplary embodiments for updating of CWO are described below with reference to FIG. 17. CWO may be allowed to increase up to the upper bound $CWO_{max}$ value as the node attempts to access and use random RUs.

For instance, CWO is updated depending on a success or failure in transmitting the data when accessing one or more random RUs.

In embodiments, CWO is doubled in case of transmission failure, and may start with an initial value equal to $CWO_{min}$. As successive attempts fail, $CWO=CWO_{min}*2^n$, where n is the number of successive transmission failures for the node computing CWO.

In other embodiments that takes into account variations over time, $CWO(t)=CWO_{min}(t)*2^n$, where n is the number of successive transmission failures. Specifically, $CWO_{min}(t)$ may be the number of random resource units defined in a current trigger frame received at time t, i.e. the last received trigger frame.

According to some embodiments of the first improvements, at least one of $CWO_{min}$ and $CWO_{max}$ and CWO depends on the RU collision and unuse factor TBD received from another node (preferably from the Access Point). This is for instance the case in the process of FIG. 19 described below. As CWO usually depends on $CWO_{min}$ and $CWO_{max}$ (it is selected from the selection range defined by these two values), the contention window size CWO is also determined based on the TBD parameter received from the access point when it is $CWO_{min}$ or $CWO_{max}$ that directly depends on TBD.

For instance, $CWO_{min}$ may be computed as described above for the second embodiments of the invention (e.g. $CWO_{min}$ is the number of random resource units defined in the trigger frame), and CWO may be function of $CWO_{min}$ and of the received TBD parameter. As an example, CWO is set to $2^{TBD}*CWO_{min}$. Note that this value may be upper bounded by a $CWO_{max}$ value as determined above.

As a variant, CWO is set to $TBD*CWO_{min}$.

Of course, these variants mirror the variants implemented at the AP to compute TBD. The transmitted TBD parameter is such that the final calculation of CWO is preferably according to the following formula: $2^{CRF}*CWO_{min}$, wherein CRF=$\alpha$*(Nb_collided_RU/Nb_RU_total).

In other embodiments, CWO is directly TBD as received.

In yet other embodiments, $CWO_{min}$ or $CWO_{max}$ is directly TBD as received. Then CWO may be randomly selected from [$CWO_{min}$, $CWO_{max}$] and indirectly depends on the TBD parameter received from the AP.

In yet other embodiments, CWO is selected as an entry of a predefined table of contention window sizes (defined above with reference to FIG. 20), wherein TBD received from the access point identifies the entry to select in the predefined table.

However, as long as the TBD parameter is not received, optional variants may be implemented. In a first variant, the second embodiments of the invention as defined above may be applied meaning that an initial value ($CW_{min}$) is assigned to CWO. In a variant, a local RU collision factor CF, thus built locally for instance from past history, may be used. This ability for the node to switch between a global (AP-initiated) approach and a node local approach is further explained below, in particular with reference to FIG. 21.

Next to step 1002, step 1003 checks whether a triggering event for updating the RU backoff parameters is detected, before a new OFDMA access is performed.

Some triggering events may come from the AP.

For instance, similarly to the EDCF parameters (AIFS [AC], $CW_{min}$[AC] and $CW_{max}$[AC]), the AP may announce the number $Nb_{RU}$ of random RUs through beacon frames, of alternatively (or in combination with) through the trigger frames. Indeed, the AP can dynamically adapt the number $Nb_{RU}$ of RUs depending on network conditions. An example of such adaptation is given above in connection with the building of the TBD parameter at AP side. Thus a triggering event for node 600 may be receiving a new trigger/beacon frame defining a number of random resource units that is different from a current known number of random resource units.

Other triggering events may be produced locally by node 600.

For instance, as mentioned above, data newly stored in a previously empty AC traffic queue 310 activate the corresponding queue backoff engine 311. A corresponding triggering event may thus be detecting that an empty traffic queue from the plurality of traffic queues has now received data to transmit, in which case the CW parameters of this newly activated queue backoff engine may be taken into account to compute the CWO range anew.

More generally, a triggering event may consist in detecting a change in at least one queue backoff parameter used to determine the one or more RU backoff parameters, i.e. when one of the reference queue backoff parameters has changed. Note that it is not the case for beacon frames indicating the same parameters.

Figure 17:
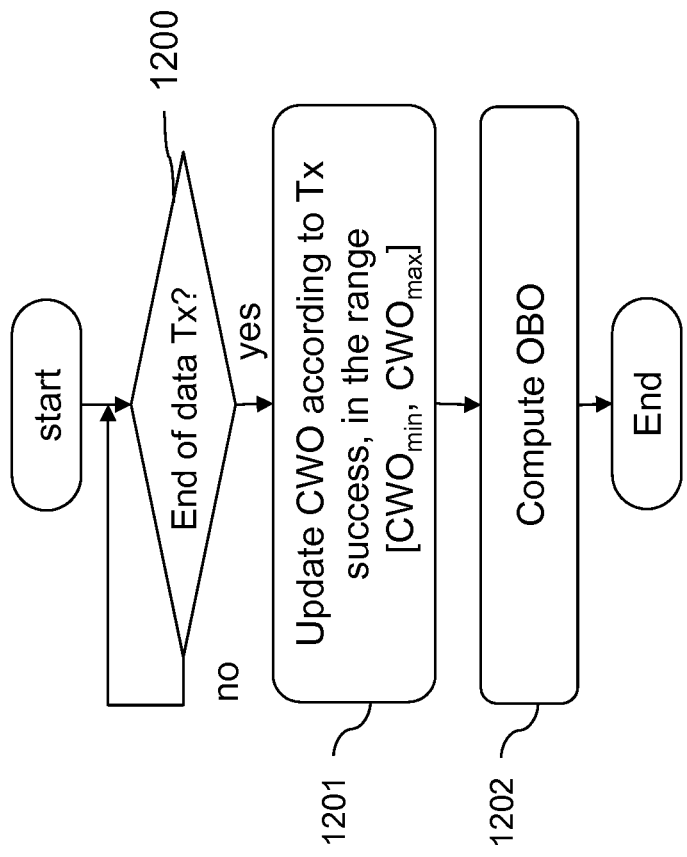
FIG. 17 illustrates, using a flowchart, exemplary steps for updating RU backoff parameters and value upon receiving a positive or negative acknowledgment of a multi-user OFDMA transmission, in first embodiments of the invention.
Figure 18:
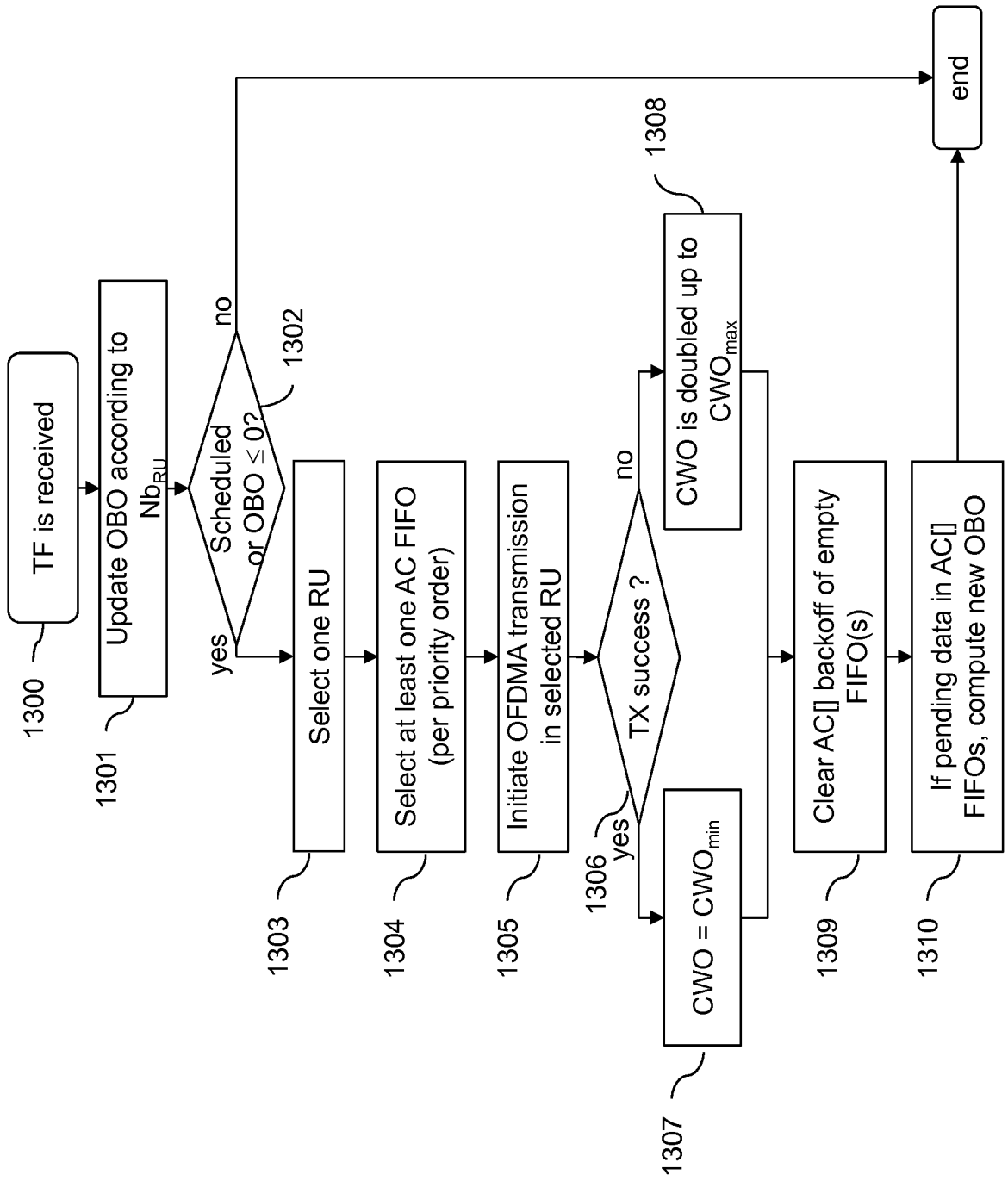
FIG. 18 illustrates, using a flowchart, first exemplary embodiments of accessing the medium based on the OFDMA medium access scheme, and of locally updating the RU backoff parameters, such as the contention window size CWO, when a new trigger frame is received.

In specific embodiments, illustrated for instance in the process of FIGS. 17 and 18, a triggering event may be the end of OFDMA transmission and thus the reception of a positive or negative acknowledgment of a previous transmission of data in an RU.

Figure 19:
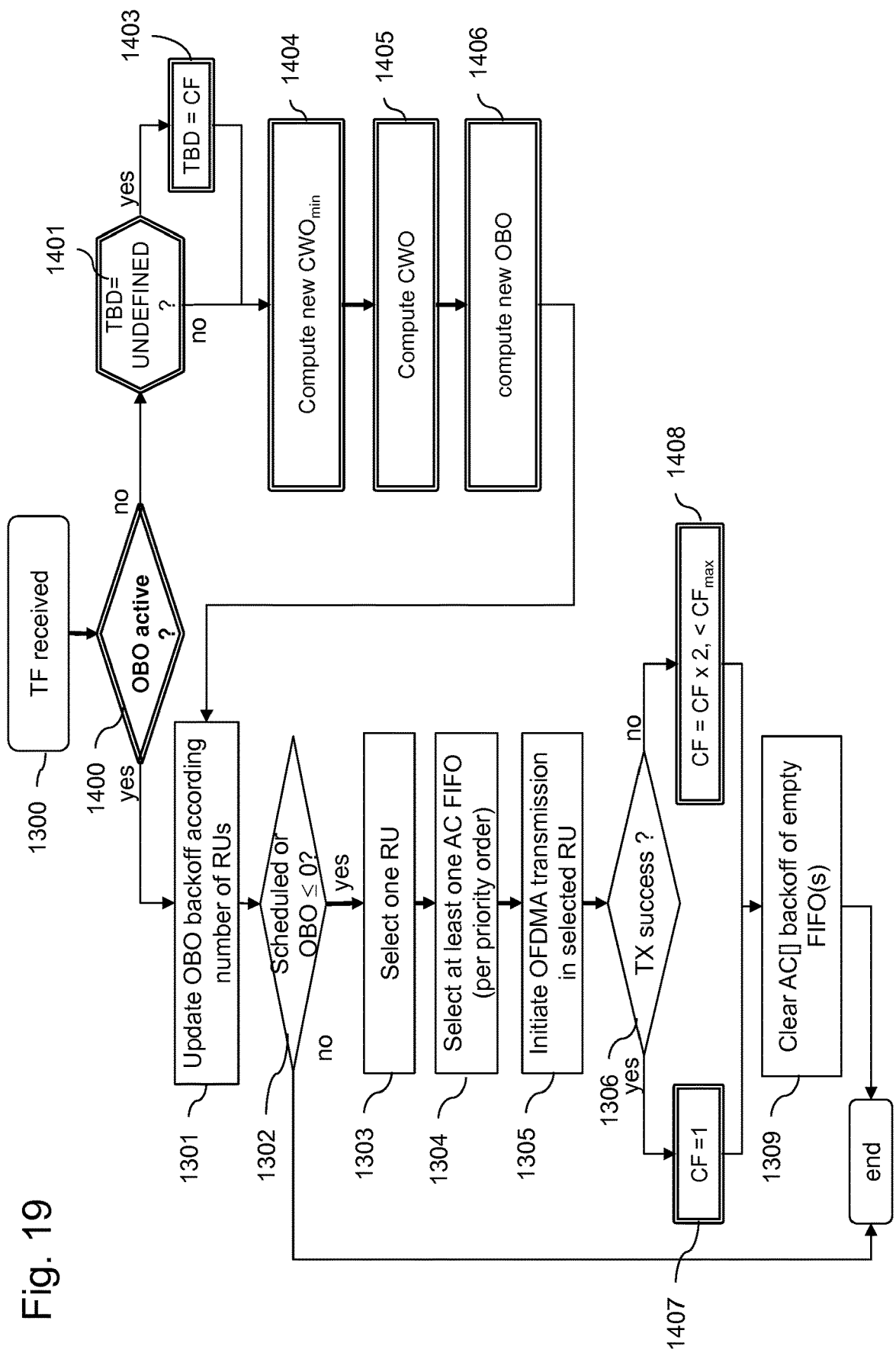
FIG. 19 illustrates, using a flowchart, second exemplary embodiments of accessing the medium based on the OFDMA medium access scheme, and of updating the RU backoff parameters, either locally or based on a received TBD parameter, when a new trigger frame is received.

In other specific embodiments, illustrated for instance in the process of FIG. 19, a triggering event may be the reception of a new trigger frame.

Upon receiving any triggering event, the process of FIG. 15 loops back to step 1000 to obtain $Nb_{RU}$ and queue backoff parameters again if appropriate and then to compute new RU backoff parameters.

This ends the process of FIG. 15.

Figure 16:
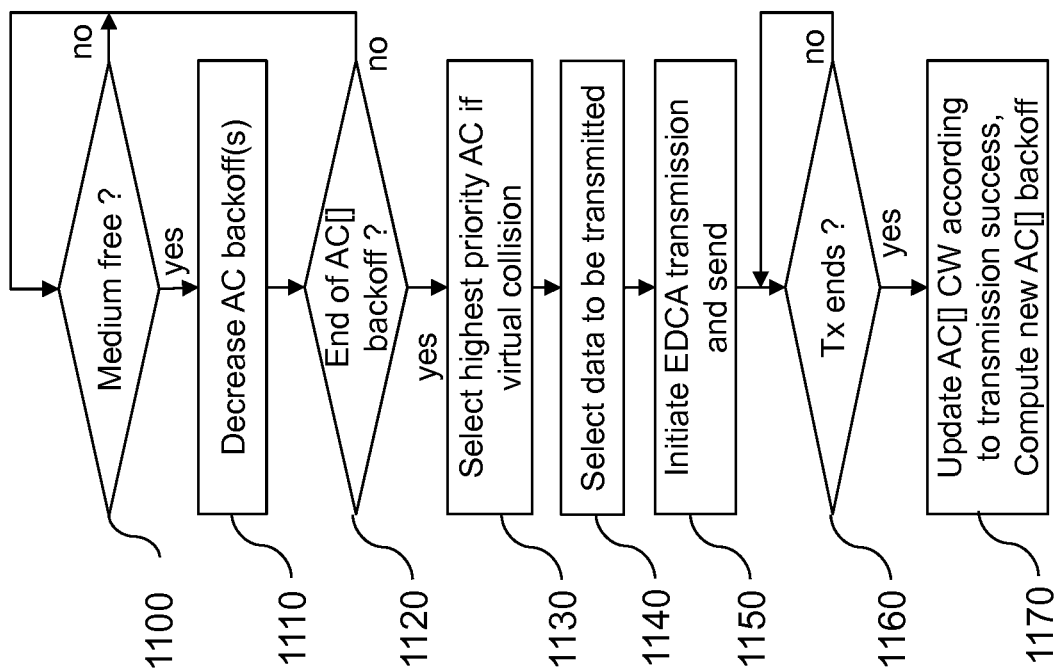
FIG. 16 illustrates, using a flowchart, steps of accessing the medium based on the conventional EDCA medium access scheme, in first embodiments of the invention.

FIG. 16 illustrates, using a flowchart, steps of accessing the medium based on the conventional EDCA medium access scheme.

Steps 1100 to 1120 describe a conventional waiting introduced in the EDCA mechanism to reduce the collision on a shared wireless medium. In step 1100, node 600 senses the medium waiting for it to become available (i.e. detected energy is below a given threshold on the primary channel).

When the medium becomes free, step 1110 is executed in which node 600 decrements all the active (non-zero) AC[ ] queue backoff counters 311 by one.

Next, at step 1120, node 600 determines if at least one of the AC backoff counters reached zero.

If no AC queue backoff reaches zero, node 600 waits for a given time corresponding to a backoff slot (typically 9 µs), and then loops back to step 1100 in order to sense the medium again.

If at least one AC queue backoff reaches zero, step 1130 is executed in which node 600 (more precisely virtual collision handler 312) selects the active AC queue having a zero queue backoff counter and having the highest priority.

At step 1140, the data from this selected AC are selected for transmission.

Next, at step 1150, node 600 initiates an EDCA transmission, in case for instance an RTS/CTS exchange has been successfully performed to have a TxOP granted. Node 600 thus sends the selected data on the medium, during the granted TxOP.

Next, at step 1160, node 600 determines if the transmission has ended, in which case step 1170 is executed.

At step 1170, node 600 updates CW of the selected traffic queue, based on the status of transmission (positive or negative ack, or no ack received). Typically, node 600 doubles the value of CW if the transmission failed until CW reaches a maximum value defined by the standard 802.11 and which depends on the AC type of the data. If the transmission is successful, CW is set to a minimum value also defined by the 802.11 standard and which is also dependent on the AC type of the data.

Then, if the selected traffic queue is not empty after the EDCA data transmission, a new associated queue backoff counter is randomly selected from [0,CW], like in step 902.

This ends the process of FIG. 16. Note that this process can be applied in a similar manner (but with only one AC queue) in case a single general transmission buffer is considered.

FIG. 17 illustrates, using a flowchart, exemplary steps for updating the RU backoff parameters and value upon receiving a positive or negative acknowledgment of a multi-user OFDMA transmission.

It is recalled that in a simple implementation, the RU backoff value OBO is used to determine if node 600 is eligible to contend for access to an OFDMA resource unit: OBO should be not greater than the number of available random RUs in order to allow for an UL OFDMA transmission for node 600. Scheduled RUs are accessible to node 600 if indicated as such by the AP, independently of RU backoff value OBO.

Thus step 1200 happens during such an UL OFDMA transmission in a random RU (when decremented OBO reaches zero).

Step 1201 is executed when the UL OFDMA transmission finishes on an accessed random RU, upon having the status of transmission; either by receiving a positive or negative acknowledgment from the AP, or by inferring loss of data (in case no ack is received).

At step 1201, the contention window size CWO is updated depending on a success or failure in transmitting the data. This step and following step 1202 are performed if needed only. In particular, if the ending transmission has sent all the data intended to the AP (i.e. no more of such data remain in all the traffic queues), there is no need to keep the RU backoff engine active. It is thus deactivated, by clearing OBO value.

If the update is needed, when an OFDMA transmission fails (e.g. the transmitted data frame has not been acknowledged), a new CWO value may be computed for instance.

In particular, CWO may be doubled, for instance $CWO=2\times(CWO+1)-1$ or $CWO=2*CWO$. This illustrates some embodiments of the second improvements.

As CWO may be initially assigned $CWO_0=CWO_{min}$ value and may increase up to $CWO_{max}$ value, this approach makes that $CWO_n=CWO_0*2^n$, where n is the number of successive fails when trying to access the network and send data. For instance $CWO_0=CWO_{min}$ as defined above. More precisely, $CWO_n=\min(CWO_0*2^n; CWO_{max})$.

To illustrate this, three successive attempts may be considered as follows:

For the first access attempt: $CWO=CWO_0$
For the second access attempt: $CWO=CWO_1=CWO_0*2^1$
For the third access attempt: $CWO=CWO_2=CWO_0*2^2=CWO_1*2$.

In other embodiments of the second improvements, $CWO_n=\min(CWO_{min}(t)*2^n; CWO_{max})$.

Again, n is the number of successive failing attempts. $CWO_{min}(t)$ is a value that evolves over time. Indeed, $[CWO_{min}, CWO_{max}]$ from which CWO is selected may evolve over time.

For instance, as the number of random RUs in the trigger frames usually evolves over time, it may be worth updating $CWO_{min}$ based on this evolving number of random RUs. This is why $CWO_{min}$ evolves over time, as noted by $CWO_{min}(t)$.

Thus the above embodiments take into account the TF characteristics changes (number of random RUs) as well as the collision history (failing attempts). This may be important in network that substantially evolves over time. Indeed, the probability to have two successive trigger frames with the same characteristics (same number of random RUs, same type of data required, same width of the RU, etc.) may be low. So an approach able to dynamically adapt the CWO value to the current TF characteristics provides benefits.

To illustrate this dynamic approach, let consider three successive attempts, as follows:

For the first access attempt: $CWO=CWO_{min}(t=0)=Nbr\_rRU$ (number of random RUs) of TF0, where TF0 is the trigger frame corresponding to the first transmission attempt by node;

For the second access attempt (in case of failing first attempt): $CWO=CWO_1=CWO_{min}(t=1)\times 2^1$, where $CWO_{min}(t=1)=Nbr\_rRU$ of TF1, where TF1 is the trigger frame corresponding to the second transmission attempt by node. Nbr_rRU of TF1 can be different from Nbr_rRU of TF0;

For the third access attempt: $CWO=CWO_2=CWO_{min}(t=2)\times 2^2$, where $CWO_{min}(t=2)=Nbr\_rRU$ of TF2, where TF2 is the trigger frame corresponding to the third transmission attempt of current data by station In variants illustrating some embodiments of the first improvements, a new CWO value may be obtained using TBD as received from the AP as described above, e.g. $CWO=2^{TBD}*CWO_{min}$ or $CWO=TBD*CWO_{min}$ or $CWO=TBD$ or CWO is defined by the table entry having TBD as entry index, or CWO is randomly selected from $[CWO_{min}, CWO_{max}]$ where $CWO_{min}$ or $CWO_{max}$ equals TBD, depending on which approach the AP adopts.

This reduces the collision probability in case there are too many nodes attempting to access the RUs.

In case the OFDMA transmission succeeds, CWO may be reset to a (predetermined) low boundary, such as $CWO_{min}$.

This description of step 1201 reflects a local point of view at node 600.

Next to step 1201, step 1202 consists in computing a new RU backoff value OBO based on the updated contention window size CWO. The same approaches as described above with reference to step 903 can be used: for instance OBO=random[0, CWO], OBO=random[0, CWO]+AIFS [AC].

This ends the process of FIG. 17.

FIG. 18 illustrates, using a flowchart, first exemplary embodiments of accessing the medium based on the OFDMA medium access scheme, and of locally updating the RU backoff parameters, such as the contention window size CWO, when a new trigger frame is received at transmitting node 600. This Figure illustrates some embodiments of the second improvements according to the invention.

It means that node 600 has data to transmit, and thus has at least one active EDCA queue backoff engine 311. Furthermore, node 600 has a non-zero RU backoff value OBO, meaning that it has data to send to the AP upon receiving the trigger frame. The same process can be applied in case the node has a single general transmission buffer, in which case a single AC queue is considered.

At step 1300, node 600 checks whether or not it has received an 802.11a frame in a non-HT format. Preferably, the type of the frame indicates a trigger frame (TF), and the Receiver Address (RA) of the TF is a broadcast or group address (i.e. not a unicast address corresponding specifically to node 600's MAC address).

Upon receiving the trigger frame, the channel width occupied by the TF control frame is signaled in the SERVICE field of the 802.11 data frame (the DATA field is composed of SERVICE, PSDU, tail, and pad parts). An indication that the control frame is a Trigger Frame may be provided in frame control field 301, which indicates the type of the frame. In addition, frame control field 301 may include a sub-type field for identifying the type of the trigger frame, such as a TF-R.

As noted above, even without such sub-type field, the random RUs can be determined using for instance the AID associated with each RU defined in the TF (AID=0 may mean random RU). So the number of random Resource Units supporting the random OFDMA contention scheme is known at this stage. Obtaining the number of random RUs may be advantageously performed if the number of random RUs varies from one TF to the other.

Next, at step 1301, node 600 consists in decrementing the RU backoff value OBO based on the number $Nb_{RU}$ of random resource units defined in the received trigger frame: $OBO=OBO-Nb_{RU}$. This is because node 600 is determined as being an eligible node to transmit data in an OFDMA random RU, if its pending RU backoff value OBO is not greater than the number of OFDMA random RUs.

Step 1301 thus updates OBO value upon receiving a new trigger frame.

In a slight alternative, decrementing the RU backoff value is also based on the RU collision and unuse factor TBD received from another node.

For instance, $OBO=(OBO-Nb_{RU})*TBD$. As a result, this alternative embodiment updates RU backoff value OBO with an AP's parameter upon each OFDMA transmission.

In another example, OBO=OBO−($Nb_{RU}$*TBD). This formula thus adapts the speed of decrementing OBO to the network conditions, through factor TBD.

Next to step 1301, step 1302 consists for node 600 in determining whether it is an eligible node for transmission. This means either a scheduled RU of the TF is assigned to node 600 or its RU backoff value OBO is less or equal to zero.

As alternative, and if node 600 supports concurrent OFDMA transmission capabilities, both cases (scheduled RU and OBO is less or equal to zero) are handled and steps 1303 to 1310 are conducted in parallel for the two accesses.

In case of no eligibility, the process ends.

In case of eligibility, node 600 selects one RU for sending the data. It is either the assigned scheduled RU, or a random RU selected from the $Nb_{RU}$ random RUs of the TF (either randomly or using the RU backoff value OBO before step 1301 as an index to select the random RU having the same index). This is step 1303.

Once the RU for OFDMA transmission has been determined, step 1304 selects data to transmit to the AP, usually from one or more of the active AC traffic queues 310. OFDMA muxer 801 is in charge of selecting such data to be transmitted, from among at least one AC traffic queue 310.

Note that during an MU OFDMA TXOP (i.e. transmission in an RU), node 600 is allowed to transmit multiple data frames (MPDUs) from the same AC traffic queue, with the condition that the whole OFDMA transmission lasts the duration originally specified by the received trigger frame (i.e. the TxOP length).

Of course, if not enough data is stored in the selected AC traffic queue, another or more active AC traffic queue may be considered.

Generally speaking, the data frames from the active ACs having the highest priority are selected. "Highest priority" may means having the lower queue backoff value, or having the highest priority according to EDCA traffic class prioritization (see FIG. 3b).

Next to step 1304, step 1305 consists for node 600 in initiating and performing a MU UL OFDMA transmission of the selected data (at step 1304) in the selected RU (at step 1303).

As commonly known, the destination node (i.e. the AP) will send an acknowledgment related to each received MPDU from multiple users inside the OFDMA TXOP (see step 1502).

Preferably, the ACK frame is transmitted in a non-HT duplicate format in each 20 MHz channel covered by the initial TF's reservation. This acknowledgment can be used by the multiple source nodes 600 to determine if the destination (AP) has well received the OFDMA MPDUs. This is because source nodes 600 are not able to detect collisions inside their selected RUs.

Thus at step 1306, node 600 obtains a status of transmission, for instance receives an acknowledgment frame.

In case a scheduled RU of the TF is assigned to node 600, as the OFDMA access is not granted through OBO, then the algorithm goes directly to step 1309 (arrow not shown in the figure).

Otherwise, the algorithm continues either at step 1307 or at step 1308. In case of positive acknowledgment, the MU UL OFDMA transmission is considered as a success and step 1307 is executed. Otherwise, step 1308 is executed.

In case of successful OFDMA transmission on the selected random RU, CWO is set to a (predetermined) low boundary value, for instance $CWO_{min}$, at step 1307.

In case of failing OFDMA transmission, CWO is doubled, for instance CWO=2×(CWO+1)−1, at step 1308. Note that CWO cannot be above $CWO_{max}$.

As mentioned above, other variants exist, for instance: CWO=CWO*2; CWO=$CWO_{min}$*$2^n$; CWO(t)=$CWO_{min}$(t)*$2^n$; etc.

Next to step 1307 or 1308, step 1309 consists for node 600 in deactivating the AC queue backoff engines that have no more data to transmit. This is because due to the UL MU transmission, some AC queues may have been emptied from the transmitted data. In such a case the corresponding queue backoff value is cleared (the value is no longer taken into account to compute the RU backoff values and to EDCA access the medium).

As long as the selected (at step 1304) AC queue engines still stores data to be transmitted in their respective traffic queues, their respective (non-zero) queue backoff is kept unchanged. Note that in any case, as only an OFDMA access has been performed (and not over the EDCA channel), the AC contention window values CW of the queue backoff engine(s) 311 (EDCA CW) are not modified.

Next to step 1309, step 1310 consists for node 600 to determine whether or not a new RU backoff value OBO has to be computed. This is because value OBO has expired (test 1302) and data intended to the AP have been consumed.

Thus, it is first determined whether or not data intended to the AP remain in any of the AC traffic queues. In case of positive determination, a new OBO value is computed. Otherwise, the RU backoff engine is deactivated.

The computation of OBO value may be according to any approach described above with reference to step 903, for instance OBO is determined as a random integer selected from contention window range [0, CWO] uniformly distributed.

This ends the process of FIG. 18.

FIG. 19 illustrates, using a flowchart, second exemplary embodiments of accessing the medium based on the OFDMA medium access scheme, and of updating the RU backoff parameters, either locally or based on a received TBD parameter, when a new trigger frame is received at transmitting node 600.

This Figure illustrates some embodiments of the first improvements according to the invention which are based on the TBD parameter transmitted by the AP.

It also illustrates some of the second embodiments, when no TBD parameter is received from the AP. Thus it is also a first illustration of a decision by the node to switch between these two approaches: the AP-initiated mode to compute CWO (using transmitted TBD) and the local mode (using only values local to the node).

Compared to the example of FIG. 18, the embodiment of FIG. 19 involves use of an adjustment/correcting parameter issued from the AP, namely the above-mentioned TBD parameter, to compute CWO. The TBD parameter, reflecting the AP point of view of collisions in overall 802.11ax network, may evolve over time and be provided in the TFs.

Until a first TBD parameter is received by node 600, the latter manages a corresponding local parameter, namely local RU collision factor CF. Local factor CF will allow to use local statistics instead of AP parameter for applying steps 1404 to 1405 further explained below.

In this second exemplary embodiment, the computation of RU backoff parameters (including CWO) is performed upon reception of the trigger frame, and not when new data arrive from an upper layer application 701 (as in the case of above step 903).

Thus steps 1400 to 1408 are new compared to FIG. 18. Steps 13xx are similar to step 13xx of FIG. 18.

After step 1300 of receiving a new TF, step 1400 aims at determining whether or not the RU backoff parameters should be initialized upon receiving the trigger frame. More precisely, step 1400 consists in determining whether the RU backoff engine is inactive (e.g. OBO value is less or equal to 0) and data intended to the AP are now stored in traffic queues 310 (i.e. it is the first TF received after some first data for the AP have been input in the traffic queues).

In step 1400, the node thus determines whether or not the received trigger frame includes a TBD parameter to drive the node in defining its own contention window size.

In case the RU backoff engine requires to be activated, steps 1401 to 1406 are performed to initialize the RU backoff engine, after which step 1301 is executed. In case the RU backoff engine is already active, step 1301 is directly executed.

The initialization sequence (steps 1401-1406) consists first for node 600 in checking whether or not a TBD parameter has been received from the AP (step 1401). By sending or not the TBD parameter (i.e. setting a TBD value or an UNDEFINED value in the appropriate field of the trigger frame), the AP thus controls how the nodes compute their own CWO value.

If such TBD parameter has been received, steps 1404-1406 are performed. Otherwise, the un-initialized TBD parameter is initialized with the local CF value (step 1403): here node 600 acts alone for adapting the CWO value, that is to say only in regards to the success of its own past OFDMA transmissions.

The evolving of factor CF is described below with reference to steps 1407-1408.

Next to step 1403, step 1404 is performed during which new RU backoff parameters are determined. For instance a new $CWO_{min}$ value is determined, using any approach as described above with reference to step 1002.

For instance, $CWO_{min}$ may be set with regards to the lowest $CW_{min}$ of the active AC queues: $CWO_{min}=Min(\{CW_{min}\}_{active\ AC})$.

In a variant, $CWO_{min}$ may be set with regards to the lowest $CW_{min}$ of the active AC queues and the number of random RUs: $CWO_{min}=Min(\{CW_{min}\}_{active\ AC}) \times Nb_{RU}$.

In another variant, $CWO_{min}$ may be set to the number of random RUs as declared in the trigger frame received.

In another variant, $CWO_{min}$ may be set to the TBD parameter (which is thus received from the AP or as set through CF).

Next, step 1405 consists for node 600 in computing CWO. This may be done from $CWO_{min}$, and possibly from the TBD parameter.

An example of computation is: $CWO=2^{TBD}*CWO_{min}$ or $CWO=TBD*CWO_{min}$ or CWO=TBD or CWO is defined by the table entry having TBD as entry index, or CWO is randomly selected from [$CWO_{min}$, $CWO_{max}$] where $CWO_{min}$ or $CWO_{max}$ equals TBD. Of course, the formula used may correspond to the mere nature of the TBD value sent by the access point, in order for CWO to be preferably equal to $CWO=2^{CRF}*CWO_{min}$, wherein CRF=α*(Nb_collided_RU/Nb_RU_total) as defined above.

CWO value may be limited to an upper bound, for instance $CWO_{max}$ defined above (step 1002).

As a result, if the TBD parameter is 0, then the minimum value of EDCA $CW_{min}$ may drive the medium access in case $CWO=2^{TBD}*CWO_{min}$:$CW_{min}$=3 for VOICE, so approximately a maximum of two trigger frames to backoff, the third one being the one to access in the worst case.

Thus in step 1405, the node computes a new contention window size CWO based on the received TBD parameter, in case it is positively determined that the received trigger frame includes such TBD parameter, to contend for access to the random resource units splitting the transmission opportunity (i.e. to compute a new OBO value—see step 1406 below). Otherwise, the node uses a local contention window size (e.g. deriving from local factor CF) as new contention window size, to contend for access to the random resource units splitting the transmission opportunity.

Next, at step 1406, node 600 computes the RU backoff value OBO from CWO. See for instance above step 903: e.g. OBO=random[0, CWO].

Back to the positive output of test 1400, the algorithm of FIG. 18 is reused, except for steps 1307 and 1308. They are replaced by steps 1407 and 1408 during which the local RU collision factor CF is updated depending on a success or failure in transmitting the data (instead of directly updating CWO).

Of course, using the doubling approach of steps 1307 and 1308 for setting a new CWO is also possible, in which case step 1403 may set TBD to a value corresponding to the new CWO. For instance, TBD=$log_2(CWO/CWO_{min})$ for the formula $CWO=2^{TBD}*CWO_{min}$.

Factor CF may evolve within the range [0, $CF_{max}$] if formula $CWO=2^{TBD}*CWO_{min}$ is used, wherein $CF_{max}$ is a maximum coefficient: for instance 5. As an alternative, $CF_{max}$ can be drawn according the active EDCA AC queues: $CF_{max}=[(CW_{max})_{AC}+1]/[(CW_{min})_{AC}+1]$, wherein "AC" and "AC'" designate the active queue backoff engines having the highest priority (e.g. the highest EDCA traffic class prioritization of FIG. 3b), or having the highest $CW_{max}$ value and lowest $CW_{min}$ value respectively (that is to say $CW_{max}$=1023 and $CW_{min}$=15, for the Background or Best effort queues)

In a variant, factor CF may evolve within the range [1, $CF_{max}$] if formula $CWO=TBD*CWO_{min}$ is used, with $CF_{max}$=32 for instance.

Thus at steps 1407-1408, factor CF is updated upon each success/failure of OFDMA transmission.

In case of positive acknowledgment, the MU UL OFDMA transmission is considered as a success and step 1407 is executed during which factor CF is set to a (predetermined) low CF value, for instance 1 in case formula $CWO=TBD*CWO_{min}$ is used, or 0 in case formula $CWO=2^{TBD}*CWO_{min}$ is used.

Otherwise, step 1408 (failing OFDMA transmission) is executed in which factor CF is doubled in case formula $CWO=TBD*CWO_{min}$, or is increased by one in case formula $CWO=2^{TBD}*CWO_{min}$. In both cases, it corresponds to the doubling of the corresponding CWO in case of transmission failure. Note that factor CF is kept below $CF_{max}$.

Note that further to step 1309 of handling properly the EDCA queue backoff values, step 1310 is suppressed as the OBO computation is now handled in the initialization phase of steps 1401-1406.

This ends the process of FIG. 19.

The various alternative embodiments presented above with respect to FIGS. 14 to 20 are compatible one with each other, and thus may be combined to take advantage of their respective advantages. For instance, the triggering events (new trigger frame or new data in the AC/transmission buffer) and/or the updating of local CWO (direct doubling or through factor CF) of FIGS. 18 and 19 can be substituted one with the other.

Figure 21:
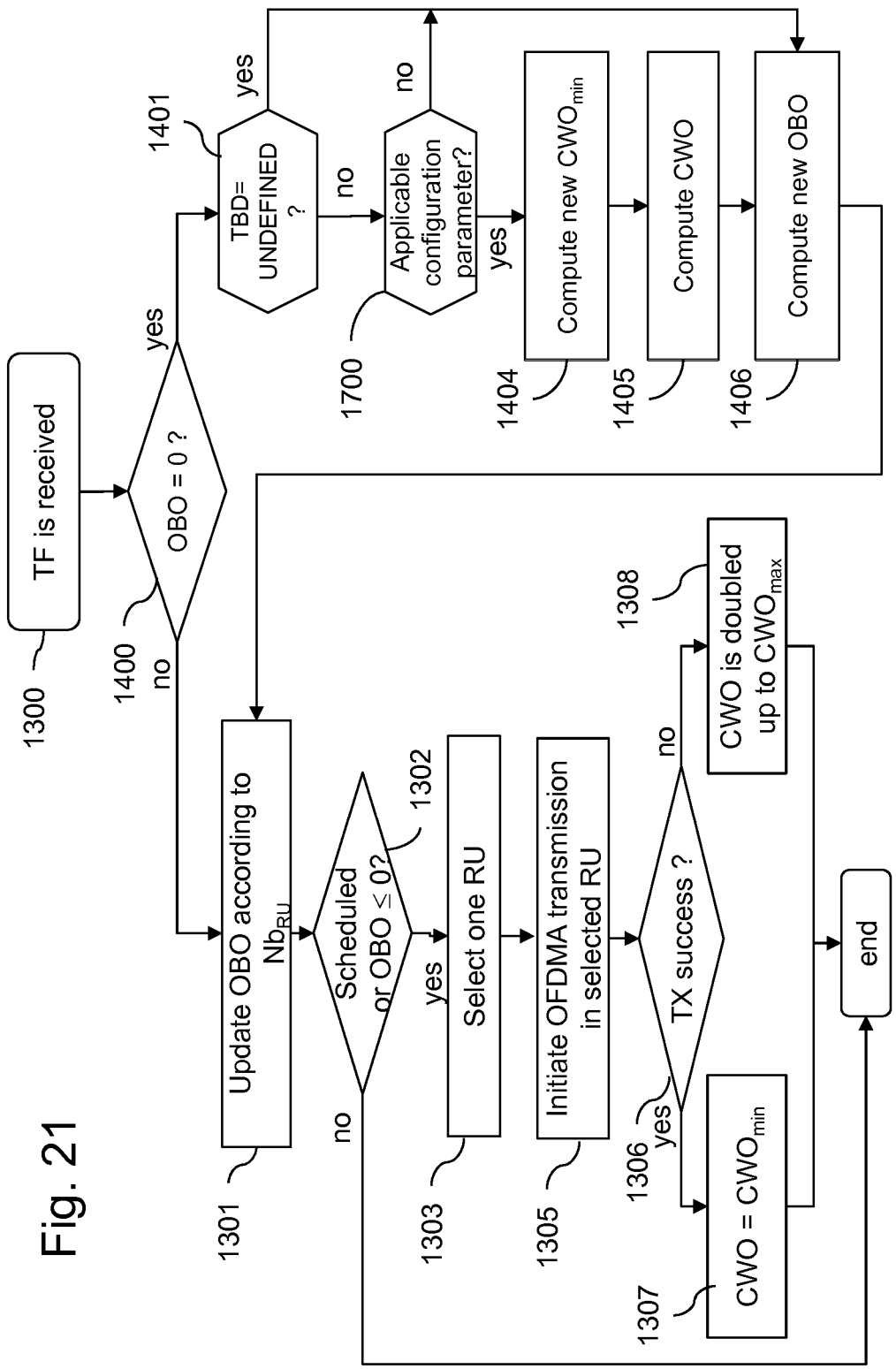
FIG. 21 illustrates, using a flowchart, third exemplary embodiments of accessing the medium based on the OFDMA medium access scheme, and of updating the RU backoff parameters, either locally or based on a received TBD parameter, when a new trigger frame is received.

FIG. 21 illustrates, using a flowchart, third exemplary embodiments of accessing the medium based on the OFDMA medium access scheme and of updating the RU backoff parameters (e.g. CWO), either locally or based on a received TBD parameter, when a new trigger frame is received. Thus it includes computing CWO by the node either through a local approach or through an AP-initiated approach (with the transmitted TBD parameter); it also includes switching between the two approaches.

In the third exemplary embodiments, a single transmission buffer is considered. It implies that steps 1304 and 1309 specific to the management of a plurality of AC queues are avoided.

Step 1700 is new compared to FIGS. 18 and 19. Steps 13xx and 14xx are similar to corresponding steps 13xx and 14xx described above.

Upon receiving a new trigger frame (step 1300), the node determines whether or not OBO value is less or equal to 0 (test 1400), meaning that a new OBO value should be computed.

In case a current positive OBO value is running, meaning that the node currently contends for access to the random RUs defined by the received trigger frame, steps 1301 to 1308 are performed, similar to the process of FIG. 18 in case a single transmission buffer is used.

During this process, the local contention window size, namely local CWO, is updated depending on a success or failure in transmitting the data.

In particular, at step 1307, the local contention window size is set to $CWO_{min}$ which preferably represents the number of random resource units defined in the received trigger frame. At step 1308, the local contention window size CWO is doubled in case of transmission failure. For instance, when the local contention window size is determined as a function of the number $CWO_{min}$ of random resource units defined in a received trigger frame, $CWO=CWO_{min}*2^n$ or $CWO=CWO_{min}(t)*2^n$, where n is the number of successive transmission failures by the node and $CWO_{min}(t)$ is the number of random resource units defined in the trigger frame received at time t.

In case of zero or negative OBO value (test 1400), test 1401 determines whether or not the received trigger frame includes a TBD parameter to drive the node in defining its own contention window size. This test makes it possible to switch between a local approach and an AP-initiated approach to obtain CWO for computing a new OBO value (step 1406).

If the trigger frame does not include a TBD parameter (i.e. TBD field is set to UNDEFINED in the trigger frame), the current local value of CWO (as obtained through the last iteration of step 1307 or 1308) is used to compute a new OBO value (step 1406) for contending for access to the random RUs defined by the received trigger frame.

If the trigger frame sets a TBD value, step 1700 makes it possible to handle the cases where the TBD value is restricted to a specific group of nodes or a specific type of data or any other configuration parameter. Such information is included in the received trigger frame, for instance setting a BSSID as mentioned above for corresponding step 1506 at the AP side.

In such a case for instance, the node checks whether a TBD parameter included in the received trigger frame is assigned to a group of nodes to which the node belongs. In particular, the checking step may include reading a BSSID, Basic Service Set Identification, in the received trigger frame. This is step 1700.

Of course, other information can be read to determine whether or not the set TBD parameter should be applied by the node.

If the TBD parameter should not be applied, the new OBO value is computed (step 1406) using the local CWO value.

Otherwise (the TBD parameter should be applied), steps 1404 and 1405 are performed to compute $CWO_{min}$ and CWO, from the received TBD parameter. These steps are described above.

$CWO_{min}$ may be equal to the number of random RUs in the received trigger frame.

For instance, $CWO=2^{TBD}*CWO_{min}$ or $CWO=TBD*CWO_{min}$ or CWO=TBD or CWO is defined by the table entry having TBD as entry index, or CWO is randomly selected from $[CWO_{min}, CWO_{max}]$ where $CWO_{min}$ or $CWO_{max}$ equals TBD. Of course, the formula used may correspond to the mere nature of the TBD value sent by the access point, in order for CWO to be preferably equal to $CWO=2^{CRF}*CWO_{min}$, wherein $CRF=\alpha*(Nb\_collided\_RU/Nb\_RU\_total)$ as defined above.

Next to step 1405 or 1700 or 1401, the new OBO value can be computed based on CWO newly obtained or on local CWO, when appropriate.

Next, the process loops back to step 1301 to actually contend for access to the random RUs defined by the received trigger frame, given the new OBO value.

It is apparent from the above that in the embodiments of the invention, the management of the access to random RUs through RU backoff engines is fully distributed over the nodes. Furthermore it keeps compliancy with 802.11 standard, in particular because the EDCA prioritization scheme is kept.

Note that the probability of collisions occurring over RUs, or even more low usage of RUs, is monitored by the AP in some embodiments and fed back to the nodes through the TBD parameter. This makes it possible to consider this overall network aspect for each individual medium access at the nodes. This makes it possible to advantageously adapt the medium access to improve OFDMA RU usage.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A wireless communication method in a wireless network comprising an access point and a plurality of nodes, the method comprising the following steps, at one of said nodes:

receiving a trigger frame from the access point, the trigger frame reserving a transmission opportunity on at least one communication channel of the wireless network, the trigger frame defining resource units forming the communication channel including a plurality of random resource units that the nodes are configured to access using a contention scheme, wherein the node has a resource unit, RU, backoff value to be used to contend for access to the random resource units, in order to transmit data, wherein the RU backoff value is distinct from a backoff value to be used by the node to contend access using an enhanced distributed channel access, EDCA, scheme;

based on a current RU backoff value, accessing a random resource unit to transmit data to the access point, after having transmitted the data, computing a new RU backoff value to contend for new access to random resource units, the new RU backoff value being a value randomly selected within a contention window range defined by a RU contention window size, wherein the RU contention window size is updated depending on a success or failure in transmitting the data in the random resource unit, wherein the RU contention window size is distinct from a contention window size from which the EDCA backoff value is randomly selected.

2. The wireless communication method of claim 1, wherein the RU contention window size is set to a low boundary value in case of transmission success.

3. The wireless communication method of claim 2, wherein the low boundary value is predetermined.

4. The wireless communication method of claim 1, wherein the RU contention window size is doubled in case of transmission failure.

5. The wireless communication method of claim 4, wherein due to the doubling, the RU contention window size equals $CWO_{min}*2^n$, where $CWO_{min}$ is a low boundary of the RU contention window size and n is the number of successive transmission failures.

6. The wireless communication method of claim 1, further comprising computing a new value for the RU contention window size and a new RU backoff value upon receiving a new trigger frame following the step of transmitting data.

7. The wireless communication method of claim 1, wherein computing the new RU backoff value includes randomly selecting a value within a contention window range [0, CWO], wherein CWO is the RU contention window size for the RU backoff value.

8. A communication device in a wireless network comprising an access point and a plurality of nodes, the communication device being one of the nodes and comprising at least one microprocessor configured for carrying out the steps of:

receiving a trigger frame from the access point, the trigger frame reserving a transmission opportunity on at least one communication channel of the wireless network, the trigger frame defining resource units forming the communication channel including a plurality of random resource units that the nodes are configured to access using a contention scheme, wherein the node has a resource unit, RU, backoff value to be used to contend for access to the random resource units, in order to transmit data, wherein the RU backoff value is distinct from a backoff value to be used by the node to contend access using an enhanced distributed channel access, EDCA, scheme;

based on a current RU backoff value, accessing a random resource unit to transmit data to the access point, after having transmitted the data, computing a new RU backoff value to contend for new access to random resource units, the new RU backoff value being a value randomly selected within a contention window range defined by a RU contention window size, wherein the RU contention window size is updated depending on a success or failure in transmitting the data in the random resource unit, wherein the RU contention window size is distinct from a contention window size from which the EDCA backoff value is randomly selected.

9. The communication device of claim 8, wherein the microprocessor is configured to set the RU contention window size to a low boundary value in case of transmission success.

10. The communication device of claim 9, wherein the low boundary value is predetermined.

11. The communication device of claim 8, wherein the microprocessor is configured to double the RU contention window size in case of transmission failure.

12. The communication device of claim 8, wherein the microprocessor is configured to compute a new value for the RU contention window size and a new RU backoff value upon receiving a new trigger frame following the transmission of data to the access point.

13. The communication device of claim 8, wherein the microprocessor is configured, in order to compute the new RU backoff value, randomly select a value within a contention window range [0, CWO], wherein CWO is the RU contention window size for the new RU backoff value.

14. A non-transitory computer-readable medium storing a program which, when executed by a microprocessor or computer system in a device of a wireless network, causes the device to perform the method of claim 1.

* * * * *